US 8,041,155 B2

(12) United States Patent
Mihara et al.

(10) Patent No.: US 8,041,155 B2
(45) Date of Patent: Oct. 18, 2011

(54) IMAGE DISPLAY APPARATUS AND COMPUTER PROGRAM PRODUCT

(75) Inventors: Isao Mihara, Tokyo (JP); Yasunobu Yamauchi, Kanagawa (JP); Masahiro Sekine, Kanagawa (JP); Yasukazu Higuchi, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 883 days.

(21) Appl. No.: 12/076,439

(22) Filed: Mar. 18, 2008

(65) Prior Publication Data
US 2009/0080698 A1  Mar. 26, 2009

(30) Foreign Application Priority Data

Sep. 25, 2007  (JP) ................................. 2007-247997

(51) Int. Cl.
*G06K 9/54* (2006.01)
*G06T 1/60* (2006.01)
*H04N 5/66* (2006.01)

(52) U.S. Cl. .......................... 382/305; 345/530; 348/739
(58) Field of Classification Search .................. 382/103, 382/305, 312; 345/156, 204, 418, 530; 348/383, 348/739; 715/700, 719; 709/231
See application file for complete search history.

(56) References Cited

U.S. PATENT DOCUMENTS

| 6,597,380 | B1 * | 7/2003 | Wang et al. ............... 715/782 |
| 6,628,313 | B1 | 9/2003 | Minakuchi et al. |
| 6,646,980 | B1 | 11/2003 | Yamamoto et al. |
| 6,734,877 | B1 * | 5/2004 | Kondo et al. ............ 715/721 |
| 6,816,551 | B1 * | 11/2004 | Kasutani ............... 375/240.08 |
| 6,853,389 | B1 | 2/2005 | Ikeda |
| 6,956,812 | B2 | 10/2005 | Okada et al. |
| 7,171,344 | B2 * | 1/2007 | Lind .................................. 703/6 |
| 7,245,677 | B1 | 7/2007 | Pare, Jr. |
| 7,281,054 | B2 * | 10/2007 | Ishioka et al. ................ 709/231 |
| 7,298,384 | B2 * | 11/2007 | Anabuki et al. .............. 345/633 |
| 7,519,121 | B2 | 4/2009 | Matsushita et al. |
| 7,557,774 | B2 * | 7/2009 | Baudisch et al. ............. 345/1.1 |
| 7,590,948 | B2 | 9/2009 | Narita et al. |
| 2005/0010599 | A1 | 1/2005 | Kake et al. |
| 2005/0076361 | A1 | 4/2005 | Choi et al. |
| 2005/0210410 | A1 | 9/2005 | Ohwa et al. |
| 2007/0106661 | A1 | 5/2007 | Narita et al. |

(Continued)

FOREIGN PATENT DOCUMENTS

EP  1 051 034  11/2000

(Continued)

OTHER PUBLICATIONS

Loviscach, "Motion Blur for Textures by Means of Anisotropic Filtering," Eurographics Symposium on Rendering (2005), pp. 105-110.

(Continued)

Primary Examiner — Kanjibhai Patel
(74) Attorney, Agent, or Firm — Nixon & Vanderhye, P.C.

(57) ABSTRACT

A comprehensive degree of relevance of other moving picture contents with respect to a moving-picture content to be processed is calculated by using any one of or all of content information, frame information, and image characteristics, to display a virtual space in which a visualized content corresponding to a moving picture content to be displayed, which is selected based on the degree of relevance, is located at a position away from a layout position of the visualized content corresponding to the moving picture content to be processed, according to the degree of relevance.

15 Claims, 37 Drawing Sheets

U.S. PATENT DOCUMENTS

| | | | |
|---|---|---|---|
| 2007/0106949 A1 | 5/2007 | Narita et al. | |
| 2008/0235729 A1 | 9/2008 | Doi et al. | |
| 2008/0267582 A1 | 10/2008 | Yamauchi | |
| 2009/0019031 A1 | 1/2009 | Krovitz et al. | |
| 2009/0080698 A1 | 3/2009 | Mihara et al. | |
| 2009/0083814 A1 | 3/2009 | Sekine et al. | |
| 2010/0054703 A1 | 3/2010 | Tanaka et al. | |
| 2010/0057696 A1 | 3/2010 | Miyazawa et al. | |
| 2010/0057722 A1 | 3/2010 | Nakamura et al. | |
| 2010/0058173 A1 | 3/2010 | Kizuka et al. | |
| 2010/0058213 A1 | 3/2010 | Higuchi et al. | |
| 2010/0058388 A1 | 3/2010 | Baba et al. | |
| 2010/0156893 A1 | 6/2010 | Mihara et al. | |

FOREIGN PATENT DOCUMENTS

| | | |
|---|---|---|
| EP | 1 513 341 | 9/2005 |
| EP | 1 785 814 | 5/2007 |
| EP | 2 159 713 | 3/2010 |
| EP | 2 159 722 | 3/2010 |
| EP | 2 160 032 | 3/2010 |
| EP | 2 166 752 | 3/2010 |
| JP | 9-219835 | 8/1997 |
| JP | 11-03346 | 1/1999 |
| JP | 11-249774 | 9/1999 |
| JP | 2000-076267 | 3/2000 |
| JP | 2000-242648 | 9/2000 |
| JP | 2000-305946 | 11/2000 |
| JP | 2001-292383 | 10/2001 |
| JP | 2001-326881 | 11/2001 |
| JP | 2002-175269 | 6/2002 |
| JP | 2002-175321 | 6/2002 |
| JP | 2002-209178 | 7/2002 |
| JP | 2003-330969 | 11/2003 |
| JP | 2004-178085 | 6/2004 |
| JP | 2004-258390 | 9/2004 |
| JP | 2005-010854 | 1/2005 |
| JP | 2005-267390 | 9/2005 |
| JP | 2006-094520 | 4/2006 |
| JP | 2007-066285 | 3/2007 |
| JP | 2007-148669 | 6/2007 |
| JP | 2007-249641 | 9/2007 |
| JP | 2007-272651 | 10/2007 |
| JP | 2008-130032 | 6/2008 |
| JP | 2008-134725 | 6/2008 |
| JP | 2008-242504 | 10/2008 |
| JP | 2009-080580 | 4/2009 |
| WO | WO 00/33572 | 6/2000 |

OTHER PUBLICATIONS

Takeuchi et al., "Motion sharpening in moving natural images," Journal of Vision (2002), 2:377 (Abstract).

Brostow et al., "Image-Based Motion Blur for Stop Motion Animation", Proc. of Siggraph '01, pp. 561-566, (2001).

Ramos, et al., "Fluid Interaction Techniques for the Control and Annotation of Digital Video", Proceedings of the 16$^{th}$ annual ACM Symposium on User Interface Software and Technology, vol. 5, Issue 2, pp. 105-114, (2003).

Irani et al., "Efficient Representations of Video Sequence and Their Applications", Signal processing Image Communication (Journal), pp. 1-39, (1996).

Teodosio et al., "Salient Stills", ACM Transaction on Multimedia Computing, Communications and Appllications, pp. 16-36, (2005).

Agarwala et al., "Interactive Digital Photomontage", ACM Siggraph, pp. 1-9, (2004).

Sekine et al., U.S. Appl. No. 12/232,186, filed Sep. 11, 2008.
Tanaka et al., U.S. Appl. No. 12/416,786, filed Apr. 1, 2009.
Kizuka et al., U.S. Appl. No. 12/418,474, filed Apr. 3, 2009.
Baba et al., U.S. Appl. No. 12/426,756, filed Apr. 20, 2009.
Miyazawa et al., U.S. Appl. No. 12/431,663, filed Apr. 28, 2009.
Nakamura et al., U.S. Appl. No. 12/461,761, filed Aug. 24, 2009.
Higuchi et al., U.S. Appl. No. 12/461,924, filed Aug. 27, 2009.
Higuchi et al., U.S. Appl. No. 12/585,269, filed Sep. 9, 2009.
Mihara et al., U.S. Appl. No. 12/585,458, filed Sep. 15, 2009.

Yoshiyuki Kokojima et al., "Resolution Independent Rendering of Deformable Vector Objects Using Graphics Hardware", Sketches, Siggraph, (2006).

Masaru Suzuki et al., "Sasatto Search" Human Interface Technology for Information Retrieval, Toshiba Review vol. 62, No. 12, 2007, pp. 54-57.

Huan-Bo Luan et al., Interactive Spatio-Temporal Visual Map Model Web Video Retrieval, Multimedia and Expo, 2007, IEEE International Conference on, IEEE, P1, Jul. 1, 2007, pp. 560-563, ISBN: 978-1-4244-1016-3. (Abstract).

* cited by examiner

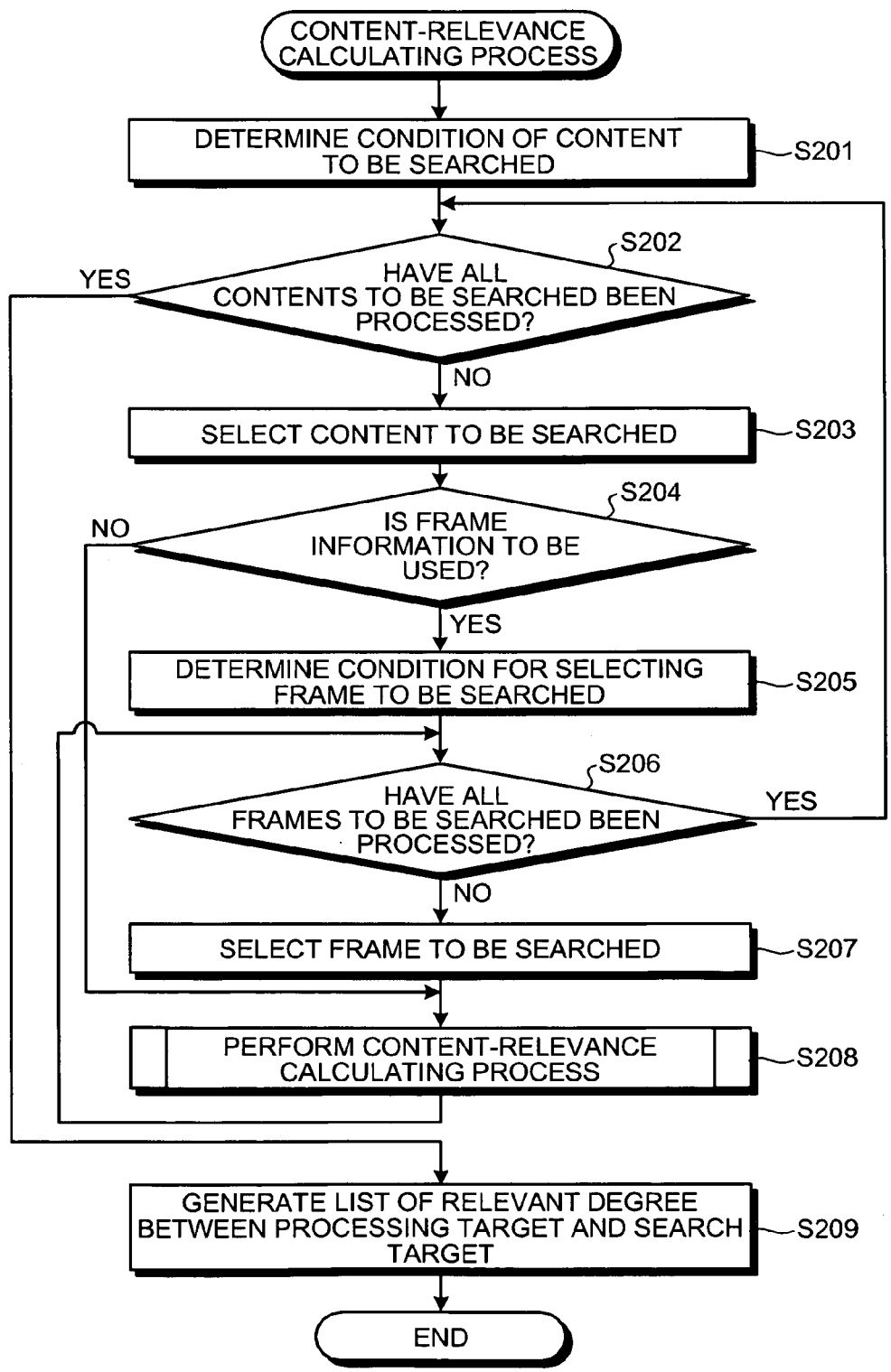

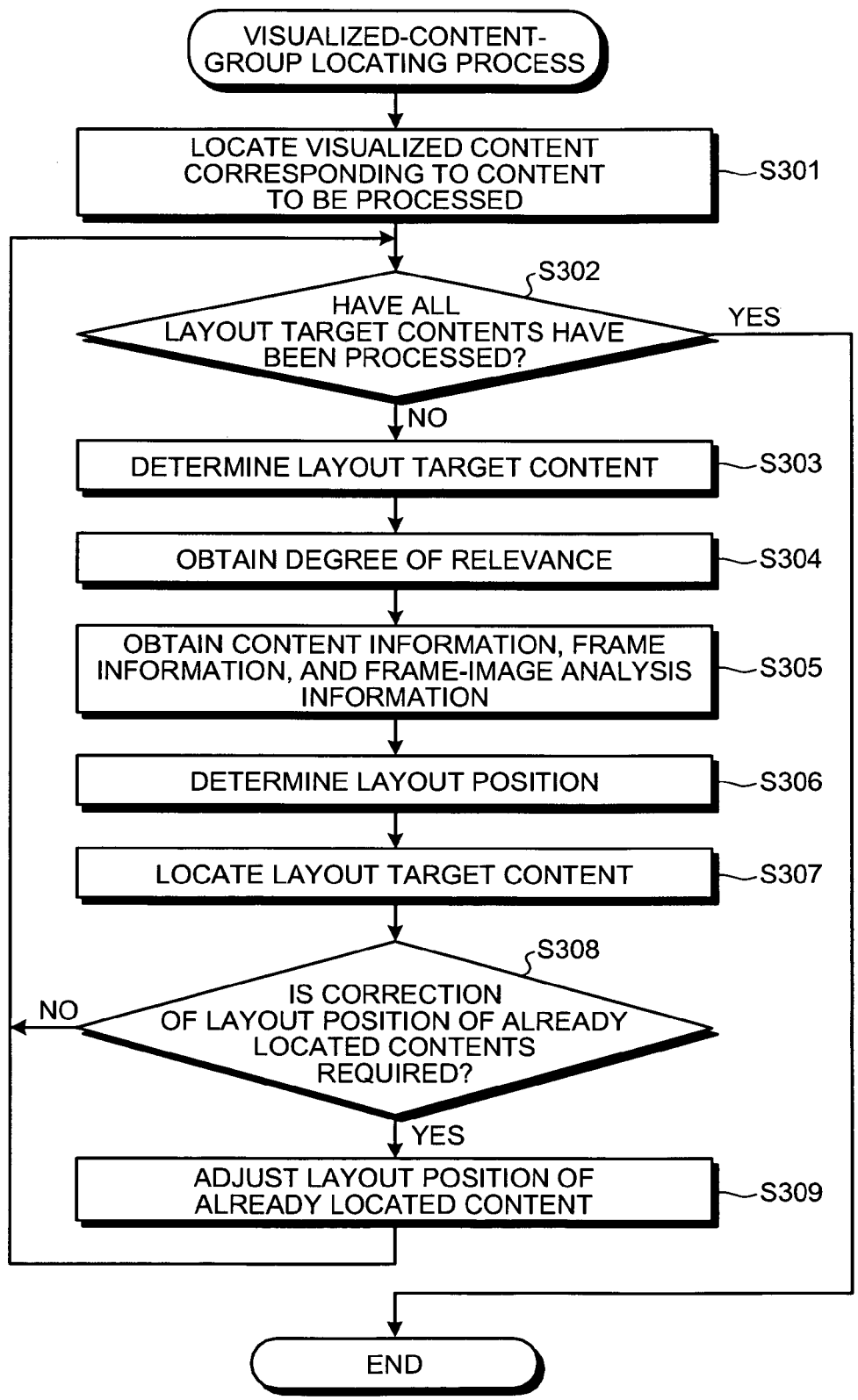

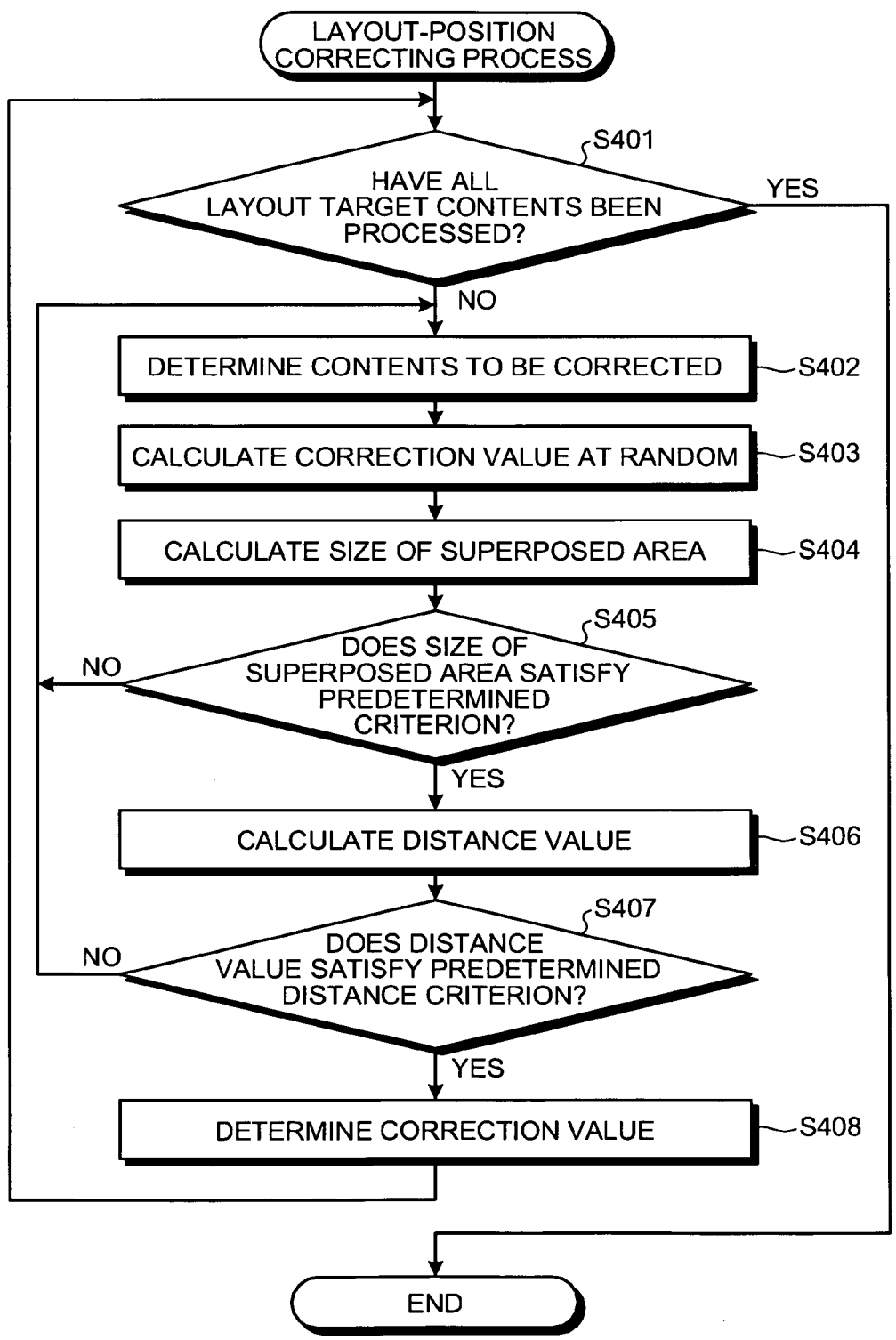

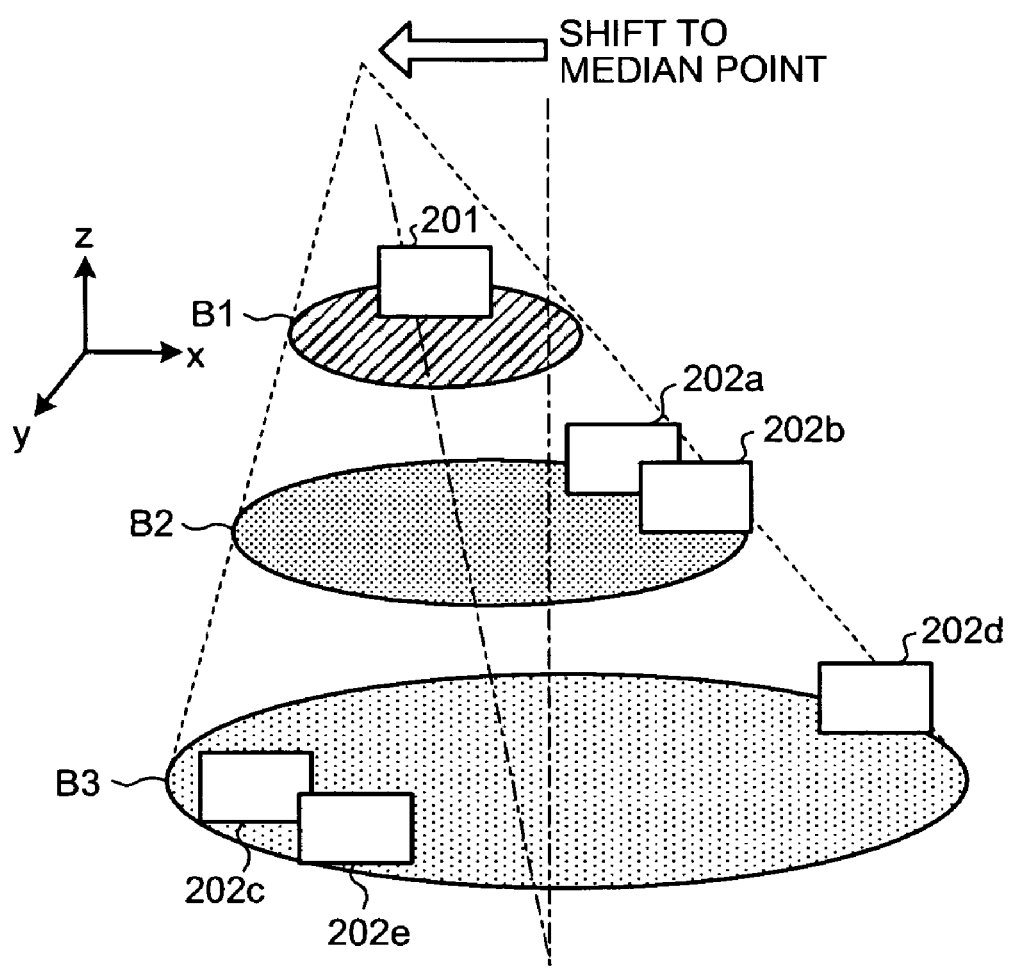

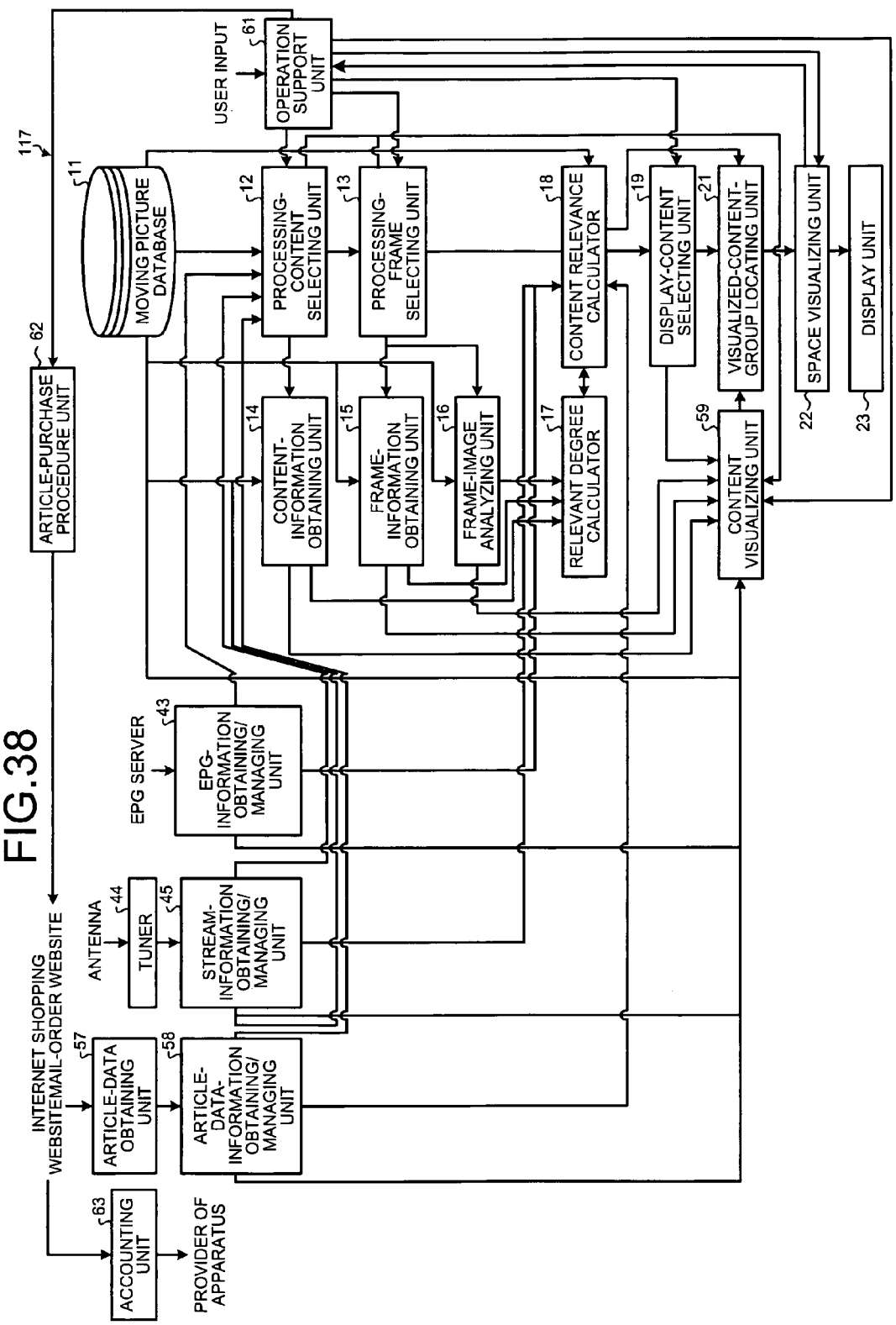

IMAGE DISPLAY APPARATUS AND COMPUTER PROGRAM PRODUCT

CROSS-REFERENCE TO RELATED APPLICATIONS

This application is based upon and claims the benefit of priority from the prior Japanese Patent Application No. 2007-247997, filed on Sep. 25, 2007; the entire contents of which are incorporated herein by reference.

BACKGROUND OF THE INVENTION

1. Field of the Invention

The present invention-relates to an image display apparatus and a computer program product for displaying moving picture contents.

2. Description of the Related Art

Usage of a search function is a method generally utilized in daily work with an information processing apparatus such as a PC. For example, Web search for searching information relating to a specific keyword from a website on the Internet has been used by many people. For the search function by the information processing apparatus, a search method in which a user actively inputs a keyword is generally used, such that the user inputs a keyword relating to a search item, to obtain a search result. In this specification, this search method is referred to as an active search method. Further, in the field of AV apparatuses such as a TV, a DVD recorder, and a HDD recorder, IT deployment has been advanced, so that AV apparatuses can be connected to the Internet. Accompanying this trend, a search function that is similar to the active search method of PCs has been employed also for AV apparatuses.

However, the number of contents accessible by the user is rapidly becoming much larger due to increase of content retention capacity of AV apparatuses, popularization of content providing services such as VOD, and seamless accesses between AV apparatuses or to contents present on the Internet.

With the popularization of the HDD recorder, user's manner of obtaining contents or user's viewing manner is also changing. That is, user's viewing manner is changing from a manner in which only a content which the user wishes to watch is recorded to a passive manner in which contents of interested contents are temporarily recorded and the user chooses one therefrom, or contents are automatically recorded by using a recommendation service or an automatic recording service. In the latter case, the contents accessible by the user can include what the user himself is not aware of.

On the other hand, it has been an important issue as to how to efficiently arrive at a desired content among a huge amount of content groups. Due to the change of the user's content-obtaining or viewing manner, the user is not always aware of all the recorded contents. Therefore, even if the user tries to search a content by the active search function, he may not be able to know what keyword to use for the search, and therefore it can be difficult to arrive at a desired content. Further, the active search function installed in AV apparatuses is used only by a part of users, and it is not a convenient search method for many users.

As a solution to the above problem, usage of a passive search method instead of the active search method can be considered. The passive search method is such that certain content is used as a base, and relevance between the content and other contents is presented to the user, so that the user can perform content search suggestively. That is, according to this search method, the user can arrive at a content of interest by selecting displayed contents without explicitly searching the content using the keyword. Therefore, in the passive search method, visualization of contents that share relevance with each other is an important feature for improving a search rate.

Meanwhile, various methods for visualizing the relevance between images have been proposed. For example, International Publication No. WO00/33572 discloses a method for sequentially enlarging images in an order of time series for expressing a time-series relationship between a plurality of images, to helically display the enlarged images in the order of time series.

However, in moving pictures such as a TV image and a video image, which are intended by AV apparatuses, the image in a reproduced frame sequentially changes with reproduction of the moving picture. Therefore, the relevance between images changes with a lapse of time. Accordingly, in the method described in International Publication No. WO00/33572 that intends still pictures, the relevance between moving pictures cannot be visualized.

SUMMARY OF THE INVENTION

According to one aspect of the present invention, an image display apparatus includes a storage unit that stores moving picture contents in which frame information indicating a characteristic of each frame is added to any one or all of a series of frames constituting a moving picture, and content information indicating a characteristic of each of the moving picture contents; a content selecting unit that selects a moving picture content to be processed from the moving picture contents stored in the storage unit; a first relevant degree calculator that calculates a degree of relevance between the moving picture content to be processed and respective other moving picture contents, based on a similarity between content information related to the moving picture content to be processed and content information related to the moving picture contents other than the moving picture content to be processed stored in the storage unit; a frame selecting unit that selects at least one frame contained in the moving picture content from the moving picture content to be processed, as a frame to be processed; a second relevant degree calculator that calculates a degree of relevance between the moving picture content to be processed and respective other moving picture contents, based on a similarity between frame information added to the frame to be processed and frame information added to the frames in other moving picture contents; an image analyzing unit that analyzes an image characteristic of an image contained in the frame to be processed and each frame constituting other moving picture contents; a third relevant degree calculator that calculates a degree of relevance between the moving picture content to be processed and respective other moving picture contents, based on a similarity between an image analysis result of the frame to be processed and an image analysis result of frames in the other moving picture contents; a content relevance calculator that calculates a comprehensive degree of relevance of each of the other moving picture contents with respect to the moving picture content to be processed, using the degree of relevance calculated by at least one of the first relevant degree calculator, the second relevant degree calculator, and the third relevant degree calculator; a display-content selecting unit that selects a moving picture content to be displayed from the other moving picture contents, based on the comprehensive degree of relevance calculated by the content relevance calculator; a content visualizing unit that generates a visualized content obtained by symbolizing the moving picture content to be processed and the moving picture content to be displayed, respectively; a locating unit that locates a visualized content corresponding to the moving picture content to be processed in a virtual space, and respectively locates a visualized content corresponding to each moving picture content to be displayed at a position away from a layout position thereof according to the comprehensive degree of relevance of each moving picture content to be displayed; a space visualizing unit that visualizes the virtual space, in which the visualized content is located, in a displayable state; and a display unit that displays the visualized virtual space.

According to another aspect of the present invention, an image display apparatus includes a storage unit that stores a plurality of moving picture contents; a content selecting unit that selects a moving picture content to be processed from the moving picture contents stored in the storage unit; a content relevance calculator that calculates a degree of relevance of each of moving picture contents other than the moving picture content to be processed with respect to the moving picture content to be processed, based on a degree of similarity between a characteristic of the moving picture content to be processed and a characteristic of the other moving picture contents stored in the storage unit; a content visualizing unit that generates visualized contents obtained by symbolizing the moving picture content to be processed and the other moving picture contents, respectively; a locating unit that locates a visualized content corresponding to the moving picture content to be processed in a virtual space, and respectively locates a visualized content corresponding to each of the other moving picture contents at a position away from the located position of the moving picture content to be processed to the extent according to the degree of relevance of each of the other moving picture contents; a space visualizing unit that visualizes the virtual space, in which the visualized contents are located, in a displayable state; and a display unit that displays the visualized virtual space.

According to another aspect of the present invention, a computer program product having a computer readable medium including programmed instructions for displaying images, wherein the instructions, when executed by a computer, cause the computer to perform: selecting a moving picture content to be processed from the moving picture contents stored in a storage unit that stores moving picture contents in which frame information indicating a characteristic of each frame is added to any one or all of a series of frames constituting a moving picture, and content information indicating a characteristic of each of the moving picture contents, each of the moving picture contents and the content information being related to each other; first calculating a degree of relevance between the moving picture content to be processed and respective other moving picture contents, based on a similarity between content information related to the moving picture content to be processed and content information related to the moving picture contents other than the moving picture content to be processed stored in the storage unit; selecting at least one frame contained in the moving picture content from the moving picture content to be processed, as a frame to be processed; second calculating a degree of relevance between the moving picture content to be processed and respective other moving picture contents, based on a similarity between frame information added to the frame to be processed and frame information added to the frames in other moving picture contents; analyzing an image characteristic of an image contained in the frame to be processed and each frame constituting other moving picture contents; third calculating a degree of relevance between the moving picture content to be processed and respective other moving picture contents, based on a similarity between an image analysis result of the frame to be processed and an image analysis result of frames in the other moving picture contents; calculating a comprehensive degree of relevance of each of the other moving picture contents with respect to the moving picture content to be processed, using the degree of relevance calculated by at least one of the first relevant degree calculator, the second relevant degree calculator, and the third relevant degree calculator; selecting a moving picture content to be displayed from the other moving picture contents, based on the comprehensive degree of relevance calculated by the content relevance calculator; generating a visualized content obtained by symbolizing the moving picture content to be processed and the moving picture content to be displayed, respectively; locating a visualized content corresponding to the moving picture content to be processed in a virtual space, and respectively locating a visualized content corresponding to each moving picture content to be displayed at apposition away from a layout position thereof according to the comprehensive degree of relevance of each moving picture content to be displayed; visualizing the virtual space, in which the visualized content is located, in a displayable state; and displaying the visualized virtual space.

BRIEF DESCRIPTION OF THE DRAWINGS

FIG. 3 is a flowchart of a content-relevance-calculating process procedure according to the first embodiment;

FIG. 7 is a flowchart of a visualized-content-group-locating process procedure according to the first embodiment;

FIG. 10 is a flowchart of a layout-position-correcting process procedure;

FIG. 19 is a diagram illustrating the virtual space shown in FIG. 18A three-dimensionally;

FIG. 38 is a diagram illustrating a configuration of an image display apparatus according to a second modification of the third embodiment.

DETAILED DESCRIPTION OF THE INVENTION

Exemplary embodiments of an image display apparatus and a computer program product according to the present invention will be explained below in detail with reference to the accompanying drawings. In the following embodiments, an example in which the present invention is applied to an image display apparatus such as an AV-PC or an HDD recorder is explained, however, applications of the present invention are not limited thereto.

A hardware configuration of an image display apparatus 100 according to a first embodiment of the present invention is explained first. The image display apparatus 100 includes a controller formed of a CPU and a GPU, a ROM for storing various data such as various programs and images, a storage unit including a RAM and an HDD, a communication unit that communicates with an external device, and a bus (not shown) for connecting these units, and a display apparatus and an input unit such as a keyboard and a mouse (not shown) are connected thereto. The display apparatus is a display unit 23 described later, such as a FPD. A manual operating device is an input device including operation keys by which an operation from a user is input, operation buttons, and a mouse.

Figure 1:
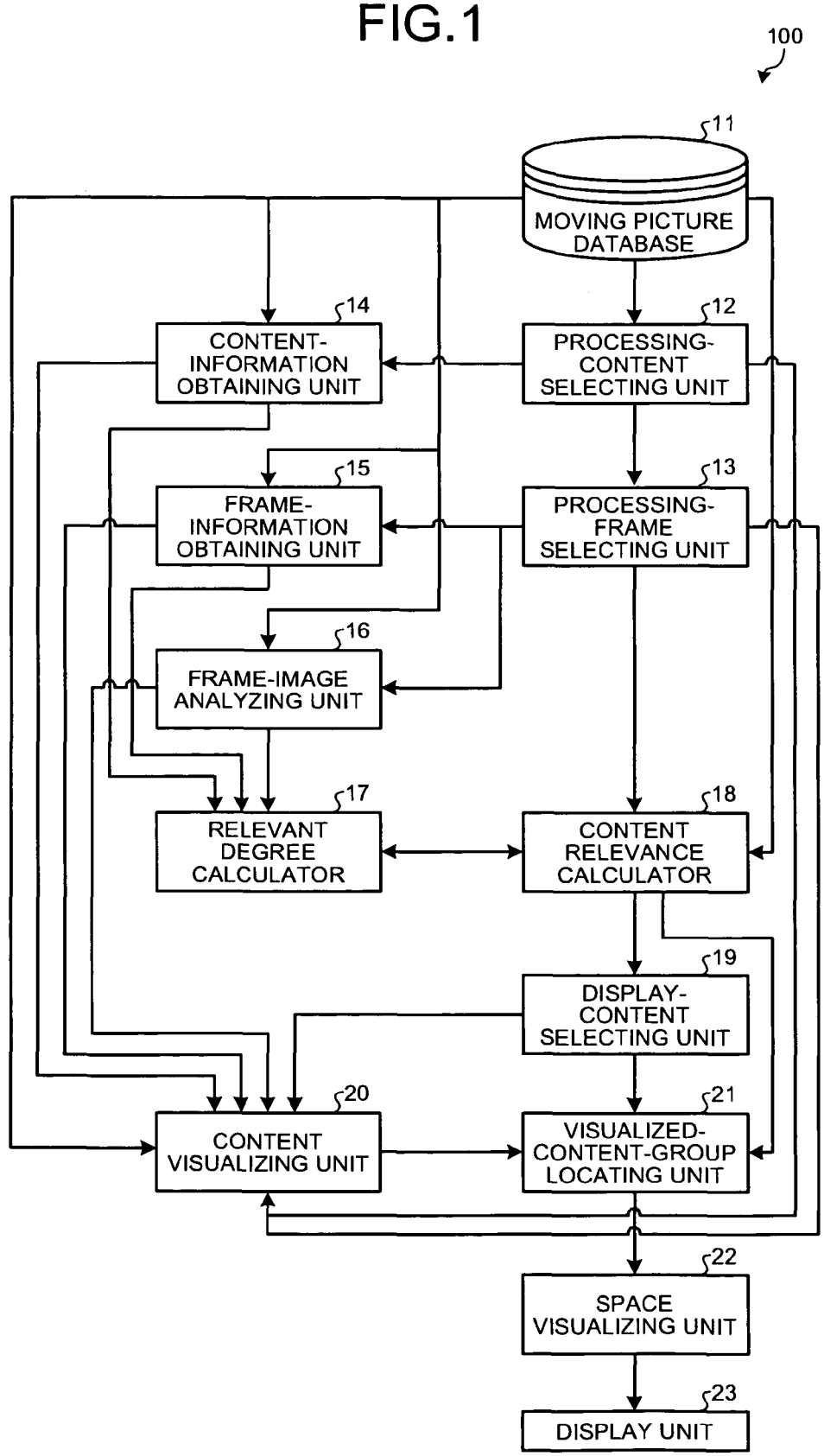
FIG. 1 is a diagram illustrating a configuration of an image display apparatus according to a first embodiment of the present invention.

A functional configuration of the image display apparatus 100 is explained next. FIG. 1 is a block diagram of a functional configuration of the image display apparatus 100 according to the first embodiment. As shown in FIG. 1, the image display apparatus 100 includes a moving picture database 11, a processing-content selecting unit 12, a processing-frame selecting unit 13, a content-information obtaining unit 14, a frame-information obtaining unit 15, a frame-image analyzing unit 16, a relevant degree calculator 17, a content relevance calculator 18, a display-content selecting unit 19, a content visualizing unit 20, a visualized-content-group locating unit 21, a space visualizing-unit 22, and the display unit 23.

The processing-content selecting unit 12, the processing-frame selecting unit 13, the content-information obtaining unit 14, the frame-information obtaining unit 15, the frame-image analyzing unit 16, the relevant degree calculator 17, the content relevance calculator 18, the display-content selecting unit 19, the content visualizing unit 20, the visualized-content-group locating unit 21, and the space visualizing unit 22 are functional units realized by executing various programs stored in the storage unit by the controller in the image display apparatus 100. The moving picture database 11 is a functional unit realized by the storage unit.

The moving picture database 11 accumulates and manages moving picture contents. For example, when it is assumed that the image display apparatus 100 is an HDD recorder, the moving picture database 11 accumulates moving picture contents in which a TV program and the like are recorded, and manages the accumulated moving picture contents readably from other functional units.

The "moving picture content" is moving picture data in which frame images are arranged in time series, and for example, represents a content such as a TV program and a movie. A storage format of the moving picture contents accumulated in the moving picture database 11 is not particularly limited; however, for example, the moving picture contents are stored as files encoded by using a well-known codec. Hereinafter, the moving picture content accumulated in the moving picture database 11 is referred to as a "content".

The moving picture database 11 accumulates content information relating to the content corresponding to each content. The "content information" represents an information group indicating a characteristic specific to each content, and includes a title of each content, a genre of a moving picture content, and the like. For example, when the content is a TV program, program information such as broadcast date and channel of the TV program, program title, program summary, program genre, starring list, and producer information is provided by the electronic program guides such as an EPG. Accordingly, when the electronic program guides can be obtained, the program information of the respective contents can be accumulated as the content information.

In the case of a VOD service or a moving picture sharing service on the Internet, the information relating to the content is sometimes distributed in a state of being embedded beforehand as tag information. In this case, the moving picture database 11 accumulates the tag information embedded in the content as the content information together with the content.

A mode in which the content information is provided in a state of being set beforehand has been explained; however, the mode is not limited thereto, and a mode in which the information input from a user via the manual operating device is accumulated as the content information corresponding to the content can be used.

It is assumed that information of the frame is added to each frame beforehand in a unit of frame constituting the content in a format of tag information or the like, in any one of or all of the contents accumulated in the moving picture database 11. Hereinafter, the information added to the frame is referred to as frame information. The "frame information" represents an information group indicating a characteristic specific to each frame, and includes a title and a genre of the image included in each frame. That is, the frame information is an information group in a unit of frame, while the content information is an information group in a unit of content.

The frame information includes, for example, information such as name of a performer indicated in the image included in the frame (hereinafter, "frame image") and information indicating a character and a scene such as a displayed place and object, a state, and a genre. If there is a chapter in the moving picture, the frame information includes chapter title, chapter content, recorded information in a unit of frame, program corner, title, subtitle, genre, outline of the content (content corner), and details thereof.

The frame information can be set by an author or a distributor of the content (for example, a TV station or a content production company), or by a third person (for example, a content viewer as the third person, or other users of the moving picture sharing service). The user himself can input the frame information via the manual operating device.

As another mode, the frame information can be automatically added to the respective frames in the contents accumulated in the moving picture database 11, by using a predetermined algorithm involved in addition of the frame information inside the image display apparatus 100 (or an external device). Specifically, because a person can be estimated by using a well-known method such as facial recognition, the person estimation of the performer displayed in an arbitrary frame included in the moving picture is executed to add the person's name as an estimation result in the format of tag information to the frame as the frame information. Note that the above explanation is only an example, and the content of the information and the information adding method are not limited thereto.

A mode in which the frame information is added to each frame has been explained above; however, the mode is not limited thereto. For example, the mode can be such that the frame information is added to any frame among a series of frames constituting the moving picture, one piece of frame information expressing each frame is added to a plurality of frames, or the frame information for a plurality of frames is added to one frame.

The processing-content selecting unit 12 selects a content from the content group accumulated in the moving picture database 11 as the content to be processed. Hereinafter, the content selected by the processing-content selecting unit 12 is referred to as "content to be processed".

Various methods can be employed for selecting the content to be processed. For example, a viewing state (reproduction state) of the respective contents accumulated in the moving picture database 11 is monitored, and when a certain content is now being viewed, the content now being viewed can be selected as the content to be processed, or if any content is not in the viewing state, a content viewed immediately before can be selected as the content to be processed.

When a specific content is selected by the user via the manual operating device based on a GUI or the like displayed on the display unit 23, the content can be selected as the content to be processed. Further, profile information (not shown) for specifying a specific keyword or user's preference is prepared beforehand, and the content can be automatically selected as a content to be processed based on the content specified in the profile information. For example, when "soccer program" is specified as the profile information, the processing-content selecting unit 12 selects one content described as "soccer program" in the program information or the like from the content group accumulated in the moving picture database 11 as the content to be processed.

The operation history of the image display apparatus 100 is recorded as history information, and the content of the program which the user frequently views can be selected as the content to be processed based on the history information.

The processing-frame selecting unit 13 selects at least one frame included in the content to be processed from the content to be processed selected by the processing-content selecting unit 12. Hereinafter, the frame selected by the processing-frame selecting unit 13 is referred to as a "frame to be processed".

The processing-frame selecting unit 13 measures an update timing of the frame to be processed based on a frame rate of the content to be processed, and when reaching the update timing, updates the frame to be processed.

For example, when it is assumed that the content to be processed is a TV program, because the TV program is normally formed as 30 frames/sec moving picture, 30-minutes TV program is formed of 54000 frames. In this case, the processing-frame selecting unit 13 selects at least one frame from 54000 frames constituting the content to be processed (30-minute TV program).

Various methods can be used for selecting the frame to be processed. For example, when the processing-content selecting unit 12 selects a content currently being viewed as the content to be processed, the processing-frame selecting unit 13 can select the last frame already viewed to date. That is, when the user has reproduced certain content halfway, the last frame viewed by the user is selected as the frame to be processed. Specifically, when the user temporarily stops reproduction of the content, the frame currently displayed due to temporary stop becomes the frame to be processed. When the viewing state of the respective contents (presence of viewing, number of programs viewed, information indicating how far the user has viewed) is held, the frame to be processed can be selected based on the viewing state. For example, when the user has viewed the content to be processed halfway in the past, any frame (for example, the last frame) of the frames already viewed can be selected as the frame to be processed. Further, any frame (for example, the first frame) of all the frames can be selected as the frame to be processed with respect to an unviewed content to be processed or the content to be processed already viewed to the last frame.

Furthermore, a frame specified by the user via the manual operating device can be selected as the frame to be processed. Information specifying the frame to be processed can be described beforehand in the profile information, so that the frame to be processed can be selected based on the information. Further, information specifying the frame to be processed can be contained in the content itself, so that the frame to be processed can be selected based on the information.

An example in which only one frame is selected as the frame to be processed has been explained above; however, the number of frames to be processed is not limited thereto. Two or more frames can be selected simultaneously from the frames to be processed, or the content to be processed can be divided into specific cut units by using a method referred to as cut detection, so that a plurality of frames contained in the divided cut can be selected. Further, by using the cut detection method, the first (or the last) frame in the cut can be selected as the frame to be processed in a unit of divided cut.

In this case, the first (or the last) frame in the cut hithermost to the frame being currently viewed can be selected as the frame to be processed. A characteristic frame contained in the divided cut can be further selected as the frame to be processed, or the frame to be processed can be selected at random from the frame in the cut. The "characteristic frame" represents a frame obtained by a method such as calculating a correlation between the frames by using a pattern recognition method or the like to calculate a frame having the highest (or lowest) correlation, or calculating a histogram of the frame to calculate a frame having a large (or small) change. Any method of extracting a specific frame from the frames can be used based on some criteria, other than the above method.

The content-information obtaining unit 14 obtains the content information accumulated in relation to the content according to a content instructed from the relevant degree calculator 17 from the moving-picture database 11. For example, when the program information is accumulated in relation to the content as the content information, the content-information obtaining unit 14 obtains information such as a program title or subtitle, broadcast date, channel, genre, summary and the like of the content.

The frame-information obtaining unit 15 obtains the frame information added to the frame in the specific content from the contents accumulated in the moving picture database 11 according to the instruction content from the relevant degree calculator 17.

The frame-image analyzing unit 16 analyzes an image characteristic of an image included in at least one frame that constitutes the specific content accumulated in the moving picture database 11, according to the instruction content from the relevant degree calculator 17. Specifically, the frame-image analyzing unit 16 analyzes the image included in the frame by using the image recognition method to specify the character displayed in the image, place, action, situation, and structure of a scene.

A well-known method can be used as the image recognition method used by the frame-image analyzing unit 16. For example, a characteristic of an item photographed in the image is calculated by using a facial image recognition method as an example of the image recognition method, and it is determined whether the calculated characteristics form the structure of a face (position and structure of eyes, nose, and mouth form a face), thereby enabling to determine whether the item projected on the image is a face.

Further, it can be determined whether the item projected on the image is a face not by calculating the characteristic but by using a method referred to as template matching. Furthermore, data characterizing a specific person's face is registered beforehand, and it can be determined whether the person is projected on the image, or it can be determined whether there is a person projected on the image by using data characterizing many people's faces, and when there is a person, it can be recognized who he/she is. The frame-image analyzing unit 16 can determine that a person H1 and a person H2 are projected on a certain frame image by using such a facial image recognition method.

Further, by using a scene recognition method or the like, it can be analyzed what kind of scene structure a frame image has. For example, luminance distribution of an image can be analyzed by calculating luminance histogram values of the image. Accordingly, information such as contrast difference between images can be obtained. That is, it can be determined whether the scene is dark or bright, whether the scene has a large change in a screen or a small change in the screen, and the like. The frame-image analyzing unit 16 can analyze that, for example, a certain frame image is a scene in which a baseball game is being played, by using such a scene recognition method.

The relevant degree calculator 17 calculates the degree of relevance between two contents different from each other, based on information obtained by at least one functional units of the content-information obtaining unit 14, the frame-information obtaining unit 15, and the frame-image analyzing unit 16.

Figure 2:
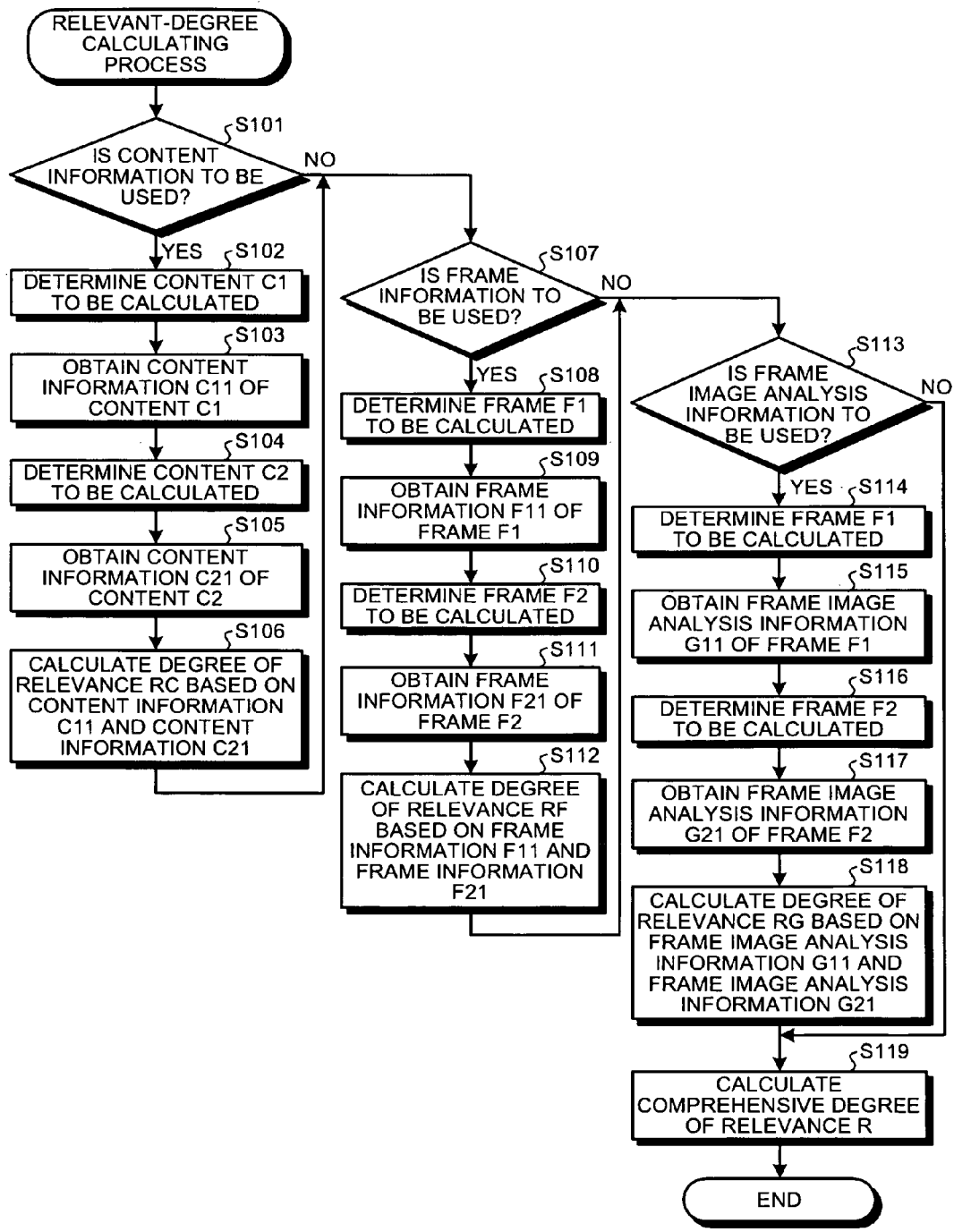
FIG. 2 is a flowchart of a relevant-degree-calculating process procedure according to the first embodiment.

An operation of the relevant degree calculator 17 is explained with reference to FIG. 2. FIG. 2 is a flowchart of a process procedure performed by the relevant degree calculator 17. Note that, as a presupposition of the process, the degree of relevance between contents C1 and C2 accumulated in the moving picture database 11 is calculated.

The relevant degree calculator 17 determines whether the content information, that is, the content-information obtaining unit 14 is to be used for calculating the degree of relevance (step S101). The user can specify whether to use the content information via the manual operating device or the like or it can be specified beforehand in setting information (not shown).

When having determined that the content information is not used at step S101 (No at step S101), the relevant degree calculator 17 directly proceeds to step S107. When having determined that the content information is used at step S101 (Yes at step S101), the relevant degree calculator 17 determines a first content (content C1), which becomes a calculation target of the degree of relevance (step S102), to obtain the content information (content information C11) related to the content C1 using the content-information obtaining unit 14 (step S103). The content C1 to be calculated is determined according to the instruction from the content relevance calculator 18.

Subsequently, the relevant degree calculator 17 determines a second content (content C2), which is the calculation target of the degree of relevance (step S104), to obtain the content information (content information C21) related to the content C2 using the content-information obtaining unit 14 (step S105). The content C2 to be calculated is determined according to the instruction from the content relevance calculator 18.

The relevant degree calculator 17 calculates the degree of relevance RC of the content C2 with respect to the content C1 based on the similarity between the content information C11 obtained at step S103 and the content information C21 obtained at step S105 (step S106), and proceeds to step S107. The calculation of the degree of relevance RC can be calculated by using a following equation (1).

$$\text{Degree of relevance } RC = \sum_{n=1}^{N} fa_n(C11(n), C21(n)) \times wa_n \quad (1)$$

In the equation (1), N denotes total of the content information obtainable by the content-information obtaining unit 14. "(n)" in content information $C11(n)$ and $C21(n)$ denotes n-th content information obtained by the content-information obtaining unit 14. $fa_n(C11(n), C21(n))$ denotes a function for returning the degree of relevance between $C11(n)$ and $C21(n)$ as $RC_n$, and $Wa_n$ denotes a weighting value (n=1, ..., N).

The information obtained as the content information has a variety show as described above; however, it is assumed that the content information is an aggregate of five pieces of information, that is, recording date and time, title of content, channel, genre, and performers' list (N=5) for simplifying the explanation, and explanations will be given below with an assumption that these five pieces of content information is n=1, 2, ..., 5 from the head.

The degree of relevance RC of content C2 with respect to content C1 can be expressed in weighted linear sum of five degrees of relevance $RC_1$ to $RC_5$ shown below.

$RC_1=fa_1$ (recording date and time of content information C11, recording date and time of content information C21)
$RC_2=fa_2$ (title of content information C11, title of content information C21)
$RC_3=fa_3$ (channel of content information C11, channel of content information C21)
$RC_4=fa_4$ (genre of content information C11, genre of content information C21)
$RC_5=fa_5$ (performers' list of content information C11, performers' list of content information C21)

For example, $fa_1$ is a function taking a larger value as the recording date and time becomes closer, and a smaller value as the recording date and time becomes further. Specifically, for example, a relational expression such as CO1/|rec_data (C11)−rec_data(C21)| can be used. rec_data(x) is a function for obtaining a unique integer for x recording date and time, such that certain reference date and time is set to 0, and the recording date and time is converted to an integer indicating elapsed seconds therefrom. CO1 is an arbitrary constant, and |X| is a function indicating a magnitude of X, and is typically an absolute value.

An example of using g, which is a function of g(x)=CO1/|X|, is shown, when it is assumed that $fa_1$(C11, C21)=g(rec_data(C11)−rec_data(C21)). However, g is not limited thereto, and g using L2 norm, for example, g(x)=CO1/‖X‖ can be used. In this case, ‖X‖ is a square root of sum of squares of differences between respective elements constituting x.

As for g(x), a sigmoid function or the like can be used, or a gamma function can be used. An example in which g(x) takes a large value when the content information C11 and the content information C21 are close to each other is shown above, however, the present invention is not limited thereto, and g(x) can take a small value in such a case. Further, a function g that takes a large value under a specific condition can be also used.

For example, $fa_2$ is realized by a function, which takes a larger value as similar character strings are included more in a title character string of the content information C11 and the content information C21. For example, if the title in C11 is "aiueo" and the title in C21 is "kakiueko", two common characters of "ue" are included in both C11 and C21. On the other hand, in the case of "aiueo" and "kakikukeo", only one common character is included in both C11 and C21. Therefore, the value of $fa_2$ is larger in the former case.

An example in which the number of characters included in C11 and C21 is simply compared is shown above. However, the present invention is not limited thereto, and for example, further condition can be added such that $fa_2$ takes a larger value when the number of common characters from the head is increasing, or even if there is no common character, if the similar concept is included, it is regarded as common. As an example of the latter case, for example, "yakyu" and "baseball" are regarded as the same, and if these words are included in C11 and C21, it is regarded that the common character string is included.

When the main character string is the same and a sub character string is different, the value of $fa_2$ can become large, because these are sometimes contents in a common series. For example, "aiueo#2" and "aiueo#3" can be regarded as a different episode of the same drama content. Therefore, in such a case, the value of $fa_2$ is doubled. Note that the above explanation is only an example, and comparison that is more sophisticated than that in the above explanation can be performed by using a known method such as searching by regular expression.

For example, $fa_3$ is a function taking a large value when the channel in the content information C11 and the channel in the content information C21 are the same. Simply, $fa_3$ can be realized as a function taking a value CO2 when the channel is the same, otherwise, taking a value 0. CO2 is an arbitrary constant. Further extending $fa_3$, in the case of an affiliated channel, $fa_3$ can take another value. For example, in the case of the same affiliated channel, a function returning a value CO2/2 can be used. When the channel is an affiliated channel but a broadcasting media is different, a function returning a value CO2/4 can be used. Note that the mode explained above is only an example, and arbitrary functions can be used.

For example, $fa_4$ is a function taking a large value when the genre in the content information C11 and the genre in the content information C21 are the same. For example, a function taking a value CO3 when the genres of C11 and C21 are both "sports", otherwise, taking a value 0, and further, taking a value CO3/2 when C21 is a sub-genre of C11, for example, the genre in C11 is "sport" and the genre in C21 is "baseball" can be used. Further, even if the genre in C11 and the genre in C21 are not directly the same, but parent genres thereof are the same, for example, when the genre in C11 is "baseball" and the genre in C21 is "soccer", the parent genre thereof is "sports", and therefore $fa_4$ can be a function taking a value CO3/4. Note that the mode explained above is only an example, and arbitrary functions can be used.

$fa_5$ is the same as $fa_4$. For example, when characters in C11 and C21 are respectively "WW, XX, YY" and "XX, YY, ZZ", the common characters are two. Therefore, a function taking 2×CO4 (CO4 is an arbitrary constant in this case), and when there is no common character, taking 0 can be used. Further, because a group can be included in the characters, when a certain character KK is a member of group XX, in the case of C11 and C21 having characters "VV, WW, XX" and "KK, YY, ZZ", respectively, a group XX appears in C11, that is, KK as a member of the group also appears, and in C21, although group XX does not appear, KK as the member thereof appears. Therefore, in this case, a function returning CO4/2 can be used.

Similarly, when a relationship between appearing groups and characters is defined, for example, group XX and group YY are belonging to the same agency, the function can be extended to return CO4/4. In this case, the relation between a character and a group, or the relationship between agencies to which the group belongs can be defined in the content information or stored beforehand in the moving picture database, or can be obtained from an external server (information website).

An example in which the degree of relevance is not classified with respect to characters appearing in the character list is explained above; however, the present invention is not limited thereto. Further, weighting can be performed with respect to the degree of relevance according to the order appearing in the character list. For example, weighting can be changed according to the appearing order such that the calculated degree of relevance is used as it is in the case of comparison with the first character in the content information C11, in the case of comparison with the second character, the degree of relevance is weighted by ½, and in the case of comparison with the third character, the degree of relevance is weighted by ⅓. Further, the order in the content information C11 and the order in the content information C21 can be taken into account. For example, when the second character in the content information C11 is compared with the third character in the content information C21, weighting becomes ½ in the case of the second character in the content information C11, and ⅓ in the case of the third character in the content information C21. Therefore, total degree of relevance can be calculated as ½×⅓=⅙. Further, weighting for the degree of relevance with respect to the characters can be changed, using appearance information as the content information. For example, weighting can be changed such that in the case of playing the leading role, the calculated degree of relevance is doubled.

Returning to FIG. 2, the relevant degree calculator 17 determines whether the frame information, that is, the frame-information obtaining unit 15 is to be used for calculating the degree of relevance at step S107 (step S107). The user can specify whether to use the frame information via the manual operating device as in the content information or it can be set beforehand in the setting information (not shown).

At step S107, when having determined that the frame information is not used (No at step S107), the relevant degree calculator 17 proceeds directly to step S113. At step S107, when having determined that the frame information is used (Yes at step S107), the relevant degree calculator 17 determines the first frame (frame F1), which becomes the calculation target of the degree of relevance (step S108), and obtains the frame information (frame information F11) related to the frame F1 using the frame-information obtaining unit 15 (step S109). It is assumed that the frame F1 is determined based on the information input from the content relevance calculator 18, and the frame F1 is any one of the frames in a series of frame groups included in content C1.

Subsequently, when having determined the second frame (frame F2), which becomes the calculation target of the degree of relevance (step S110), the relevant degree calculator 17 obtains the frame information (frame information F21) related to the frame F2, using the frame-information obtaining unit 15 (step S111). It is assumed that the frame F2 is determined based on the information input from the content relevance calculator 18, and the frame F2 is any one of the frames in the series of frame groups included in content C2.

After the relevant degree calculator 17 calculates the degree of relevance between frames F1 and F2, that is, the degree of relevance RF of content C2 with respect to content C1 based on the similarity between the frame information F11 obtained at step S109 and the frame information F21 obtained at step S111 (step S112), the relevant degree calculator 17 proceeds to step S113. The degree of relevance RF can be calculated by using the following equation (2).

$$\text{Degree of relevance } RF = \sum_{n=1}^{N} fb_n(F11(n), F21(n)) \times wb_n \quad (2)$$

In the equation (2), N denotes total of the content information obtainable by the frame-information obtaining unit 15. "(n)" in frame information $F11(n)$ and $F21(n)$ denotes n-th frame information obtained by the frame-information obtaining unit 15. $fb_n(F11(n), F21(n))$ denotes a function for returning the degree of relevance between $F11(n)$ and $F21(n)$ as $RF_n$, and $Wb_n$ denotes a weighting value (n=1, ..., N).

The information obtained as the frame information has a variety show as described above; however, it is assumed that the frame information is an aggregate of two pieces of information, that is, {chapter (corner) title, chapter (corner) genre} (N=2) for simplifying the explanation, and explanations will be given below with an assumption that these two pieces of frame information are n=1, 2 from the head.

The degree of relevance RF between frames F1 and F2 can be expressed in the weighted linear sum of two degrees of relevance $RF_1$ and $RF_5$ as in the degree of relevance of the content information.

$RF_1=fb_1$ (chapter title of frame information F11, chapter title of frame information F21)

$RF_2=fb_2$ (chapter genre of frame information F11, chapter genre of frame information F21)

For example, $fb_1$ and $fb_2$ can be calculated by a relational expression similar to the method (respectively corresponding to $fa_2$ and $fa_4$) at step S106.

Returning to FIG. 2, the relevant degree calculator 17 determines whether to use frame image analysis information, that is, the frame-image analyzing unit 16 for calculating the degree of relevance (step S113). The user can specify whether to use the frame image analysis information via the manual operating device as in the content information or it can be set beforehand in the setting information (not shown).

At step S113, when having determined not to use the frame information analysis information (No at step S113), the relevant degree calculator 17 proceeds to step S119.

At step S113, when having determined to use the frame information analysis information (Yes at step S113), the relevant degree calculator 17 determines the first frame (frame F1), which becomes the calculation target of the degree of relevance (step S114), and obtains the frame image analysis information (frame image analysis information G11) relating to frame F1 by using the frame-image analyzing unit 16 (step S115). It is assumed that frame F1 is determined based on the information input from the content relevance calculator 18, and is the same frame as the frame F1 described above. Accordingly, when the frame F1 has been already determined by the process at step S108, the process at step S114 can be omitted.

Subsequently, the relevant degree calculator 17 determines the second frame (frame F2), which becomes the calculation target of the degree of relevance (step S116), and obtains the frame image analysis information (frame image analysis information G21) relating to the frame F2 by using the frame-information obtaining unit 15 (step S117). It is assumed that the frame F2 is determined based on the information input from the content relevance calculator 18, and is the same frame as the frame F2 described above. Accordingly, when the frame F2 has been already determined by the process at step S110, the process at step S116 can be omitted.

The relevant degree calculator 17 then calculates the degree of relevance between frames F1 and F2, that is, degree of relevance RG of content C2 with respect to content C1 based on the similarity between the frame image analysis information G11 obtained at step S115 and the frame image analysis information G21 obtained at step S117 (step S118), and proceeds to step S119. The degree of relevance RG can be calculated by using the following equation (3).

$$\text{Degree of relevance } RG = \sum_{n=1}^{N} fc_n(G11(n), G21(n)) \times wc_n \quad (3)$$

In the equation (3), N denotes total of the frame image analysis information obtainable by the frame-image analyzing unit 16. "(n)" in the frame image analysis information G11(n) and G21(n) denotes n-th frame image analysis information obtained by the frame-image analyzing unit 16. $fc_n$(G11(n), G21(n)) denotes a function for returning the degree of relevance between G11(n) and G21(n) as $RG_n$, and $Wc_n$ denotes a weighting value (n=1, ..., N).

The information obtained as the frame image analysis information has a variety show as described above; however, it is assumed that the frame image analysis information is an aggregate of two pieces of information, that is, {face recognition information and luminance histogram information}, (N=2) for simplifying the explanation, and explanations will be given below with an assumption that these two pieces of frame image analysis information is n=1, 2 from the head. The degree of relevance RG between frames F1 and F2 can be expressed in weighted linear sum of two degrees of relevance $RG_1$ and $RG_2$ shown below.

$RG_1 = fc_2$ (face recognition information of frame F1, face recognition information of frame F2)

$RF_2 = fc_2$ (luminance histogram information of frame F1, luminance histogram information of frame F2)

$fc_1$ is a function for calculating similarity between, for example, the face recognition information of frame F1 and the face recognition information of frame F2. When name, ID, and the like that can specify a recognized person are extracted as the face recognition information, it is determined whether these are the same, and $fc_1$ is realized by a function returning CO5 (arbitrary constant) if these are the same, and if not, returning 0. When a parameter used for face recognition has been obtained as the face recognition information, these two parameters are compared with each other, thereby enabling to determine how much these faces are similar to each other. Comparison of two parameters is generally performed according to an angle formed by two vectors, regarding two parameters as vectors. As the angle formed by the two vectors is close to 0, the both parameters can be determined to be similar to each other, and as the angle becomes large, the both parameters can be determined not to similar to each other. Accordingly, when these two parameters resemble each other, a large value is output by using an inverse number.

$fc_2$ is a function for calculating, for example, the similarity between luminance histograms, and it can be obtained simply by totalizing difference sizes between the respective luminance values in the luminance histogram. Specifically, when it is assumed that Hist(X) is the luminance histogram of X, the similarity can be obtained by CO6/($\Sigma$|Hist(F1)−Hist(F2)|). CO6 is an arbitrary constant. When the difference in the luminance histogram is small, it can be said that tendencies of image frames are similar.

One example of the function for calculating the degree of relevance RG has been explained, however, the function is not limited thereto, and an arbitrary function can be used so long as the function can express the correlation between two values as a value.

Returning to FIG. 2, at step S119, the relevant degree calculator 17 adds the calculated degrees of relevance (RC, RF, and RG), using the following equation (4), to calculate a comprehensive degree of relevance R of C2 with respect to content C1 (step S119), and finishes the process.

$$\text{Degree of relevance } R = wx \cdot RC + wy \cdot RF + wz \cdot RG \quad (4)$$

The value calculated at step S106 is assigned to the degree of relevance RC. When it is determined not to use the content information at step S101, RC becomes 0. Similarly, the value calculated at step S112 is assigned to the degree of relevance RF and when it is determined not to use the frame information at step S107, RF becomes 0. Further, the value calculated at step S118 is assigned to the degree of relevance RG and when it is determined not to use the frame image analysis information at step S113, RG becomes 0. wx, wy, and wz are coefficients expressing a weight.

Returning to FIG. 1, the content relevance calculator 18 calculates the degree of relevance between the content to be processed selected by the processing-content selecting unit 12 and the respective contents accumulated in the moving picture database 11 by using the relevant degree calculator 17, to list the content group having high degree of relevance with the content to be processed, corresponding to the degree of relevance.

The operation of the content relevance calculator 18 is explained with reference to FIG. 3. FIG. 3 is a flowchart of a content-relevance-calculating process procedure performed by the content relevance calculator 18. It is assumed that the content to be processed and the frame to be processed are selected by the processing-content selecting unit 12 and the processing-frame selecting unit 13.

The content relevance calculator 18 first determines a condition of the content to be searched from the moving picture database 11 (step S201). All the contents accumulated in the moving picture database 11 are search targets; however, the search target can be narrowed down by setting. For example, the content to be searched can be narrowed down according to a use environment, only the content recorded before specific date and time can be set as the search target, only a content in a specific genre can be set as the search target, or only a content including a specific title can be set as the search target. These narrowing-down conditions can be input by the user via the manual operating device or can be set beforehand as the setting information.

The content relevance calculator 18 then determines whether a relevant-degree calculating process at step S208 has been performed with respect to all the content to be searched corresponding to the condition determined at step S201 (step S202).

At step S202, when having determined that all the contents to be searched have been processed (Yes at step S202), the content relevance calculator 18 proceeds directly to step S209. On the other hand, at step S202, when having determined that the content-relevance calculating process has not been performed with respect to all the contents to be searched (No at step S202), the content relevance calculator 18 selects one unprocessed content to be searched from the contents to be searched (step S203).

Subsequently, the content relevance calculator 18 determines whether to use the frame information for calculating the degree of relevance (step S204). Determination whether to use the frame information can be preset as system setting or can be specified by the user via the manual operating device.

At step S204, when having determined not to use the frame information (No at step S204), the content relevance calculator 18 proceeds directly to step S208. On the other hand, when having determined to use the frame information (Yes at step S204), the content relevance calculator 18 determines a condition for selecting the frame to be searched in the content to be searched (step S205).

As the condition for selecting the frame to be searched, all the frames included in the content to be searched can be set as the frame to be searched. Only a specific frame can be set as the frame to be searched according to the system setting or an input from the user. Only the first frame can be set as the frame to be searched, or only the N-th frame from the first one (N is the number of frames set according to the system setting or given by user) can be set as the frame to be searched. An aggregate of the first frames in the chapter can be set as the frame to be searched by using a chapter-dividing result of the content to be searched, or an aggregate of frames including the specific frame information can be set as the frame to be searched.

Subsequently, the content relevance calculator 18 determines whether the content-relevance calculating process at step S208 described later has been performed with respect to all the frames to be searched, and when having determined that the process has been performed (Yes at step S206), the content relevance calculator 18 returns to step S202.

On the other hand, at step S206, when having determined that there is an unprocessed frame to be searched (No at step S206), the content relevance calculator 18 selects one unprocessed frame to be searched corresponding to the condition determined at step S205 from the frame group to be searched determined at step S203 (step S207).

Subsequently, the content relevance calculator 18 designates the content to be processed and the frame to be processed as content C1 and content information C11, respectively, and designates the content to be searched selected at step S203 and the frame to be searched selected at step S207 as content C2 and content information C21, to notify the designation to the relevant degree calculator 17. Accordingly, the relevant degree calculator 17 performs the content-relevance calculating process (step S208), and returns to step S206 again. Because the content-relevance calculating process at step S208 is the same as the content-relevance calculating process shown in FIG. 2, explanations thereof will be omitted.

At step S208, when the frame information is used, the degree of relevance between a pair of content to be processed and content to be searched and the frames to be processed for the number of frames to be processed matching the condition of the frame to be searched is calculated. The content relevance calculator 18 sorts out the pair of content to be processed and content to be searched in a descending order of relevant degrees, and manages the degree of relevance as an aggregate of relevant degrees in the pair of content to be processed and content to be searched. Specifically, the content to be processed and the content to be searched are unique, and when there are N frames to be searched matching the condition of the frame to be searched with respect to a certain content to be searched, N relevant degrees are calculated from the certain content to be searched with respect to the content to be processed. The aggregate of N relevant degrees is defined as the relevant degrees of respective contents to be searched with respect to the content to be processed.

The content relevance calculator 18 uses M degrees of relevance (M denotes the number of contents matching the condition determined at step S201) with respect to the content to be processed calculated up to now, to generate a list of relevant degrees between the content to be processed and the content group to be searched stored in the moving picture database 11, and forms a table in which the list is rearranged in a descending order of relevant degrees (step S209), to finish the process.

The operation of the content relevance calculator 18 is concluded here. When the content to be processed is designated as X, the frame to be processed in X is designated as X(n), and total number of the content to be searched is designated as M, it is assumed that the m-th content to be searched is Ym (m=0, . . . , M−1). Further, it is assumed that the p-th frame to be searched in the content to be searched Ym is Ym(p) (if Pm is assumed to be the number of frames to be searched in Ym, p=0, . . . , Pm−1). When the frame information is used, the aggregate of Pm−1 relevant degrees {R(m, 0), . . . , R(m, Pm−1)} can be obtained with respect to the content to be searched Ym. R(x, y) represents the degree of relevance with the frame to be searched y in the content to be searched x.

That is, the degree of relevance of the content to be searched is expressed by {m∈Ym| {R(m, 0), . . . , R(m, Pm−1)}}, and there are Pm (m=0, . . . , M−1) relevant degrees (frame information levels), respectively, in each one of M contents to be searched. At this time, the degree of relevance R(m) of the content to be searched m in the content to be processed is defined as follows:

$$R(m)=\max(R(m,0), \ldots, R(m,Pm-1)),$$

where max denotes a function returning the maximum value. That is, R(m) indicates the maximum degree of relevance among R(m, 0), . . . , R(m, Pm−1).

In the above example, the maximum degree of relevance is designated as the degree of relevance in the content to be searched m, however, the degree of relevance is not limited thereto. For example, R(m)=(R(m, 0)+ . . . +R(m, Pm−1))/Pm, which is a mean value, can be set as the degree of relevance. Further, a mean value (median) of R(m, 0), . . . , R(m, Pm−1) can be used as the degree of relevance. Other calculation methods can be also used. When the frame information is not used, values of degree of relevance with respect to each of m contents to be searched are simply listed.

Returning to FIG. 1, the display-content selecting unit 19 selects a content conforming to a predetermined condition as a display content from the content group listed by the content relevance calculator 18. Simultaneously, the content to be processed selected by the processing-content selecting unit 12 is also selected as the display content.

The predetermined condition includes, for example, the number of contents. When a limit count of contents obtained by system setting or user input is N, and if the number of contents to be searched listed by the content relevance calculator 18 (the number of contents to be searched, for which the degree of relevance has been calculated) exceeds N, N contents to be searched are selected as a display content group in a descending order of relevant degrees. The predetermined condition is not limited to the number of contents.

Further, the narrowing-down condition such as the recording date, which is specific date and time, or after or a specific genre can be used singly or in a combination thereof. Content information obtained by the content-information obtaining unit 14, the frame-information obtaining unit 15, and the frame-image analyzing unit 16, frame information, and at least one piece of information included in the frame image analysis information can be used for selection using the narrowing-down conditions, and the condition is not limited to the number of contents, recording date and time, and genre. As a result, the display-content selecting unit 19 selects a content conforming to the predetermined condition as the display content, from the content to be processed selected by the processing-content selecting unit 12 and the content group listed by the content relevance calculator 18.

The content visualizing unit 20 visualizes the display content selected by the display-content selecting unit 19, using at least one of the content information obtained by the content-information obtaining unit 14, the frame information obtained by the frame-information obtaining unit 15, the frame image analysis information obtained by the frame-image analyzing unit 16, and the frame image contained in the content. The "visualization of the display content" means expressing each display content in a visually distinguishable state by symbolizing the display content and the content information.

Figure 4A:
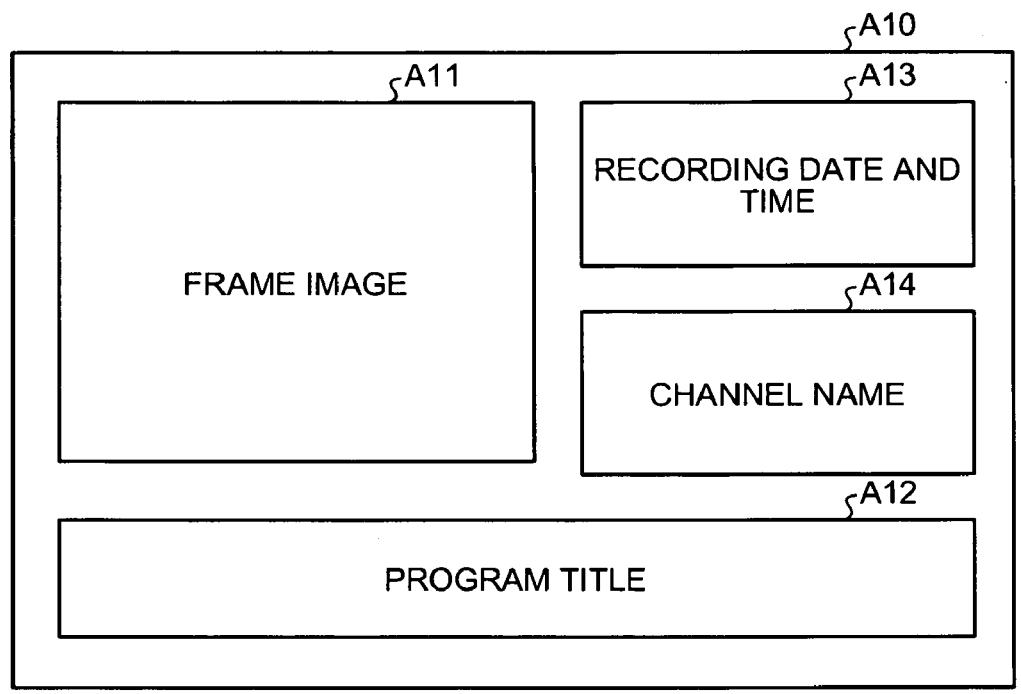
FIG. 4A is a diagram illustrating one example of a visualized content visualized by a content visualizing unit.
Figure 4B:
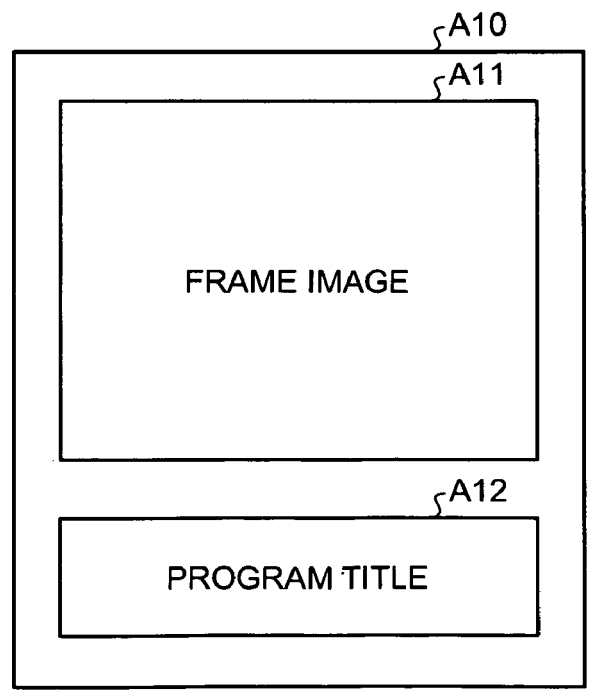
FIG. 4B is a diagram illustrating another example of a visualized content visualized by the content visualizing unit.

Specifically, the content visualizing unit 20 performs visualization by using a CG technology, for example, as shown in FIGS. 4A and 4B, by laying out each element characterizing the display content.

FIG. 4A is one example of the visualized display content. As shown in FIG. 4A, a frame image A11, a program title A12, recording date and time A13, and a channel name A14 are superimposed on a rectangular background A10. The program title A12, the recording date and time A13, and the channel name A14 are extracted from the content information obtained by the content-information obtaining unit 14.

In this case, the content visualizing unit 20 prepares a plate-like polygon matched with a display size of the background A10, to perform texture mapping of the frame image A11 on a part (or all) of the surface of the polygon. The frame image A11 can be expressed in a format referred to as a thumbnail image. In this case, the frame image is reduced (or enlarged) to be matched with a display area of the frame image A11.

As for character information such as the program title A12, the recording date and time A13, and the channel name A14, an image visualizing the character is respectively generated as a texture image, and each texture image is texture-mapped on a part of the surface of the polygon at a predetermined position in a predetermined size. Various methods have been proposed for visualization of characters, and for example, visualization of characters can be realized by using a known method (see, for example, Yoshiyuki Kokojima, et al., Resolution-Independent Rendering of Deformable Vector Objects Using Graphics Hardware, Sketches, SIGGRAPH 2006, 2006) of visualizing character data expressed by vector data as texture data (rendering), using a shader method in the CG technology.

The frame image A11 can be obtained from the moving picture database 11 by using a frame number assigned externally of the content visualizing unit 20 (for example, by the processing-frame selecting unit 13). Further, not only the obtained frame images are used directly, but also only a part thereof can be used by cropping, or the frame images can be used as images having different resolution by performing scaling. Cropping is specified by, for example, selecting a range so that the information amount of the frame image becomes the largest in the image size desired to obtain by the user. This can be realized by scanning the frame image by using a window of the image size desired to obtain, and calculating entropy in the window to determine a portion of the window where the entropy becomes the largest as a cropped image.

The above is only one example, and cropping can be performed according to an arbitrary criterion. Further, not only different resolution is simply obtained by scaling, but also an image of a different resolution is generated by using a method referred to as retargeting, and the image can be used. Retargeting is a method for converting the resolution adaptively so that the characteristic of the frame image can be expressed most efficiently, and various methods have been researched and developed. In the present invention, these methods are appropriately used and the result thereof can be used as the frame image A11.

As for the frame image A11, chapter information obtained from the display content can be used to obtain a frame image of an arbitrary chapter head or an arbitrary frame from the chapter head, and the frame image can be used. Further, a frame image of a frame reaching a climax can be used by using a degree of dramatic tension calculated from the display content. The degree of dramatic tension can be calculated by a known method, for example, by using voice information of the display content to designate a portion where a voice waveform maintains a large level as a portion having the highest dramatic tension.

In FIG. 4A, the background, A10, the frame image A11, the program title A12, the recording date and time A13, and the channel name A14 are used as elements to be visualized, however, the elements are not limited thereto. For example, as shown in FIG. 4B, only the frame image A11 and the program title A12 can be superimposed on the background A10. The layout of the elements is not limited to the examples shown in FIGS. 4A and 4B, and arbitrary layout is possible.

Note that the visualization method of the characters explained above is only an example and is not limited thereto, and other methods can be also applied. For example, the background A10 can be painted in a predetermined color, or a predetermined image is adhered by texture mapping. In this case, for example, the genre information of the content obtained by the content-information obtaining unit 14 is used to change the color based on the type of the genre, such that the background A10 is painted in blue when the genre is sports, or yellow when the genre is drama.

The thumbnail expressing the content such as genre, title name, recording date and time, channel, and content can be seen in a list format by looking at the display content visualized by the above operation. Hereinafter, the display content visualized by the content visualizing unit 20 is referred to as "visualized content".

The visualized-content-group locating unit 21 locates a visualized content group visualized by the content visualizing unit 20 in a virtual three-dimensional space (hereinafter, "virtual space"), based on the degree of relevance calculated by the content relevance calculator 18.

Figure 5:
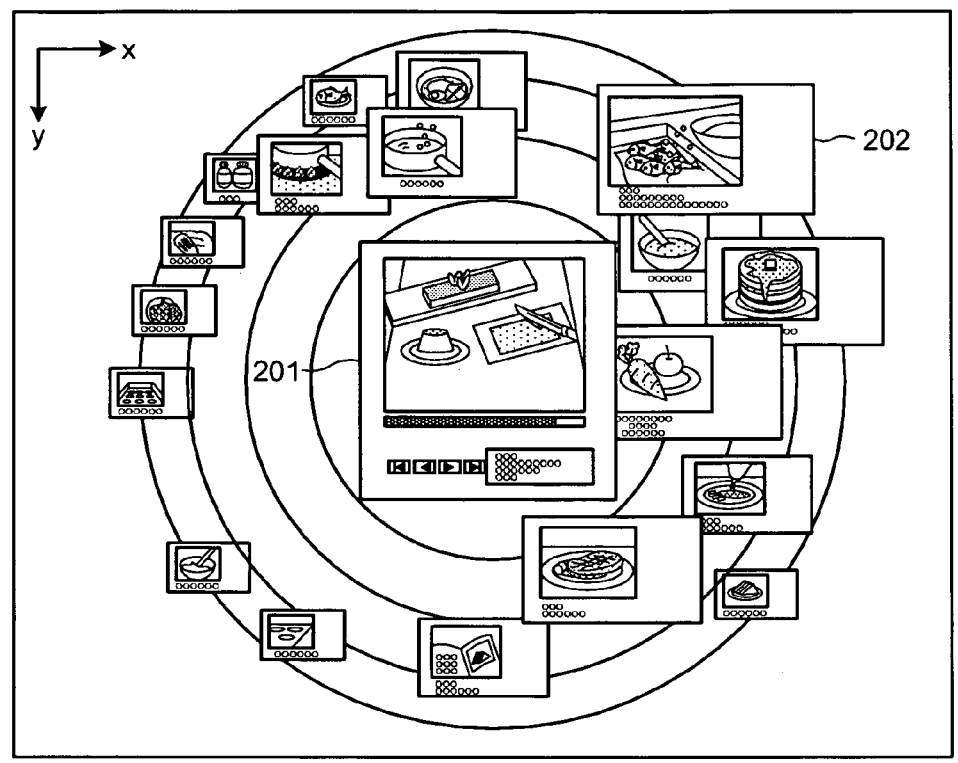
FIG. 5 is a top view of a virtual space visualized by a visualized-content-group locating unit.
Figure 6:
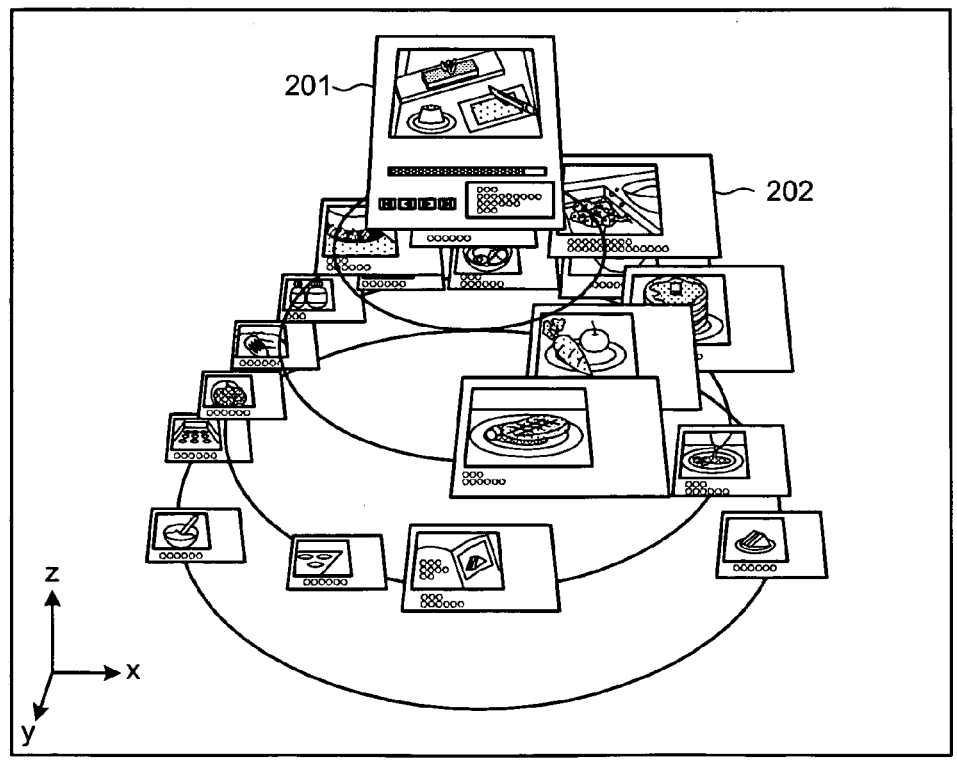
FIG. 6 is a side view of the virtual space visualized by the visualized-content-group locating unit.

The visualized content group located in the virtual space by the visualized-content-group locating unit 21 is explained below with reference to FIGS. 5 and 6. FIGS. 5 and 6 are examples of the visualized content group located in the virtual space. FIG. 5 is a top view of the virtual space as seen from above (from a distant place on a positive side of Z axis) and FIG. 6 is a side view of the virtual space as seen from the front, that is, from a distant place on a positive side of Y axis and inclined toward the positive side of Z axis, in the same space and under the same layout condition.

In FIGS. 5 and 6, visualized contents 201 and 202 indicate visualized contents generated by the content visualizing unit 20. The visualized content 201 is a content corresponding to the content to be processed, and is located at the top of a conical layout coordinate system. Visualized contents other than the visualized content 201 are visualized contents of the display contents selected as the contents conforming to the predetermined condition by the display-content selecting unit 19. The visualized-content-group locating unit 21 changes a viewpoint for observing (rendering) the virtual space (observation viewpoint) to locate these visualized contents in the virtual three-dimensional space, so that the same layout is seen differently as shown in FIG. 6. The observation viewpoint can be changed to an arbitrary position by the user via the manual operating device.

The operation for locating the visualized contents by the visualized-content-group locating unit 21 is explained with reference to FIGS. 7, 8A, and 8B.

FIG. 7 is a flowchart of a visualized-content-group locating process procedure performed by the visualized-content-group locating unit 21. The visualized-content-group locating unit 21 first locates the visualized content 201 corresponding to the content to be processed in the virtual space (step S301). The content to be processed is a content selected by the processing-content selecting unit 12, which becomes a reference of the degree of relevance between respective contents calculated by the content relevance calculator 18.

The layout position of the visualized content 201 is, for example, at an origin (x, y)=(0, 0) in the virtual space, with a normal direction of the visualized content being z axis, that is, as normal vector=(0, 0, 1). According to this procedure, the content to be processed (visualized content) is located at a position of the visualized content 201 shown in FIGS. 8A and 8B.

Figure 8A:
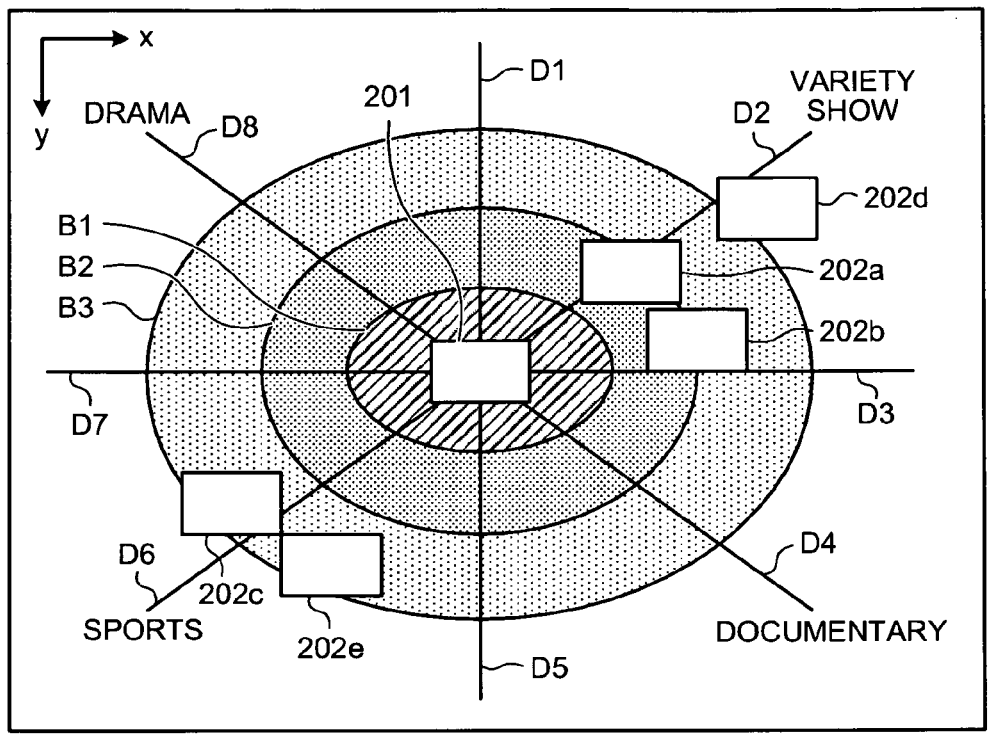
FIG. 8A is a top view of a virtual space where the visualized content is located.

FIG. 8A is a top view of the virtual space as a layout target as seen from above (from a distant place on a positive side of Z axis), with a center of the drawing being the origin (x, y)=(0, 0). As shown in FIG. 8A, it is assumed that genre types are allocated beforehand in each orientation direction in an XY plane centering about the origin (x, y)=(0, 0). FIG. 8B is a side view of the virtual space as the layout target as seen from the front (from a distant place on a positive side of Y axis), with an axial direction of a cone shown in the drawing being Z axis.

Returning to FIG. 7, the visualized-content-group locating unit 21 determines whether all the layout target contents have been located (step S302). The "layout target contents" stand for visualized contents obtained by visualizing each content in the display content group selected by the display-content selecting unit 19, by using the content visualizing unit 20.

At step S302, when having determined that all the layout target contents have been located (Yes at step S302), the visualized-content-group locating unit 21 finishes the process. On the other hand, at step S302, when having determined that there is an unlocated visualized content (No at step S302), the visualized-content-group locating unit 21 determines the next layout target content to be located (step S303). As the determination of the layout target content, it suffices that one arbitrary content is selected from the unlocated visualized contents. For example, the one having the largest degree of relevance obtained by the content relevance calculator 18 can be selected from the unlocated visualized contents.

Subsequently, the visualized-content-group locating unit 21 obtains the degree of relevance of the layout target content determined at step S303 from the content relevance calculator 18 (step S304).

The visualized-content-group locating unit 21 then obtains information to be used, among content information, frame information, and frame-image analysis information of the layout target content determined at step S303 from the content visualizing unit 20 (step S305). As one example, a case that a genre contained in the content information (genre information) is used is explained below, however, the information used is not limited thereto.

The visualized-content-group locating unit 21 determines the layout position of the layout target content determined at step S303 (step S306), and locates the layout target content at the determined position (step S307).

Determination of the layout position at step S306 is performed according to the following procedure. That is, the visualized-content-group locating unit 21 determines the layout position of the layout target content on the XY plane in the virtual space, based on the genre information contained in the content information of the layout target content. Specifically, the visualized-content-group locating unit 21 compares the genre information in the content information with the genre information allocated to each orientation on the XY plane, to determine an orientation matching each other as the layout position on the XY plane.

In FIG. 8A, the orientation on the XY plane is divided into eight (orientations D1 to D8), and types of genre information different from each other are allocated beforehand to each divided orientation. For example, when it is assumed that the genre information of the layout target content is "variety show", the visualized-content-group locating unit 21 determines the layout position of the layout target content on the XY plane in the virtual space as orientation D2.

In FIG. 8A, an example in which "variety show" is allocated to orientation D2, "sports" to orientation D6, and "drama" to orientation D8 is shown, however, the allocation is not limited thereto. Types other than genre can be allocated to the orientation direction.

Allocation to each orientation may not always be fixed, and can be dynamically changed according to the environment at the time of use. For example, allocation can be performed to each orientation in order of the genre of programs frequently viewed by the user, by referring to user's past operation history (not shown). Further, allocation to each orientation can be changed according to instruction information input from the user via the manual operating device. The information allocated to each orientation is not always one piece of information, and for example, a plurality of types of information can be allocated simultaneously such that the genre is allocated to orientations D1 and D2, and recording date and time is allocated to orientation D3.

The visualized-content-group locating unit 21 determines the layout position on the Z axis in the virtual space, based on the degree of relevance of the layout target content obtained at step S304. Specifically, as shown in FIG. 8B, the conical layout coordinate system is provided in the virtual space, and a position on the Z axis of a truncated cone at which the layout target content is to be located is determined. The center of the truncated cone is orthogonal to the Z axis, and as a value on the Z axis (Z value) increases, a content having a larger degree of relevance is located, and as the Z value decreases, a content having a smaller degree of relevance is located.

For example, when it is assumed that a position where the visualized content 201 corresponding to the content to be processed is located is a truncated cone B1, which becomes an upper base, and a radius of the truncated cone B1 is constant r1, position Z2 on the Z axis away from position Z1 on the Z axis on the upper base by a distance corresponding to the degree of relevance (Z1>Z2) is calculated, to generate a lower base (see truncated cone B2 and B3 in FIGS. 8A and 8B) having a radius of r2 (r1<r2) at the calculated position. The radius r2 can be obtained from the value of position Z2 and the conical layout coordinate system.

The visualized-content-group locating unit 21 designates the position Z2 on the Z axis on the generated lower base as Z coordinate (Z value) where the layout target content is to be located, and designates a point where the orientation (for example, D2) on the XY plane determined previously and the lower base cross each other as X, X coordinate where the layout target content is to be located, thereby determining the layout position of the layout target content in the virtual space.

The position on the Z axis (Z value) on the truncated cone corresponding to the degree of relevance can be uniquely determined only by solving a simple geometrical expression, if parameters at the time of providing the upper vase and the lower base (for example, height of the layout coordinate system (cone) and radius of the base) are defined and conversion from the value expressing the degree of relevance into the Z value is defined. In the first embodiment, it is assumed that the parameters of the layout coordinate system provided in the virtual space are predetermined. However, the present invention is not limited thereto, and the parameters can be changed based on the operation history and the instruction information input from the user via the manual operating device.

It is also assumed that a conversion formula of Z value according to the degree of relevance involved in derivation of Z2 from Z1 is also predetermined. For example, Z2 can be obtained by using a relational expression such as "Z2=CO7× (maximum value of degree of relevance−degree of relevance of certain content)". CO7 is an arbitrary constant. The relational expression involved in derivation of Z2 is not limited thereto, and any relational expression that can uniquely derive Z2 according to the degree of relevance can be used.

In the above explanation, the relational expression from the degree of relevance to Z2 is a continuous function. However, the relational expression is not limited thereto, and Z value can be discretely determined by using a relational expression such as "Z value=round (A×(maximum value of degree of relevance−degree of relevance of certain content))". "round" represents a function for rounding off after the decimal point. That is, the same Z value is output with respect to some degrees of relevance. Further, the relational expression can be changed based on the operation history and the instruction information input from the user via the manual operating device.

Figure 8B:
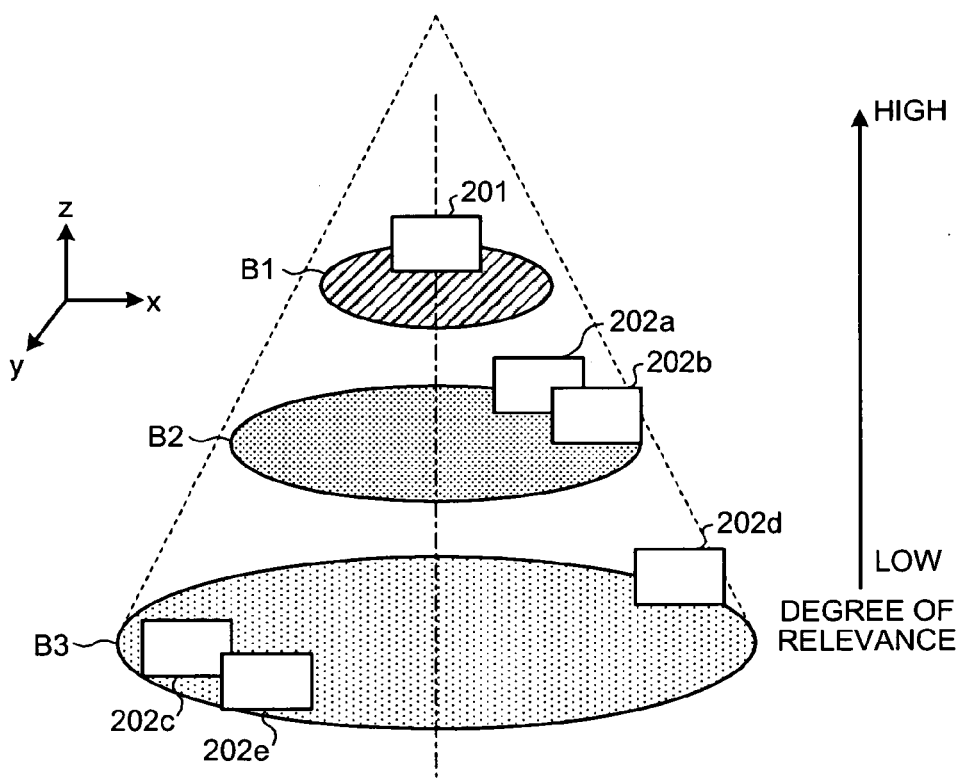
FIG. 8B is a side view of the virtual space where the visualized content is located.

According to the above operation, for example, a visualized content having a degree of relevance of v1 and in a genre of variety show is located at the edge of a truncated cone B2 as a visualized content 202a in FIGS. 8A and 8B in the process at step S307. A visualized content having a degree of relevance of v2 (<v1) and in a genre of sports is located at the edge of a truncated cone B3 as a visualized content 202c shown in FIGS. 8A and 8B. Visualized contents 202b, 202d, and 202e are located at positions in the virtual space according to the genre and the degree of relevance of each visualized content.

By locating the visualized content in this manner, it can be easily identified that the visualized contents 202a and 202c are in different genres, when the virtual space is seen from above, as shown in FIG. 8A. Further, as shown in FIG. 8B, when the virtual space is seen from the side, it can be easily identified that the visualized content 202a has a larger degree of relevance with the visualized content 201 than the visualized content 202c.

Returning to FIG. 7, at the subsequent step S308, the visualized-content-group locating unit 21 determines whether correction of the layout position of the already located contents is required, and when having determined that correction is not required (No at step S308), returns to step S302 again. The "already located contents" stand for visualized contents already located in the virtual space.

For example, when the locating method as explained in FIGS. 8A and 8B (a specific example at step S306) is used, if there is a plurality of contents having the same degree of relevance and in the same genre, these contents are located at the identical position. In this case, when the virtual space is visualized by the space visualizing unit 22 in a subsequent stage, these cannot be discriminated from each other. Further, when there is a plurality of contents in the same genre and having a degree of relevance close to each other, a plurality of visualized contents (a part thereof) is superposed on each other. Therefore, the respective contents of the visualized contents cannot be discriminated from each other.

The process at step S308 is for solving the above problems, and by determining whether the positions of respective located visualized contents are within a predetermined value, it is determined whether correction of the layout position is required (step S308). The "predetermined value", which becomes a criterion, is dynamically changed based on the size of the visualized content at the time of display, and a viewing direction at the time of displaying the virtual space by the space visualizing unit 22. For example, as shown in FIG. 8A, when the virtual space is displayed as seen from above, two-dimensional positions of respective visualized contents are determined in the XY coordinate, and as shown in FIG. 8B, when the virtual space is displayed as seen from the side, three-dimensional positions of respective visualized contents are determined in the XYZ coordinate.

At step S308, when it is determined that correction of the layout position of the already located content is required (Yes at step S308), the visualized-content-group locating unit 21 adjusts the layout position of the already located content (step S309), to proceed to a process at step S302.

There is a plurality of correction methods at step S309, and some representative correction methods are explained below. As the first correction method, as shown in FIGS. 9A to 9F, the layout position of the already located content is corrected by using position correction information (not shown) in which layout sequence and the positions are predetermined.

For example, it is assumed that there are four visualized contents 203a, 203b, 203c, and 203d located in the virtual space in the same genre and having a degree of relevance close to each other. In this case, the layout positions of these visualized contents are locally concentrated. In such a case, the layout positions can be adjusted so that the visualized contents are not superposed on each other by shifting the layout position of each visualized content based on the position correction information.

Figure 9A:
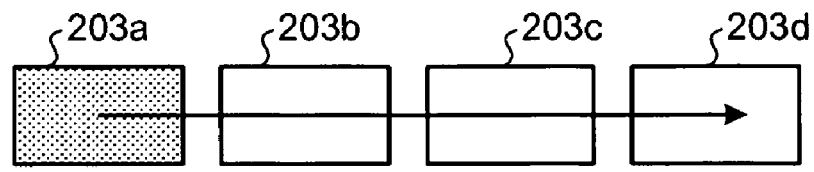
FIGS. 9A to 9F are diagrams illustrating examples of a correction method of a layout position of the visualized content.

FIG. 9A is a correction example in which the layout positions of the superposed visualized contents are shifted laterally (in a direction of arrow in FIG. 9A). In this case, the layout positions are laterally adjusted so that the visualized contents are not superposed on each other such that the position of the visualized content 203b is corrected to be adjacent to the position of the visualized content 203a, and the position of the visualized content 203c is corrected to be adjacent to the position of the visualized content 203b.

Figure 9B:
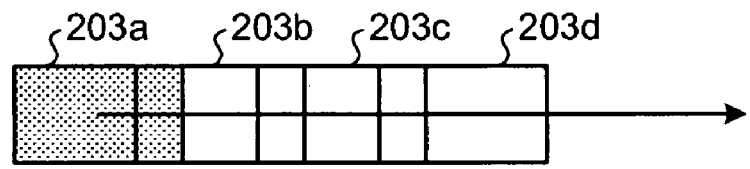

For simplifying explanations, an example in which the positions are corrected so that the visualized contents are not superposed on each other is presented here. However, the correction method is not limited thereto. For example, as shown in FIG. 9B, the layout positions can be corrected with an allowable superposition, by predetermining the allowable superposition amount in the position correction information.

Figure 9C:
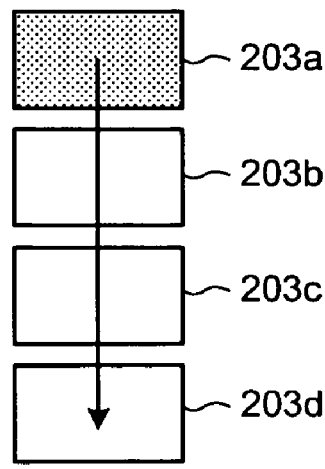
Figure 9D:
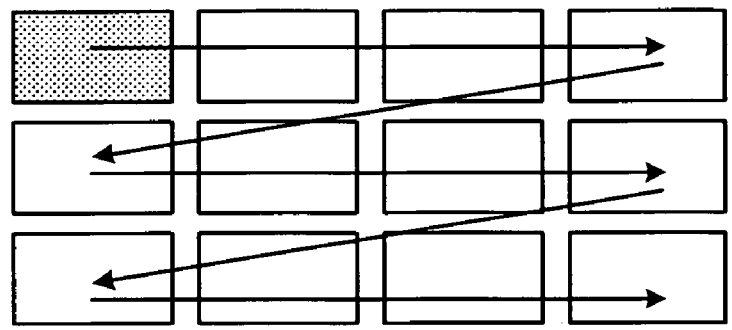
Figure 9E:
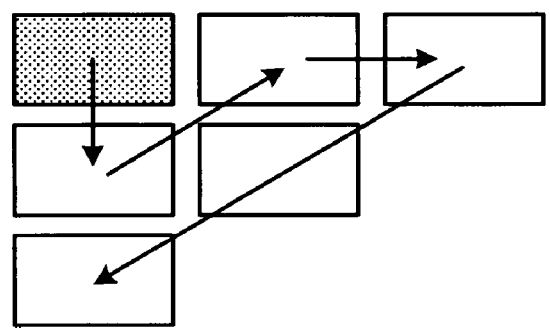
Figure 9F:
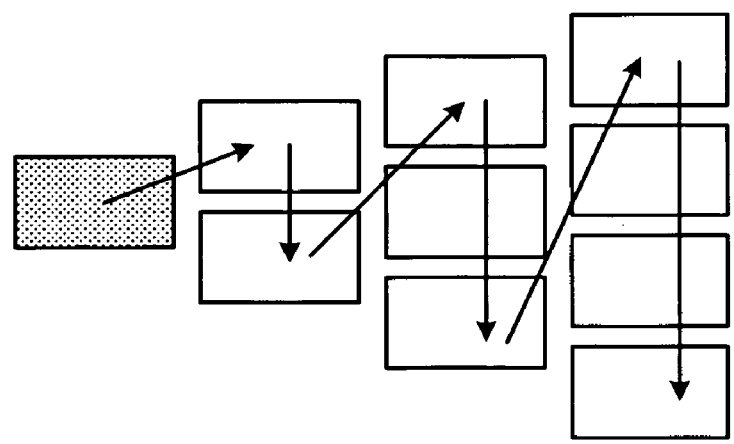

FIG. 9C is an example in which the layout positions of superposed visualized contents are shifted vertically based on the position correction information. Further, as shown in FIG. 9D, by combining the correction patterns in FIG. 9A and FIG. 9C, correction can be defined in the position correction information such that after the layout positions are corrected laterally to arrange N visualized contents, the layout positions are corrected laterally in the next row to arrange N visualized contents. FIGS. 9E and 9F are more complicated layout examples, in which correction is defined in the position correction information such that the visualized content group after the layout positions have been corrected gives the appearance of a triangle or a fan shape.

Note that the layout correction method explained above is only an example, and the correction method is not limited thereto. The layout position can be corrected so that the located visualized content group after correction gives the appearance of an arbitrary geometrical shape such as circle, oval, or diamond shape. Any layout pattern can be used so long as the correction is such that even if the layout gives the appearance of disorder, the layout method can be uniquely determined.

As the second correction method, the corrected layout position is determined by using a random value (random number). A process procedure (layout-position-correcting process procedure) involved in correction of the layout position using the random value is explained, with reference to a flowchart in FIG. 10.

The visualized-content-group locating unit 21 determines whether the corrected layout position has been determined with respect to all visualized contents to be corrected (step S401). When having determined that the corrected layout position has been determined with respect to all the visualized contents to be corrected (Yes at step S401), the visualized-content-group locating unit 21 finishes the process.

On the other hand, when having determined that there is an unprocessed visualized content (No at step S401), the visualized-content-group locating unit 21 determines one unprocessed visualized content among the visualized contents to be corrected as a visualized content to be corrected (step S402).

The visualized-content-group locating unit 21 then calculates a correction value of the position of the visualized content to be corrected at random (step S403). Subsequently, the visualized-content-group locating unit 21 respectively calculates a size of a superposed area of the visualized content to be corrected, whose layout position is determined based on the correction value calculated at step S403, and the already corrected visualized content (step S404).

The visualized-content-group locating unit 21 determines whether the size of the superposed area calculated at step S404 satisfies a predetermined criterion (step S405). It is assumed that the predetermined criteria such as a threshold have been predetermined, however, the predetermined criteria can be input by the user via the manual operating device or changed based on the operation history.

For example, if the criterion is such that the size of the superposed area is 0, the position is corrected so that there is no superposition between the visualized contents. Typically, the size of the superposed area is provided such as equal to or smaller than X. X can be an absolute area size amount, or can be instructed by a relative amount such as 10% of the area of the visualized content.

At step S405, when having determined that the criterion is not satisfied (No at step S405), the visualized-content-group locating unit 21 returns to the process at step S402. At step S405, when having determined that the criterion is satisfied (Yes at step S405), the visualized-content-group locating unit 21 respectively calculates a distance between the visualized content to be corrected, whose layout position is determined based on the correction value calculated at step S403, and the corrected visualized content (step S406). For the "distance", for example, a specific portion such as the upper left coordinate of each visualized content is defined as a position representing the visualized content, and a distance between these positions is calculated.

Subsequently, the visualized-content-group locating unit 21 determines whether the distance calculated at step S406 satisfies a predetermined distance criterion (step S407). The "distance criterion" means a condition for controlling the distance between visualized contents, and for example, for suppressing that the visualized contents are too much away from each other. It is assumed that an allowable clearance range is predetermined for the distance criterion, however, a value input by the user via the manual operating device can be used for the distance criterion or the distance criterion can be changed based on the operation history.

At step S407, when having determined that the distance condition is not satisfied (No at step S407), the visualized-content-group locating unit 21 returns to the process at step S402. At step S407, when having determined that the distance condition is satisfied (Yes at step S407), the visualized-content-group locating unit 21 determines the correction value calculated in the above process as a correction value for the position of the visualized content to be corrected (step S408), and returns to the process at step S401.

The above process is performed with respect to all the visualized contents to be corrected, to correct the layout position thereof based on the determined correction value. Accordingly, the visualized contents are located at random in a range satisfying the specific criteria (superposition amount and distance).

As the third correction method, there is a method of combining the first and the second methods. At first, a rough correction position is determined according to the first method, and the position is further corrected according to the random value. As the correction method according to the random value, the same procedure as that in the layout-position determining process (see FIG. 10) can be used. At this time, it is preferred to use a smaller value than that in the second method for the distance criterion. Accordingly, in the first method, the visualized contents are arranged uniformly, whereas in the second method, the visualized contents can be arranged with the orderliness being broken to some extent. Therefore, a layout orderly macroscopically and disorderly microscopically can be realized.

As the fourth correction method, the layout position of the visualized content group to be corrected is corrected based on overall criteria. For example, the visualized content groups to be corrected are connected by using a spring model, and a layout in which energy of the spring model is balanced in a network formed of the visualized content groups connected by the spring model is obtained, which is then used as each correction position.

The first method is for orderly layout and the second method is for disorderly layout. The fourth method has the advantages thereof. That is, individually, the visualized content looks like being located disorderly, however, as a whole, visualized contents are located orderly. Various known methods have been proposed for the spring model, and these methods can be used.

Further, not only the simple spring model, but also a crowd simulation method can be used, considering the visualized content group as a crowd, to determine the layout of the visualized content group, thereby enabling correction of the layout position. As the crowd simulation, for example, Boid model can be used. Note that the method explained above is only an example and the correction method is not limited thereto, and an arbitrary correction method can be used freely.

According to the above process, for example, when there are five visualized contents other than the content to be processed, the five visualized contents are respectively located at positions near the edge of the truncated cone in the virtual space, according to the genre and degree of relevance thereof (visualized contents 202a to 202e in FIGS. 8A and 8B). The visualized content of the content to be processed is located at the position of the origin (the visualized content 201 in FIGS. 8A and 8B).

Returning to FIG. 1, the space visualizing unit 22 performs image processing and CG processing for each visualized content, whose layout position has been determined by the visualized-content-group locating unit 21, using any one of the degree of relevance calculated by the content relevance calculator 18, the information used at the time of visualization by the content visualizing unit 20, and information of the layout result obtained by the visualized-content-group locating unit 21, to visualize the status of the space including the visualized content group under a predetermined viewing condition.

Figure 11:
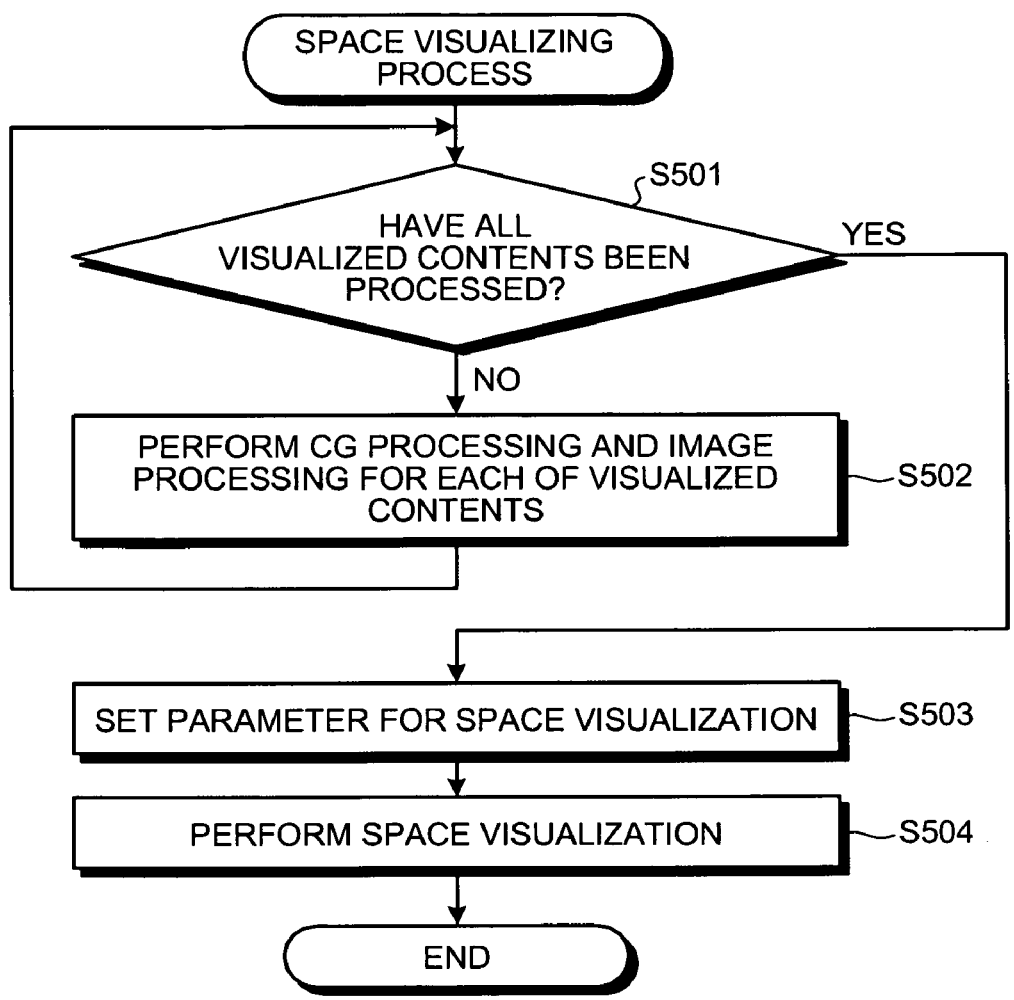
FIG. 11 is a flowchart of a space-visualizing process procedure according to the first embodiment.

The operation of the space visualizing unit 22 is explained with reference to FIG. 11. FIG. 11 is a flowchart of a space-visualizing process procedure performed by the space visualizing unit 22.

The space visualizing unit 22 first determines whether the process at step S502 has been performed with respect to all the visualized contents (step S501). "All the visualized contents" means the visualized content group located in the virtual space by the visualized-content-group locating unit 21.

At step S501, when the space visualizing unit 22 determines that the process at step S502 has been performed with respect to all the visualized contents (Yes at step S501), the space visualizing unit 22 proceeds to the process at step S503. At step S501, when having determined that there is an unprocessed visualized content (No at step S501), the space visualizing unit 22 performs the CG processing and image processing for each of the unprocessed visualized content (step S502), and returns to step S501. In the process at step S502, various types of CG processing and image processing are performed. Specific CG processing and image processing are explained below with reference to several examples.

As the image processing, for example, it can be considered to apply a blur filter to the image frame contained in the visualized content according to the layout position (All in FIG. 4). As the blur filter, there are a Gaussian filter, a low-pass filter, a mean value filter, and a median filter, and a degree of application thereof to the image is changed according to the layout position of the visualized content, for example, the Z value. Specifically, as the Z value decreases, blur is strengthened. Accordingly, when the virtual space is seen based on the Z-axis information, there is such an effect that as the visualized content is located far away, the image frame therein becomes more obscure. An example in which "blur" is applied as the image processing is shown above, however, arbitrary CG processing can be performed. An arbitrary image processing can be applied to an arbitrary portion of the visualized content.

As an example of CG processing, for example, it can be mentioned to make the visualized content semitransparent. The visualized content is realized, for example, by the polygon in the CG, as described above. By changing a parameter of an apex of the polygon, for example, an alpha value, the polygon can be made semitransparent. Accordingly, even if many visualized content groups are arranged as shown in FIG. 5, there is such an effect that a visualized content hidden under a certain visualized content can be seen through. An example in which a process for making the visualized content semitransparent is performed as the CG processing is shown above, but the CG processing is not limited thereto, and arbitrary CG processing can be performed.

Subsequently, the space visualizing unit 22 sets the parameter for space visualization (step S503). Specifically, the space visualizing unit 22 set from which direction the virtual space is to be visualized, that is, the parameters such as a position, a direction, and a range of a camera (viewpoint) for rendering the virtual space in the CG. Simultaneously, as required, the space visualizing unit 22 can set parameters such as a position, a direction, and a range of a light source for rendering the space.

In the process at step S503, the space visualizing unit 22 sets a visualizing range at the time of rendering and how to perform rendering. Various methods can be used for setting rendering. For example, a shader program is used to define several rendering methods beforehand, and a shader program to be used is determined therefrom according to a user input or by using a system setting value, which is set in the GPU of the controller.

The space visualizing unit 22 then performs visualization of the virtual space by rendering the virtual space according to the parameters for space visualization set at step S503 (step S504), to finish the process. Specifically, the space visualizing unit 22 renders the CG space according to the CG parameters set at steps up to S503. Accordingly, the status of the visualized content group located in the virtual space by the visualized-content-group locating unit 21 is visualized.

In the process at step S504, for example, if a CG method referred to as volume shadow is used, when the visualized contents are superposed back and forth, a shadow of the content in front can be thrown over the content at the back. At this time, a light is set in front of the content group, over which it is desired to throw a shadow, so that the shadow is added by using the volume shadow method.

The same effect can be realized by performing image processing with respect to the rendered image as a post effect. Additionally, at step S504, information added to the visualized content can be also visualized. For example, as shown in FIG. 8A, an axis representing each orientation on the XY plane, genre names allocated to each orientation, and an isotimic surface of the truncated cone are simultaneously rendered, and superimposed on rendering of the previous visualized content group. Further, image processing by the post effect process can be performed with respect to the rendered image, or rendering can be further performed with respect to the rendered image by using another shader program, thereby obtaining a new rendered image. Thus, an image in which the laid out visualized content group is seen from a specific viewpoint is generated.

Returning to FIG. 1, the display unit 23 displays the virtual space visualized by the space visualizing unit 22 on a display screen. Specifically, an image representing the rendering result by the space visualizing unit 22 is displayed.

Figure 12:
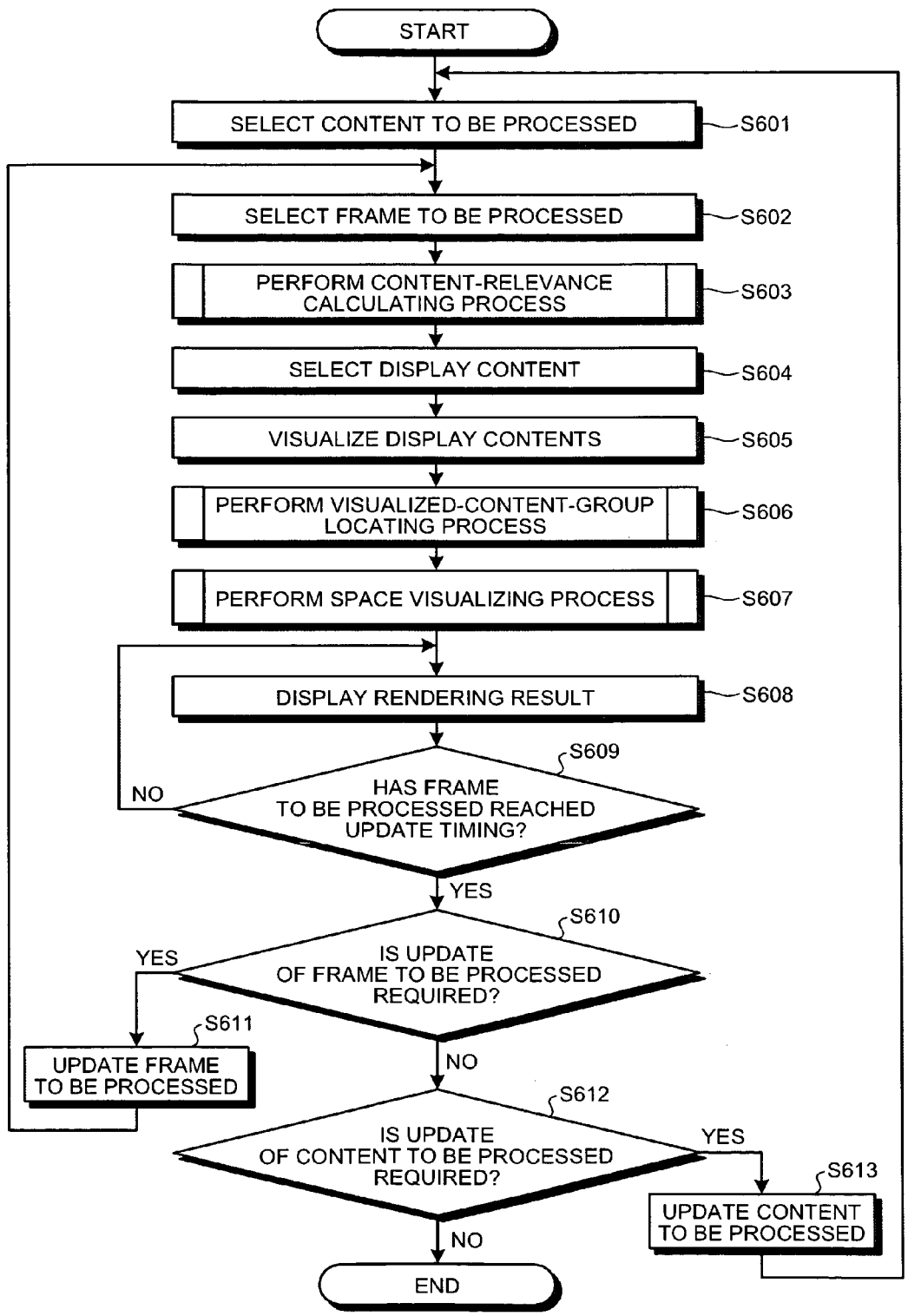
FIG. 12 is a flowchart of an image-display process procedure according to the first embodiment.

The overall operation of the image display apparatus 100 according to the first embodiment is explained with reference to FIG. 12. FIG. 12 is a flowchart of an image-display process procedure performed by each functional unit in the image display apparatus 100.

The processing-content selecting unit 12 selects a content to be processed from the content group accumulated in the moving picture database 11 (step S601). Subsequently, the processing-frame selecting unit 13 selects a frame to be processed from the frame group contained in the content to be processed selected at step S601 (step S602).

The content relevance calculator 18 performs the content-relevance calculating process, to generate a list indicating the degree of relevance between the content to be processed and the content group to be searched (step S603). The content-relevance calculating process at step S603 is the same as that explained with reference to FIG. 3, and therefore explanations thereof will be omitted.

The display-content selecting unit 19 selects a content conforming to the predetermined condition as the display content based on the list of the degree of relevance generated at step S603, together with the content to be processed (step S604). The content visualizing unit 20 then performs visualization of these display contents (step S605).

The visualized-content-group locating unit 21 performs the visualized-content-group locating process with respect to each content visualized at step S605 (visualized content), to locate each visualized content at a predetermined position in the virtual space (step S606). The visualized-content-group locating process at step S606 is the same as that explained with reference to FIG. 7, and therefore explanations thereof will be omitted.

Subsequently, the space visualizing unit 22 performs the space visualizing process to render the virtual space in which the visualized content group is located at step S606 under the predetermined viewing condition (step S607), and allows the display unit 23 to display the rendering result (step S608).

The processing-frame selecting unit 13 determines whether the frame to be processed has reached the update timing (step S609). Specifically, when the content to be processed is a moving picture with a frame rate of 30 frames/sec, the update timing is at an interval of about 33 msecs (1000 msecs/30 frames). When having determined that the timing has passed (Yes at step S609), the processing-frame selecting unit 13 determines that it is the update timing and proceeds to the process at step S610. Otherwise, the processing-frame selecting unit 13 returns to step S608 to repeat the screen display. That is, when the display is provided at an interval of less than the update timing, the same image is displayed.

At step S610, the processing-frame selecting unit 13 determines whether update of the frame to be processed is required (step S610). Determination criterion whether update of the frame to be processed is required is not particularly limited. However, in the first embodiment, when a frame is present after the frame to be processed in the content to be processed, that is, when it is determined that there is an undisplayed frame, it is determined that update of the frame to be processed is required.

At step S610, when having determined that update of the frame to be processed is required (Yes at step S610), the processing-frame selecting unit 13 updates the frame to be processed (step S611), and returns again to the process at step S602. Update of the frame to be processed means clearing the current frame to be processed.

By returning to the process at step S602, the processing-frame selecting unit 13 selects a new frame updated at step S611 as the frame to be processed. In the first embodiment, a frame next to the frame previously selected as the frame to be processed is selected as the frame to be processed after update. However, the selection method of the frame to be processed after update is not limited thereto. For example, when the content to be processed is divided into chapters, a first frame in the next chapter (or an arbitrary frame contained in the next chapter) can be selected. When the current frame is the last frame, the first frame can be selected.

By performing processes at steps S603 to S608, a state where a content group having a high degree of relevance with the frame to be processed after update is located in the virtual space according to the relevance can be observed. That is, if the frame to be processed changes, a selection method of the related content group, and the layout in the virtual space also change accordingly. Therefore, a state where visualization of the space dynamically changes with transition of the frame to be processed can be observed.

On the other hand, at step S610, when it is determined that update of the frame to be processed is not required (No at step S610), the processing-content selecting unit 12 determines whether update of the content to be processed is required (step S612). In the first embodiment, whether update is required or not is determined based on an instruction by the user. For example, when another content is selected as a new content to be processed by the user via the manual operating device, it is determined that update of the content to be processed is required.

The determination method whether to update the content to be processed is not limited to the above method. For example, a state where the content to be processed is automatically selected by the processing-content selecting unit 12 without relying on the user input can be considered. For example, there is a case that a content having the highest degree of relevance with the current content to be processed is automatically selected as a new content to be processed. Further, there is a case that a content most recently recorded, excluding the current content to be processed, is automatically selected as a new content to be processed. Even in such cases, the processing-content selecting unit 12 determines that update of the content to be processed is required.

At step S612, when having determined that update of the content to be processed is not required (No at step S612), the processing-content selecting unit 12 finishes the process. On the other hand, at step S612, when having determined that update of the content to be processed is required (Yes at step S612), the processing-content selecting unit 12 updates the current content to be processed (step S613), and returns to the process at step S601, thereby selecting the instructed content as a new content to be processed. Update of the content to be processed means clearing the current content to be processed.

By returning to the process at step S601, the processing-content selecting unit 12 selects an instructed new content as the content to be processed according to an instruction from the display unit 23. Subsequently, the processes at steps S602 to S609 are performed, thereby enabling to observe a state where a content group having a high degree of relevance with the content to be processed after update is located in the virtual space according to the relevance. That is, when the content to be processed changes, a selection method of the related content group, and the layout in the virtual space also change accordingly. Therefore, a state where visualization of the space dynamically changes with transition of the content to be processed can be observed.

Thus, by sequentially shifting the frame to be processed along a time series flow of the frames, the content to be processed itself is reproduced. Therefore, for example, the visualized content 201 located at the center of FIG. 8A is reproduced as a moving picture. With transition of the reproduced frames, a state where at least one of the entire moving picture and a content group having a high degree of relevance with the current frame in the moving picture are laid out around the visualized content 201 is displayed on the screen.

Figure 13A:
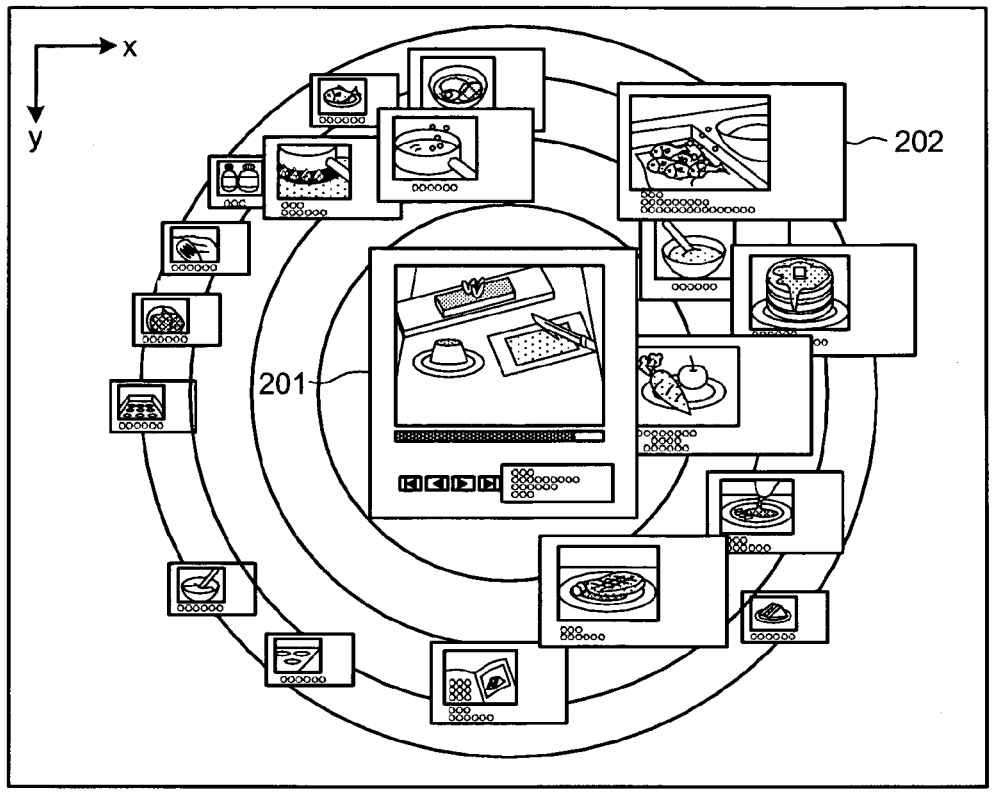
FIG. 13A is a diagram illustrating one example of the visualized content located in the virtual space.
Figure 13B:
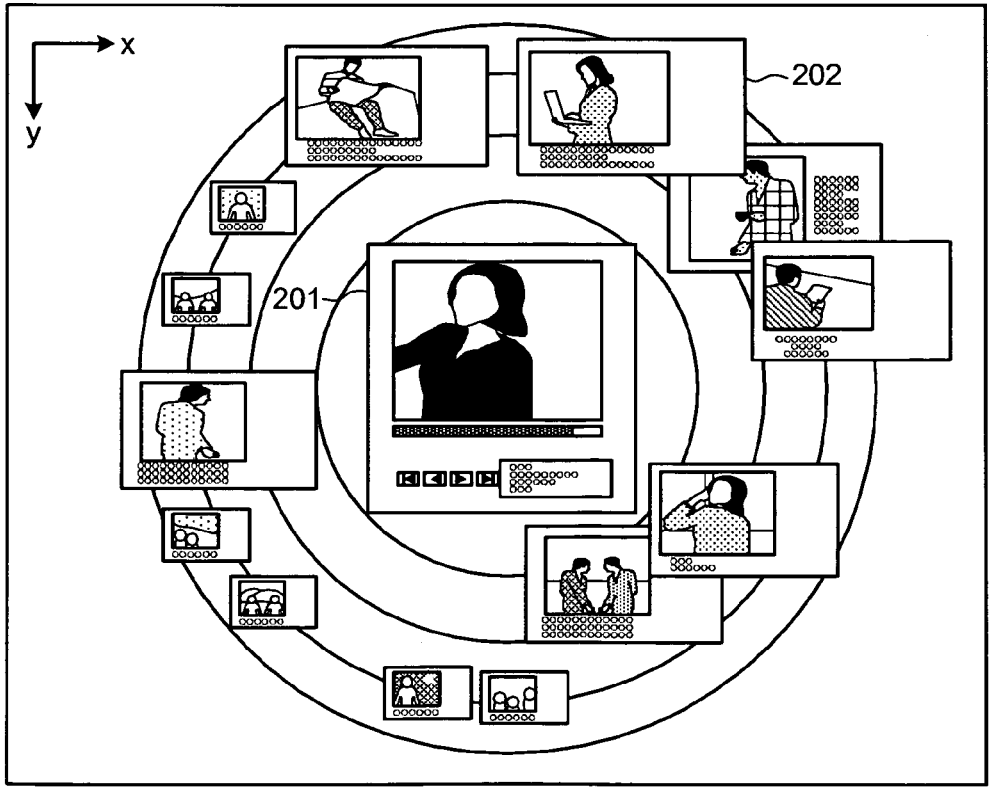
FIG. 13B is a diagram illustrating another example of the visualized content located in the virtual space.

FIGS. 13A and 13B are schematic diagrams for explaining the operation in the image display process. As shown in FIG. 13A, for example, a frame image relating to cooking is displayed in the visualized content 201 corresponding to the content to be processed, a content group having a high degree of relevance with the frame to be processed (for example, a cooking show or the like) is laid out around the visualized content 201.

When the frame displayed in the visualized content 201 is changed over, and as shown in FIG. 13B, a frame image relating to a particular person is displayed, and a content group having a high degree of relevance with the frame to be processed expressing the particular person is laid out around the visualized content 201, with the changeover of the frame. Accordingly, a content group and layout different from those shown in FIG. 13A are displayed.

According to the image display apparatus 100 in the first embodiment, the relevance between the content to be processed and the display content can be expressed by positional relationship of visualized contents located in the virtual space, thereby enabling to visualize the relevance between the content to be processed and the display content. Accordingly, the user can easily understand how the content group having the high degree of relevance with the content to be processed is distributed in the moving picture database 11.

In the first embodiment, the moving picture database 11 is provided in the storage unit. However, the moving picture database 11 can be provided in other places. For example, the database used for storage and acquisition of data is not limited to the HDD, and other storage medium such as DVD-RAM can be used. A storage area for accumulating and managing data in the moving picture database 11 is not limited to a single storage area, and can be accumulated over storage areas in a plurality of storage media such as HDD and DVD-RAM, and each storage area needs not be in the same equipment. Further, when it is necessary to access the moving picture database 11 in network-connected another apparatus via the communication unit, one moving picture database 11 can be formed by combining the moving picture database 11 in the own apparatus and the moving picture database 11 in another apparatus.

A first modification of the first embodiment is explained next. Like reference numerals are designated to like configurations in the image display apparatus 100, and explanations thereof will be omitted.

Figure 14:
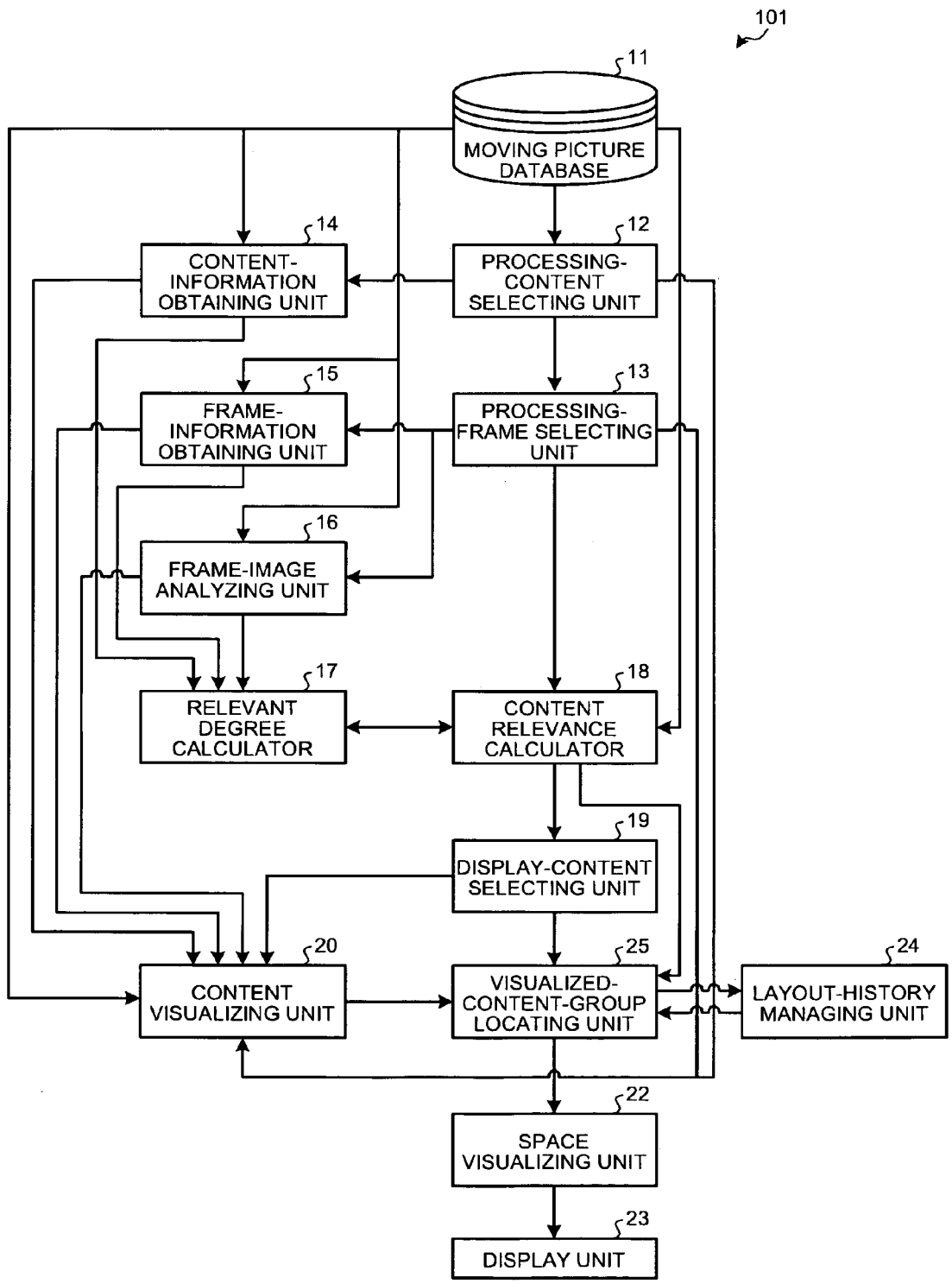
FIG. 14 is a diagram illustrating a configuration of an image display apparatus according to a first modification of the first embodiment.

FIG. 14 is a block diagram of a functional configuration of an image display apparatus 101 according to the first modification of the first embodiment. As shown in FIG. 14, the image display apparatus 101 includes a layout-history managing unit 24 and a visualized-content-group locating unit 25 in addition to the moving picture database 11, the processing-content selecting unit 12, the processing-frame selecting unit 13, the content-information obtaining unit 14, the frame-information obtaining unit 15, the frame-image analyzing unit 16, the relevant degree calculator 17, the content relevance calculator 18, the display-content selecting unit 19, the content visualizing unit 20, the space visualizing unit 22, and the display unit 23.

The layout-history managing unit 24 is a functional unit realized by the storage unit. The visualized-content-group locating unit 25 is a functional unit realized by executing various programs stored in the storage unit by the controller.

The layout-history managing unit 24 stores and manages as history information the content information of the respective visualized contents determined by the visualized-content-group locating unit 25 corresponding to the layout position and the degree of relevance thereof. The layout-history managing unit 24 reads the history information in response to a request from the visualized-content-group locating unit 25 and outputs the history information to the visualized-content-group locating unit 25. The number of pieces of the history information to be stored is not particularly limited, and can be arbitrarily set according to the use environment.

The visualized-content-group locating unit 25 has the same function as the visualized-content-group locating unit 21, and refers to the history information stored and managed by the layout-history managing unit 24 to use the history information at the time of calculating the layout position of the visualized content, which is the current layout target.

Specifically, for example, when having determined that a visualized content matches the content information of the visualized content, which is the current layout target, and the degree of relevance thereof is the same as or similar to the degree of relevance obtained one step before by the layout-history managing unit 24, the visualized-content-group locating unit 25 does not calculate the layout position thereof, and designates the layout position stored corresponding to the degree of relevance as the layout position of the visualized content. Determination whether the degree of relevance is "similar" or not can be performed based on a relational expression of, for example, $|X0-X1|<\epsilon$, where $X0$ denotes a degree of relevance of the visualized content, which is the current layout target, $X1$ denotes a degree of relevance stored in the history information (for example, the degree of relevance of a visualized content, which is the previous layout target), and $\epsilon$ is an arbitrary small constant. The value of $\epsilon$ can be different for each repetition of the image display process described later.

When having determined that a visualized content matches the content information of the visualized content, which is the current layout target, and the degree of relevance thereof is different from the degree of relevance obtained one step before by the layout-history managing unit 24, that is, $|X0-X1|>\epsilon$, the visualized-content-group locating unit 25 refers to the layout position contained in the history information for the past several steps, of the history information including the same content information as that of the visualized content, which is the current layout target, to correct the calculated layout position. Correction of the layout position is performed in the following manner. That is, layout positions for the past several steps are stored as the time series data, and parametric curve interpolation such as spline interpolation is performed so that the layout positions become smooth, thereby interpolating so that the current layout position does not largely deviate from the interpolation curve. Note that the above method is merely an example, and various methods can be used for the interpolation method.

Figure 15:
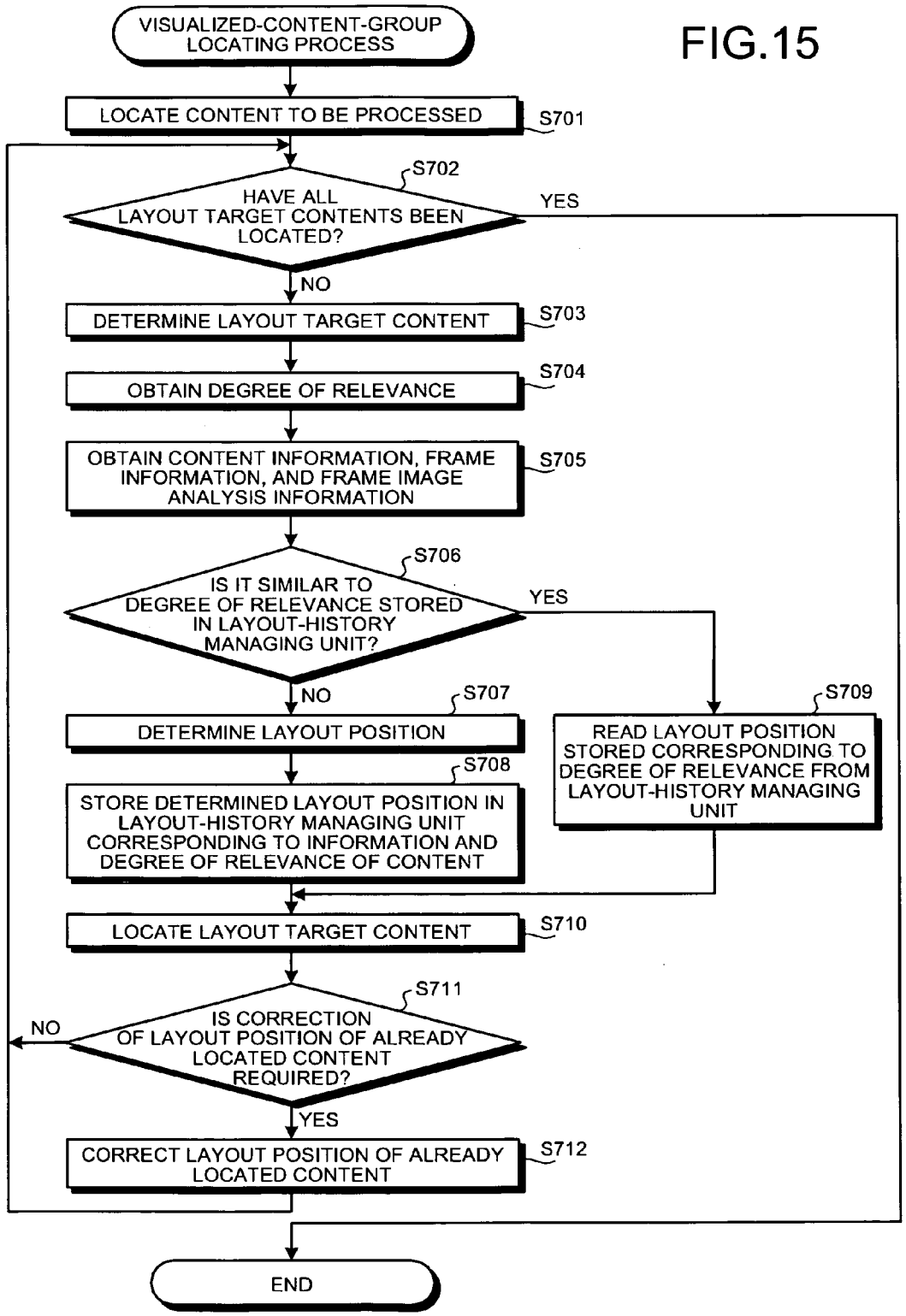
FIG. 15 is a flowchart of a process in a visualized-content-group locating process according to the first modification of the first embodiment.

The operation of the visualized-content-group locating unit 25 is explained with reference to FIG. 15. FIG. 15 is a flowchart of a visualized-content-group locating process procedure performed by the visualized-content-group locating unit 25. The visualized-content-group locating unit 25 first locates the content to be processed in the virtual space (step S701).

The visualized-content-group locating unit 25 then determines whether all the layout target contents have been located (step S702). The "layout target content" means a content, in which each content group to be displayed selected by the display-content selecting unit 19 is visualized by the content visualizing unit 20.

At step S702, when having determined that all the contents to be located have been located (Yes at step S702), the visualized-content-group locating unit 25 finishes the process. On the other hand, at step S702, when having determined that there is an unlocated visualized content (No at step S702), the visualized-content-group locating unit 25 determines a layout target content to be located next (step S703).

Subsequently, the visualized-content-group locating unit 25 obtains the degree of relevance of the layout target content (visualized content) determined at step S703 from the content relevance calculator 18 (step S704).

The visualized-content-group locating unit 25 obtains any one piece or all pieces of information including at least the content information of the content information, the frame information, and the frame image analysis information of the visualized content determined at step S703 (step S705). These pieces of information are obtained from the content-information obtaining unit 14, the frame-information obtaining unit 15, and the frame-image analyzing unit 16, and the visualized-content-group locating unit 25 obtains the information via the content visualizing unit 20.

Subsequently, the visualized-content-group locating unit 25 refers to the history information stored and managed by the layout-history managing unit 24, to determine whether there is the history information the same as the content information obtained at step S705, and having the same as or similar to the degree of relevance obtained at step S704 (step S706).

At step S706, when having determined that there is no history information (No at step S706), the visualized-content-group locating unit 25 determines the layout position of the layout target content determined at step S703 according to the same process as at step S306 in FIG. 7 (step S707). At step S707, the visualized-content-group locating unit 25 refers to the layout position contained in the history information for the past several steps, of the history information including the content information the same as the content information of the visualized content, which is the current layout target, to correct the calculated layout position.

The visualized-content-group locating unit 25 stores as the history information the content information of the visualized content, which is the current layout target, corresponding to the layout position determined at step S707 and the degree of relevance obtained at step S704 (step S708), and proceeds to the process at step 710.

On the other hand, at step S706, when having determined that there is the history information having the same as or similar to the degree of relevance obtained at step S704 (Yes at step S706), the visualized-content-group locating unit 25 reads the layout position stored corresponding to the degree of relevance from the layout-history managing unit 24 to determine the read layout position as the layout position of the layout target content this time (step S709), and proceeds to the process at step S710.

At step S710, the visualized-content-group locating unit 25 locates the layout target content at the layout position determined at steps S707 or S709 by performing the same process as at step S307 in FIG. 7 (step S710).

The visualized-content-group locating unit 25 determines whether correction of the layout position of the already located content is required. When having determined that the correction is not required (No at step S711), the visualized-content-group locating unit 25 returns to the process at step S702 again. On the other hand, at step S711, when having determined that the correction of the layout position of the already located content is required (Yes at step S711), the visualized-content-group locating unit 25 corrects the layout position of the already located content (step S712), and proceeds to the process at step S702.

When the above visualized-content-group locating process is to be performed, a destination of a recursive loop in the case of No at step S609 in the image display process (see FIG. 12) is designated as step S606. In the visualized-content-group locating process at step S606, the visualized-content-group locating process shown in FIG. 15 is performed.

Thus, according to the configuration in the first modification of the first embodiment, not only a calculation amount in layout position calculation of the visualized content can be reduced, but also it can be suppressed that the layout position of each visualized content, which changes according to a change of the frame to be processed, moves discontinuously. Accordingly, the visualized content located in the virtual space looks like smoothly moving. Specifically, a visualized position can be calculated at a timing less than the display timing of the frame (for example, less than about 33 msecs), thereby enabling a screen display reflecting a space visualization result at the timing less than the update timing of the frame. Accordingly, a display rate of the space visualization result can be improved, and smooth display can be realized.

A second modification of the first embodiment is explained next. Like reference numerals are designated to like configurations in the image display apparatus 100, and explanations thereof will be omitted.

Figure 16:
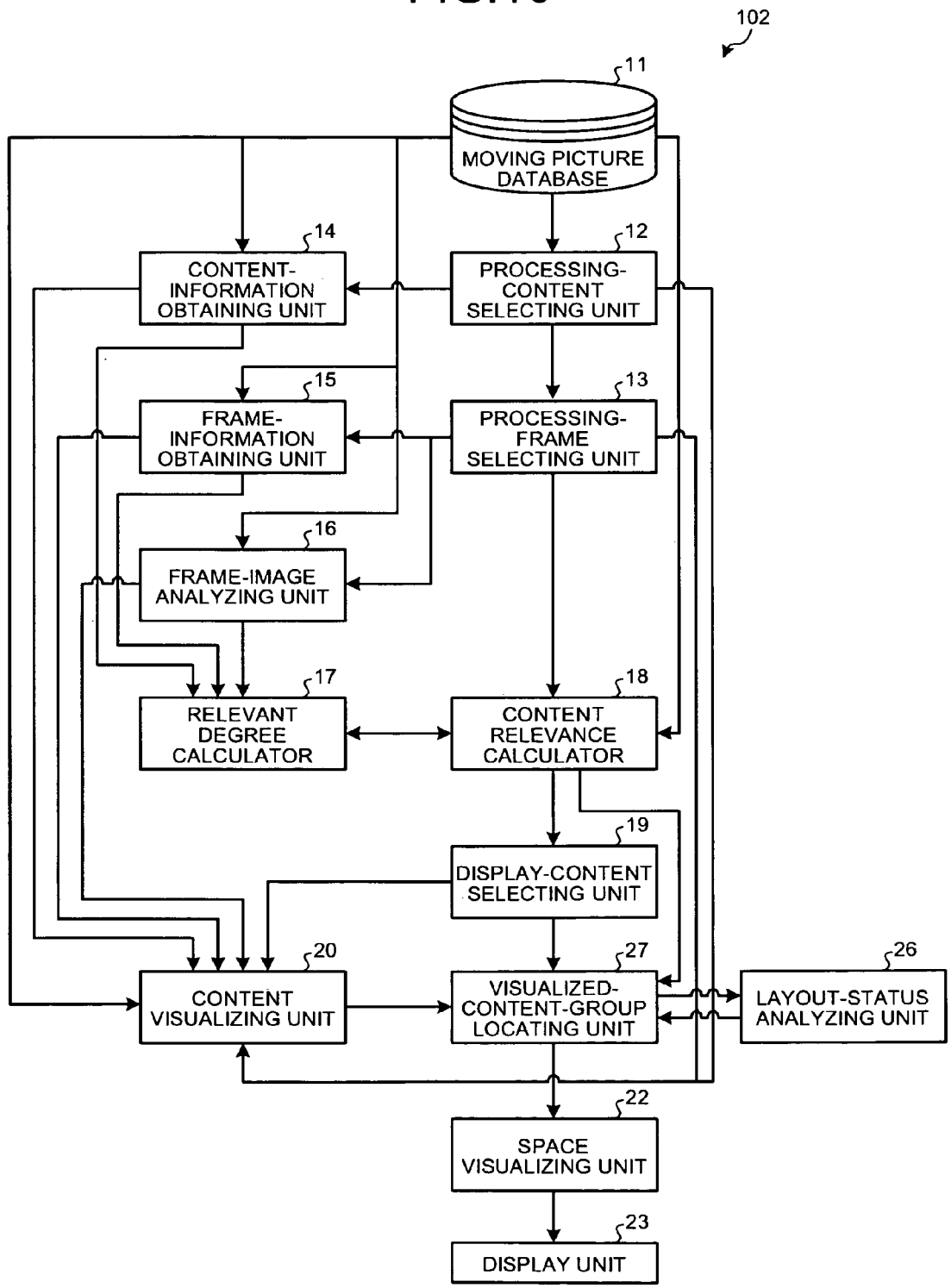
FIG. 16 is a diagram illustrating a configuration of an image display apparatus according to a second modification of the first embodiment.

FIG. 16 is a block diagram of a functional configuration of an image display apparatus 102 according to the second modification of the first embodiment. As shown in FIG. 16, the image display apparatus 102 includes a layout-status analyzing unit 26 and a visualized-content-group locating unit 27 in addition to the moving picture database 11, the processing-content selecting-unit 12, the processing-frame selecting unit 13, the content-information obtaining unit 14, the frame-information obtaining unit 15, the frame-image analyzing unit 16, the relevant degree calculator 17, the content relevance calculator 18, the display-content selecting unit 19, the content visualizing unit 20, the space visualizing unit 22, and the display unit 23.

The layout-status analyzing unit 26 and the visualized-content-group locating unit 27 are functional units realized by executing various programs stored in the storage unit by the controller.

The layout-status analyzing unit 26 analyzes the status of the layout position of the visualized content group determined by the visualized-content-group locating unit 27, to determine a biased state of a layout of the visualized content group (for example, the layout is biased to a specific area, a specific area is congested or sparse, or the like), and feeds back the result to the visualized-content-group locating unit 27. Specifically, the layout-status analyzing unit 26 analyzes a ratio of the amount of the visualized contents located for each genre to calculate a rate of the number of layouts for each genre, and outputs the result to the visualized-content-group locating unit 27. The layout-status analyzing unit 26 calculates the number of layouts per unit area in the virtual space and outputs the result to the visualized-content-group locating unit 27.

The visualized-content-group locating unit 27 basically performs the same operation as that in the first embodiment, and also changes the layout position of the visualized content group, using the feedback of the layout-status analysis result input from the layout-status analyzing unit 26. In the first embodiment, calculation of the layout position has been explained with reference to FIG. 8A. The operation of the visualized-content-group locating unit 27 is explained by using the same example.

Figure 17A:
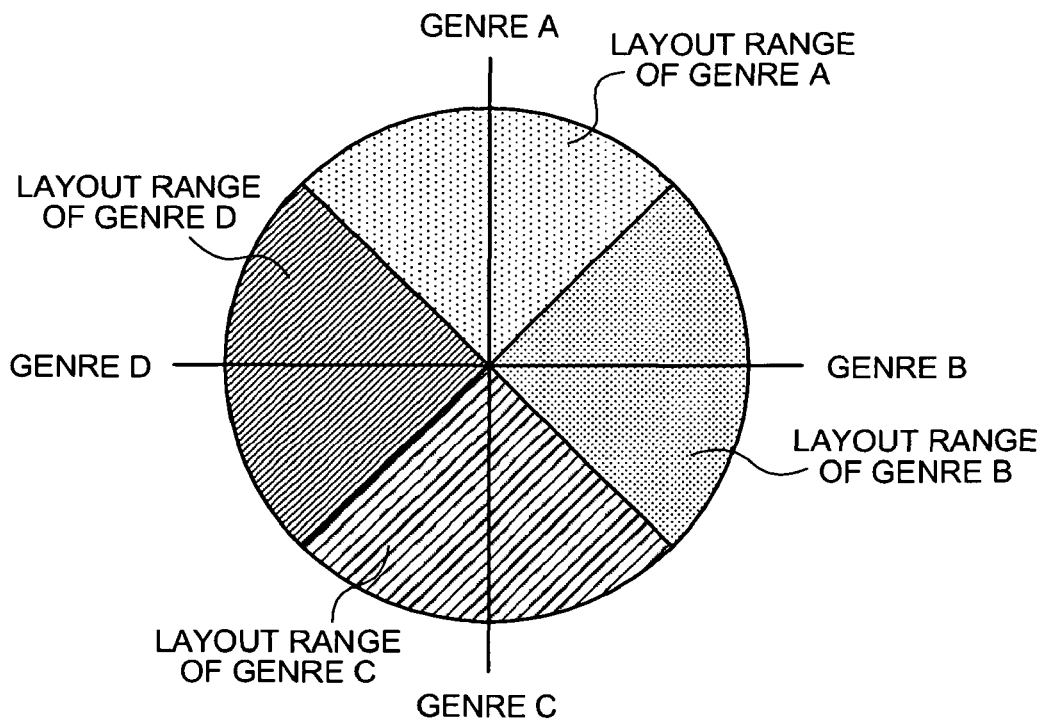
FIG. 17A is a diagram illustrating one example of a layout-status analysis result by a layout-status analyzing unit shown in FIG. 16.

To simplify the explanation, it is assumed that there are four genres A, B, C, and D. If the ratio of the number of layouts of the visualized contents in the genres A, B, C, and D is 1:1:1:1, as the analysis result of layout status by the layout-status analyzing unit 26, the visualized-content-group locating unit 27 assigns, as shown in FIG. 17A, a one-quarter area obtained by the ratio to each layout range of the genres A, B, C, and D.

Figure 17B:
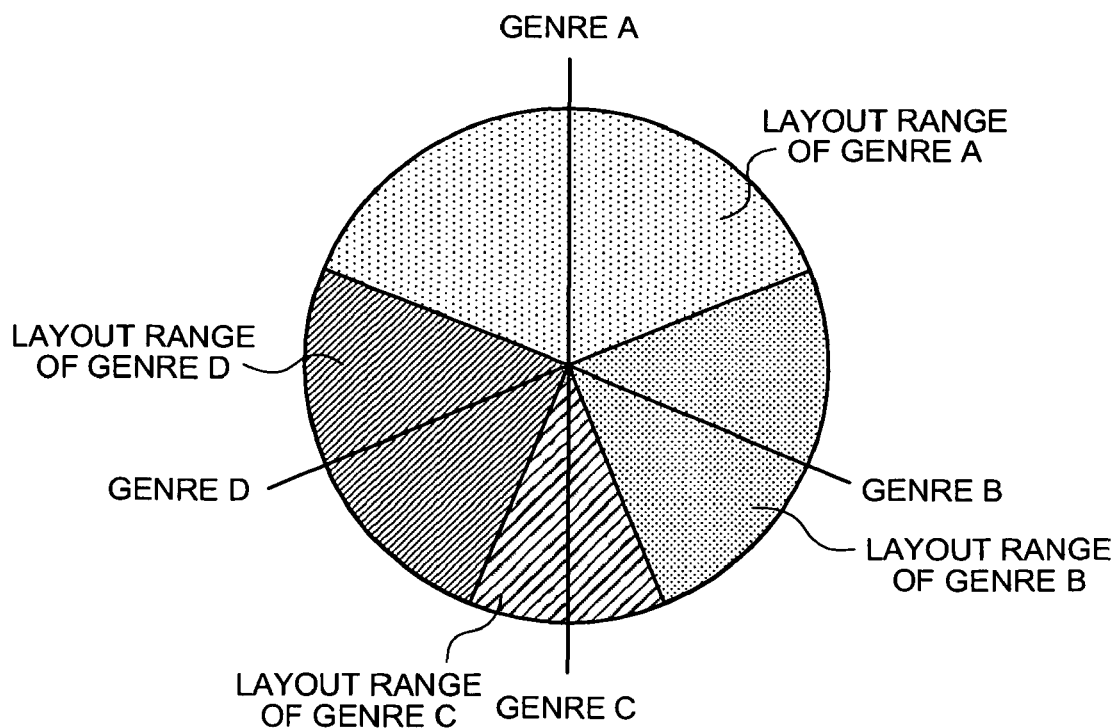
FIG. 17B is a diagram illustrating another example of a layout-status analysis result by the layout-status analyzing unit shown in FIG. 16.

If the ratio of the number of layouts of the visualized contents in the genres A, B, C, and D is 3:2:1:2, as shown in FIG. 17B, the visualized-content-group locating unit 27 assigns three-eighth, one-fourth, one-eighth, and one-fourth areas obtained by the ratio to respective layout ranges of the genres A, B, C, and D. Specifically, the visualized-content-group locating unit 27 determines the layout position at step S306 and corrects the layout position at step S309 in FIG. 7, so that the contents are located in the respective areas.

When the layout position is not corrected by the layout-status analyzing unit 26 and the visualized-content-group locating unit 27, if there is a difference with respect to the genres in the visualized content group, the virtual space after layout will have a part in which the visualized contents are densely located and a part in which the visualized contents are hardly located. Accordingly, there is a problem that it is hard to see the visualized contents located densely. However, if the layout range is adaptively changed according to the amount of the located contents, such a problem is solved, and even if there is a difference in the tendency of the genres of the visualized contents, the visualized contents can be always located in a viewable position.

The layout calculated by using the "layout amount per unit of visualized content" as the analysis result of the layout status by the layout-status analyzing unit 26 can be changed. The "layout amount per unit of visualized content" means a numerical value (density) indicating how many visualized contents are located in a unit area in the virtual space. The visualized contents are located densely where the density is high, and are located sparsely where the density is low.

Figure 18A:
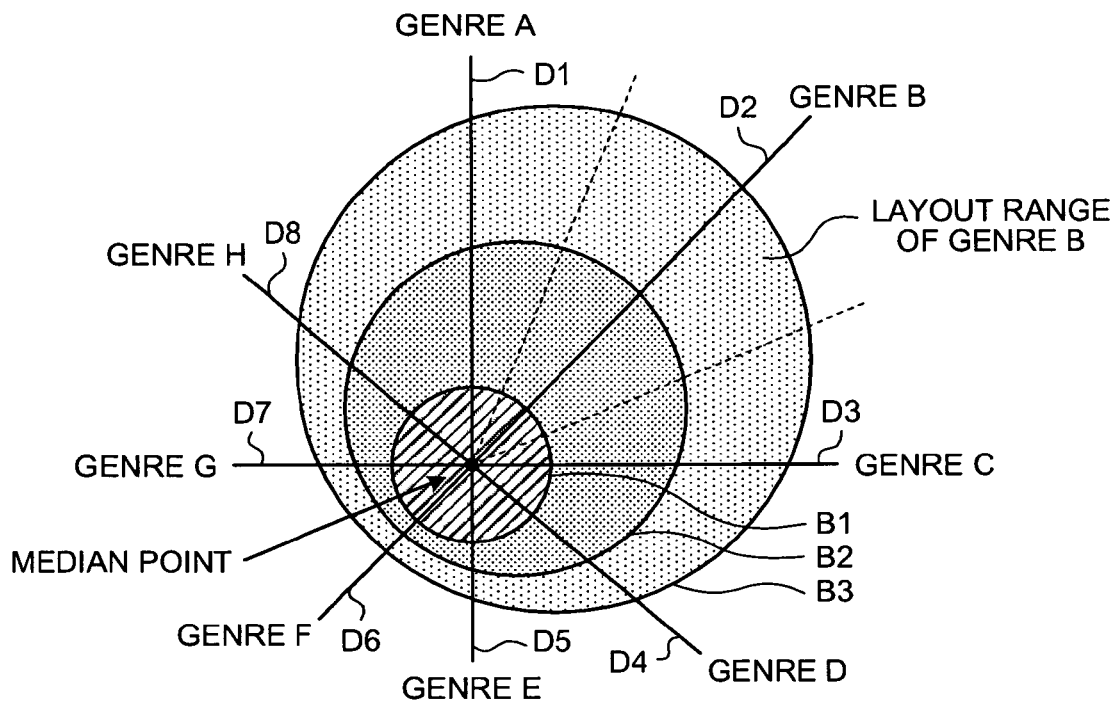
FIG. 18A is a diagram illustrating an example in which each genre is mapped in the virtual space according to the analysis result by the layout-status analyzing unit shown in FIG. 16.
Figure 18B:
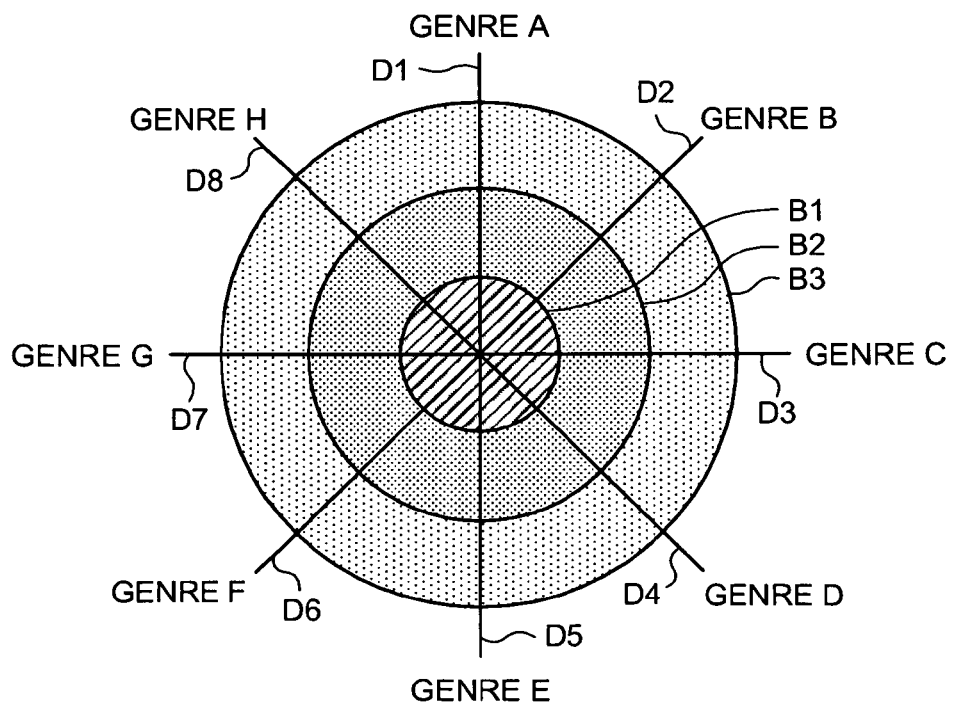
FIG. 18B is a diagram illustrating a default status of each genre mapped in the virtual space.

Therefore, for example, if a reciprocal of the layout amount (layout density) is defined in the space, to obtain a spatial median point, an equilibrium position (median point) of density is determined in the space. An example in which the genres are mapped in the orientation directions on the XY plane in the virtual space, using the equilibrium position as an origin is shown in FIG. 18A. FIG. 18B is a comparison to FIG. 18A, and FIG. 18B depicts a default state (corresponds to the state of FIGS. 8A and 8B) where a center of truncated cones B1, B2, and B3 is designated as the origin.

After the origin is shifted in this manner, calculation and correction of the layout position of visualized contents are performed. Accordingly, a layout position larger than before is allocated to the part dense before the feedback of the analysis result (see the layout range of a genre B in FIG. 18A). At this time, for example as shown in FIG. 19, the shift is realized three-dimensionally by shifting an apex of the cone from the position of the origin to the calculated median point. Accordingly, the part where the layout has been dense and it has been hard to see the visualized contents is eliminated, thereby enabling to obtain an easily viewable display as a whole.

The calculation method of the median point explained above is only an example. When the reciprocal of the layout amount (layout density) is defined in the space to obtain the spatial median point, projection can be performed onto the XY plane to calculate a two-dimensional median point, and the original Z value can be used for the position of the median point. Further, the Z value can be converted to a discrete value in a certain width, to calculate the position of the median point, respectively, for each width of the discrete value.

Therefore, according to the second modification of the first embodiment, when the virtual space is visualized, the part where the visualized contents are densely located is eliminated so that the visualized contents in the part can be easily seen. The method according to the ratio (rate) and the method according to the median point of the reciprocal of density explained above are only examples, and the correction method is not limited thereto. Any correction method of the layout position can be similarly used, so long as the method can eliminate dense and sparse layouts at the time of space layout, using the analysis result of the layout status.

A third modification of the first embodiment is explained next. Like reference numerals are designated to like configurations in the image display apparatus 100, and explanations thereof will be omitted.

Figure 20:
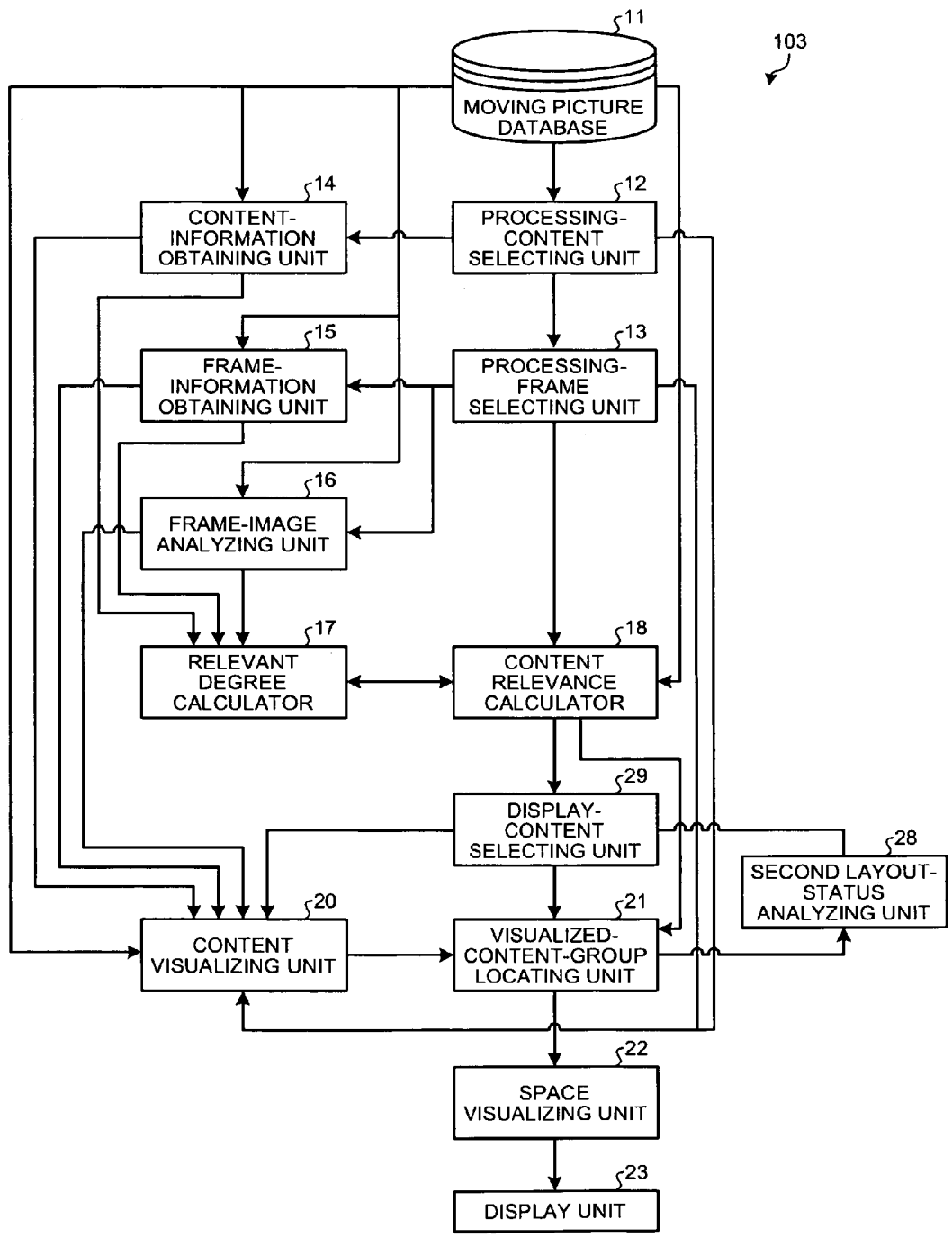
FIG. 20 is a diagram illustrating a configuration of an image display apparatus according to a third modification of the first embodiment.

FIG. 20 is a block diagram of a functional configuration of an image display apparatus 103 according to the third modification of the first embodiment. As shown in FIG. 20, the image display apparatus 103 includes a second layout-status analyzing unit 28 and a display-content selecting unit 29 in addition to the moving picture database 11, the processing-content selecting unit 12, the processing-frame selecting unit 13, the content-information obtaining unit 14, the frame-information obtaining unit 15, the frame-image analyzing unit 16, the relevant degree calculator 17, the content relevance calculator 18, the content visualizing unit 20, the visualized-content-group locating unit 21, the space visualizing unit 22, and the display unit 23.

The second layout-status analyzing unit 28 and the display-content selecting unit 29 are functional units realized by executing various programs stored in the storage unit by the controller.

The second layout-status analyzing unit 28 analyzes a state of the layout position of the visualized content group determined by the visualized-content-group locating unit 21, thereby determining a biased state of the layout of the visualized content group (for example, the layout is biased to a specific area, a specific area is congested or sparse, or the like), and feeds back the result to the display-content selecting unit 29. The specific operation of the second layout-status analyzing unit 28 is the same as that of the layout-status analyzing unit 26 in the image display apparatus 102 according to the second modification of the first embodiment.

The display-content selecting unit 29 basically performs the same operation as explained in the first embodiment. Additionally, there is a change with an addition of the second layout-status analyzing unit 28. In the first embodiment, only the result of the content relevance calculator 18 is used to select a content conforming to the desired condition as the display content. In addition to this, the display-content selecting unit 29 restricts the number of visualized contents located in the dense part based on the congested and sparse conditions in the space after the visualized content group obtained from the analysis result by the second layout-status analyzing unit 28 has been located.

When the layout density (number of layouts per unit area) in the virtual space exceeds a predetermined amount as a result of analysis by the second layout-status analyzing unit 28, the display-content selecting unit 29 restricts the number of visualized contents to be located around the space based on the preset limited number. The number of visualized contents is restricted by using the degree of relevance obtained by the content relevance calculator 18, so that the content exceeding the limited number is excluded from the selection target by the display-content selecting unit 29 in an order of the content having a lower degree of relevance.

Specifically, the display-content selecting unit 29 divides the virtual space into several blocks, and calculates the layout density in a unit of block from the layout density obtained by the second layout-status analyzing unit 28. The display-content selecting unit 29 counts the number of visualized contents to be located in the block, and excludes the visualized content exceeding the limited number in the order of the content having a lower degree of relevance. The "limited number" as an index is stored beforehand as setting information. The limited number can be changed according to a value input from the user via the manual operating device and the operation history.

According to the configuration of the third modification of the first embodiment, the layout of the visualized contents is adjusted according to the layout density to ease the congestion in the part where there are many visualized contents. Accordingly, the visualized contents can be easily seen when the virtual space is visualized.

A fourth modification of the first embodiment is explained next. Like reference numerals are designated to like configurations in the image display apparatus 100, and explanations thereof will be omitted.

Figure 21:
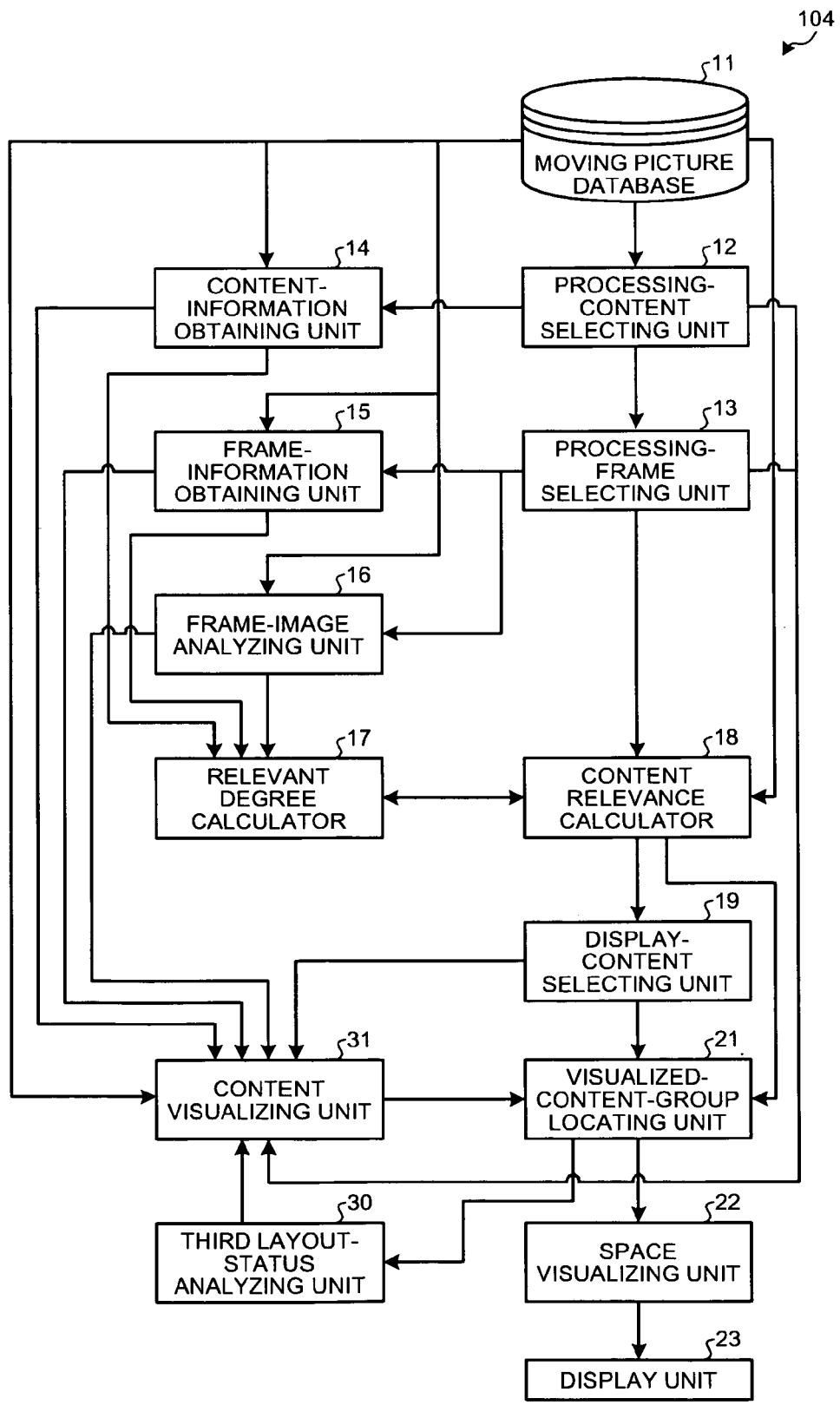
FIG. 21 is a diagram illustrating a configuration of an image display apparatus according to a fourth modification of the first embodiment.

FIG. 21 is a block diagram of a functional configuration of an image display apparatus 104 according to the fourth modification of the first embodiment. As shown in FIG. 21, the image display apparatus 104 includes a third layout-status analyzing unit 30 and a content visualizing unit 31 in addition to the moving picture database 11, the processing-content selecting unit 12, the processing-frame selecting unit 13, the content-information obtaining unit 14, the frame-information obtaining unit 15, the frame-image analyzing unit 16, the relevant degree calculator 17, the content relevance calculator 18, the display-content selecting unit 19, the visualized-content-group locating unit 21, the space visualizing unit 22, and the display unit 23.

The third layout-status analyzing unit 30 and the content visualizing unit 31 are functional units realized by executing various programs stored in the storage unit by the controller.

The third layout-status analyzing unit 30 analyzes the status of the layout position of the visualized content group determined by the visualized-content-group locating unit 21, to determine a biased state of a layout of the visualized content group (for example, the layout is biased to a specific area, a specific area is congested and sparse, or the like), and feeds back the result to the content visualizing unit 31. The specific operation of the third layout-status analyzing unit 28 is the same as that of the layout-status analyzing unit 26 in the image display apparatus 102 according to the second modification of the first embodiment.

The content visualizing unit 31 has the same function as that of the content visualizing unit 20, and merges a plurality of visualized contents upon reception of the feedback of the analysis result of the layout status obtained from the third layout-status analyzing unit 30 to regenerate the visualized contents as one new visualized content.

Specifically, when there are two (or more) visualized contents located in the congested conditions as a result of feedback from the third layout-status analyzing unit 30, and if the visualized contents satisfy a predetermined condition, the content visualizing unit 31 merges the two (or more) visualized contents to reconstruct the visualized contents as one visualized content.

The "predetermined condition", which becomes an index for determining whether to merge the visualized contents, can be arbitrarily set according to the use environment. For example, it can be set as a condition that there is a similarity in the program title. In this case, the condition is such that a part (or whole) of the program title is the same, the programs are the N-th and the M-th episodes of the same drama, the program is a repeat of the same drama, or the program is a sequel to the same drama. Further, it can be set as a condition that there is a similarity in the recording date and time. In this case, the condition is such that the recording date and time is the same or close to each other, is in the same day of the week or in the same time frame, or the program has been recorded in the last week. Further, it can be set as a condition that there is a similarity in the recording channel. In this case, the condition is such that the channel is the same, or the channel is the affiliated channel. Further, it can be set as a condition that there is a similarity in performers' information. In this case, the condition is such that it is a program in which a certain performer X appears, it is a program in which a character belonging to a certain group appears, it is a program in which a character belonging to the same agency appears, or it is a program in which a performer in the same genre appears. Further, it can be set as a condition that there is a similarity in the genre. In this case, the condition is such that the programs are the same soccer programs, or although the types of sport are different, both are sports programs.

When the visualized content satisfies the predetermined condition, the content visualizing unit 31 merges the visualized contents to reconstruct the visualized contents as one visualized content. At this time, the background A10, the frame image A11, the program title A12, the recording date and time A13, and the channel name A14 explained with reference to FIGS. 4A and 4B are appropriately processed.

For example, when there is a similarity in the program title, common parts in the program title are united into one, and a non-common part is added thereto. Specifically, when there are episodes 1, 2, and 3 of drama X, a part of the program title A12 is processed like "drama X (episodes 1 to 3)". When there is a similarity in the recording date and time, for example, the recording date and time A13 is processed as "recorded yesterday", and simultaneously, the program title A12 is processed like "programs A, B, and C", and the channel name A14 is processed like "channels X, Y, and Z". It is assumed that programs A, B, and C correspond to the condition of being recorded yesterday, and the channels thereof are respectively Y, Y, and Z. When "there is similarity in the performers' information", the part of the program title A12 is processed like "program in which performer X appears (drama X, variety show Y, and music program Z)".

Likewise, when there is the similarity in genre, for example, the part of the program title A12 is processed like "sport program (soccer X, baseball Y, baseball Z)". Simultaneously, the recording date and time A13 and the channel name A14 are processed as described above. Further, the background A10 is changed to another color or another pattern so that merging can be seen. For example, when a genre A has a red background, and the genre B has a blue background, processing can be performed such that the one obtained by merging these two genres has a gradation background of from red to blue, or a quite different color or pattern can be used.

Regarding the frame image A11, a plurality of frame images is merged to one. Specifically, one frame image is selected from a plurality of frame images based on some criterion (for example, an image having the largest information quantity (which can be determined by using, for example, the histogram)) to form a frame image; frame images are arranged to form one frame image; a mosaic image is created by blending a plurality of frame images to form one frame image; or an arbitrary portion in respective images in the frame images is extracted and blended to form a new image. The processing for merging is only an example, and in practice, merging can be performed appropriately, so long as various pieces of information can be merged to form one frame image.

According to the configuration of the fourth modification of the first embodiment, visualized contents located in the dense part in the virtual space are merged, to eliminate the congested conditions in this part. Accordingly, the visualized contents can be easily seen.

A fifth modification of the first embodiment is explained next. Like reference numerals refer to like configuration as in the image display apparatus 100 and explanations thereof will be omitted.

Figure 22:
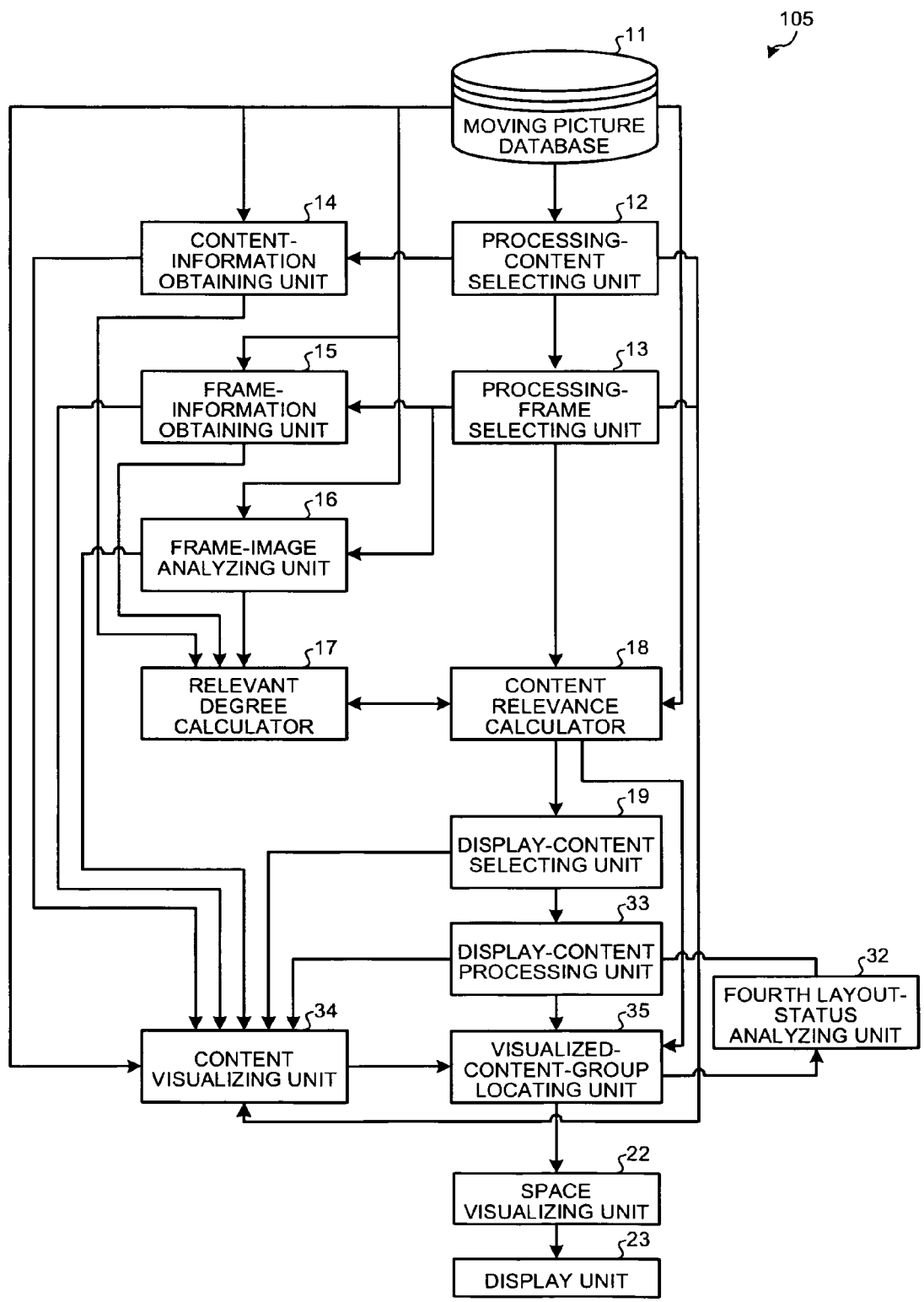
FIG. 22 is a diagram illustrating a configuration of an image display apparatus according to a fifth modification of the first embodiment.

FIG. 22 is a block diagram of a functional configuration of an image display apparatus 105 according to the fifth modification of the first embodiment. As shown in FIG. 22, the image display apparatus 105 includes a fourth layout-status analyzing unit 32, a display-content processing unit 33, a content visualizing unit 34, and a content-visualizing-group locating unit 35, in addition to the moving picture database 11, the processing-content selecting unit 12, the processing-frame selecting unit 13, the content-information obtaining unit 14, the frame-information obtaining unit 15, the frame-image analyzing unit 16, the relevant degree calculator 17, the content relevance calculator 18, the display-content selecting unit 19, the space visualizing unit 22, and the display unit 23.

The fourth layout-status analyzing unit 32, the display-content processing unit 33, the content visualizing unit 34, and the content-visualizing-group locating unit 35 are functional units realized by executing various programs stored in the storage unit by the controller.

The fourth layout-status analyzing unit 32 analyzes the status of the layout position of the visualized content group determined by the visualized-content-group locating unit 21, to determine a biased state of a layout of the visualized content group (for example, the layout is biased to a specific area, a specific area is congested and sparse, or the like), and feeds back the result to the display-content processing unit 33. The specific operation of the fourth layout-status analyzing unit 32 is the same as that of the layout-status analyzing unit 26 in the image display apparatus 102 according to the second modification of the first embodiment.

The display-content processing unit 33 performs processing of the content group to be displayed, which is obtained from the display-content selecting unit 19, upon reception of the feedback from the fourth layout-status analyzing unit 32. Specifically, upon reception of the feedback from the fourth layout-status analyzing unit 32, the display-content processing unit 33 processes the display content group in a part where the layout is dense, to unite a plurality of pieces of information of the display contents into one. The operation involved with the processing is the same as that of the content visualizing unit 31.

The content visualizing unit 34 receives the display content group processed by the display-content processing unit 33 to perform the operation for visualizing respective display contents. The operation involved with visualization is the same as that of the content visualizing unit 20.

The content-visualizing-group locating unit 35 locates the visualized content group obtained from the content visualizing unit 34 in the virtual space based on the degree of relevance calculated by the content relevance calculator 18. The layout method in the virtual space is the same as that of the content-visualizing-group locating unit 21.

According to the configuration of the fifth modification of the first embodiment, display contents corresponding to the visualized contents located in the dense part in the virtual space are merged, to eliminate the congested conditions in this part. Accordingly, the visualized contents can be easily seen.

A sixth modification of the first embodiment is explained next. Like reference numerals refer to like configuration as in the image display apparatus 100 and explanations thereof will be omitted.

Figure 23:
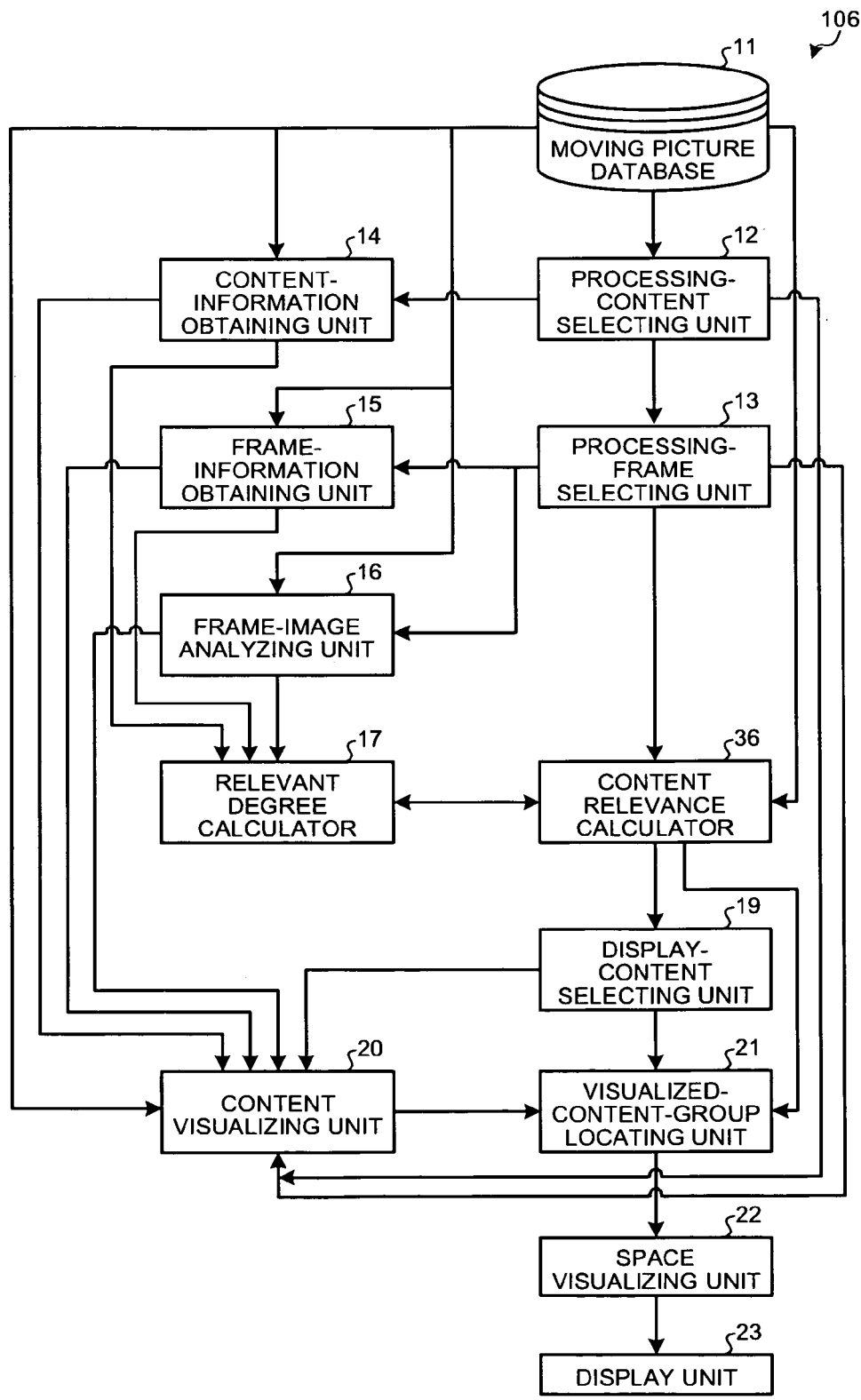
FIG. 23 is a diagram illustrating a configuration of an image display apparatus according to a sixth modification of the first embodiment.

FIG. 23 is a block diagram of a functional configuration of an image display apparatus 106 according to the sixth modification of the first embodiment. As shown in FIG. 23, the image display apparatus 106 includes a content relevance calculator 36, in addition to the moving picture database 11, the processing-content selecting unit 12, the processing-frame selecting unit 13, the content-information obtaining unit 14, the frame-information obtaining unit 15, the frame-image analyzing unit 16, the relevant degree calculator 17, the display-content selecting unit 19, the content visualizing unit 20, the visualized-content-group locating unit 21, the space visualizing unit 22, and the display unit 23.

The content relevance calculator 36 is a functional unit realized by executing various programs stored in the storage unit by the controller.

The content relevance calculator 36 has the same function as that of the content relevance calculator 18, and registers a predetermined number of contents from listed up contents in a processing content list in order of decreasing degree of relevance. The content relevance calculator 36 also assigns a processing frequency to each content registered in the processing content list for sequentially processing the processing contents. That is, the content relevance calculator 36 designates the contents registered in the processing content list as the processing content sequentially according to the value of the processing frequency.

Processing frequency indicating the same value can be assigned to a plurality of contents, and for example, when there is a plurality of contents having the same degree of relevance, the processing frequency indicating the same value is assigned to these contents. It is assumed that for the value of processing frequency to be assigned, "1" is assigned to the content having the highest degree of relevance, and as the degree of relevance decreases, the assigned value increases. However, the value is not limited to this example.

Figure 24:
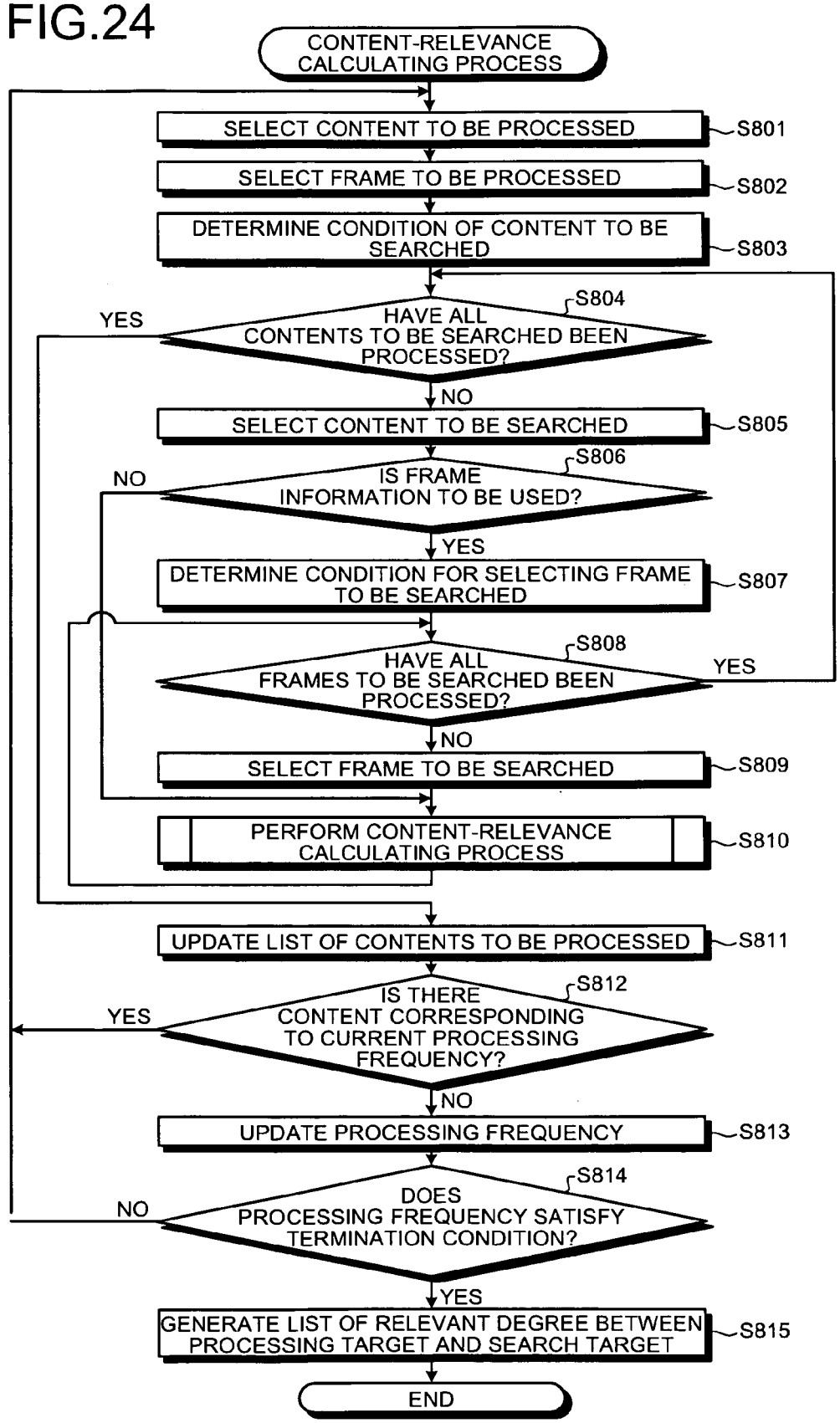
FIG. 24 is a flowchart of a content-relevance-calculating process procedure according to the six modification of the first embodiment.

The operation of the content relevance calculator 36 is explained with reference to FIG. 24. FIG. 24 is a flowchart of a content-relevance-calculating process procedure performed by the content relevance calculator 36. It is assumed that the content to be processed and the frame to be processed have been already selected by the processing-content selecting unit 12 and the processing-frame selecting unit 13. It is also assumed that the content visualizing unit 20 has calculated the degree of relevance between the content to be processed and other contents based on the content to be processed and the frame to be processed. Further, it is assumed that the content relevance calculator 36 has already generated a list of contents to be processed based on the degree of relevance calculated by the content visualizing unit 20.

First, the content relevance calculator 36 selects one content corresponding to the current processing frequency as the content to be processed from the list of contents to be processed (step S801).

The content relevance calculator 36 then selects the frame to be processed from the content to be processed selected at step S801, using the processing-frame selecting unit 13 (step S802).

The content relevance calculator 36 then determines a condition of the content to be searched (step S803), and determines whether the relevant-degree calculating process at step S810 has been performed with respect to all the contents to be searched, which fall under the condition (step S804).

At step S804, when having determined that the content-relevance calculating process at step S810 has been performed with respect to all the contents to be searched (YES at step S804), the content relevance calculator 36 proceeds directly to step S811. On the other hand, at step S804, when having determined that the content-relevance calculating process has not been performed with respect to all the contents to be searched (No at step S804), the content relevance calculator 36 selects one unprocessed content to be searched from the contents to be searched (step S805).

Subsequently, the content relevance calculator 36 determines whether to use the frame information for calculating the degree of relevance (step S806). Determination whether to use the frame information can be preset as the setting information or can be specified by the user.

At step S806, when having determined not to use the frame information (No at step S806), the content relevance calculator 36 proceeds directly to step S810. On the other hand, at step S806, when having determined to use the frame information (Yes at step S806), the content relevance calculator 36 determines a condition for selecting the frame to be searched in the content to be searched (step S807).

Subsequently, the content relevance calculator 36 determines whether the content-relevance calculating process at step S810 has been performed with respect to all the frames to be searched, and when having determined that the process has been performed (Yes at step S808), returns to step S804.

On the other hand, at step S808, when having determined that there is an unprocessed frame to be searched (No at step S808), the content relevance calculator 36 selects one unprocessed frame to be searched from the frame group to be searched matching the condition determined at step S807 (step S809).

Subsequently, the content relevance calculator 36 notifies the relevant degree calculator 17 of the content to be processed, the frame to be processed, the content to be searched, and the frame to be searched, so that the relevant-degree calculating process is performed by the relevant degree calculator 17 (step S810), then, returns to step S808. The relevant-degree calculating process at step S810 is the same as the relevant-degree calculating process shown in FIG. 2; however, the degree of relevance is calculated, taking into consideration weighting corresponding to the processing frequency.

Specifically, degree of relevance R' after been changed is derived by calculating the following equation (5) with respect to degree of relevance R calculated in the relevant-degree calculating process shown in FIG. 2. N denotes a total processing frequency (processing frequency, which becomes a termination condition), $R_{n,m}$ denotes a degree of relevance of the m-th content to be processed in the n-th processing frequency. That is, as the processing frequency increases, the weighting value decreases. Note that the calculation method is only an example, and the calculation method is not limited thereto.

$$R' = \sum_n \frac{1}{N} \sum_m R_{n,m} \quad (5)$$

The content relevance calculator 36 deletes the content, which has been the content to be processed this time from the list of contents to be processed, thereby updating the list of contents to be processed (step S811).

Subsequently, the content relevance calculator 36 refers to the content registered in the list of contents to be processed, to determine whether there is a content corresponding to the current processing frequency (step S812). When having determined that there is the content corresponding to the processing frequency (Yes at step S812), the content relevance calculator 36 returns to step S801 again.

On the other hand, at step S812, when having determined that there is no content corresponding to the processing frequency (No at step S812), the content relevance calculator 36 updates the processing frequency by adding one to the current processing frequency (step S813), and determines whether the processing frequency satisfies the termination condition (step S814).

The "termination condition of the processing frequency" means a value of the processing frequency, which becomes a reference at the time of terminating a loop process of from step S801 to step S814. As the termination condition, for example, a value obtained by adding 1 to the largest processing frequency assigned to the respective content lists in the list of contents to be processed can be used. Alternatively, a preset value or a value input from the user via the manual operating device can be used.

At step S814, when having determined that the processing frequency does not satisfy the termination condition (No at step S814), the content relevance calculator 36 returns to step S801 again. At step S814, when having determined that the processing frequency satisfies the termination condition (Yes at step S814), the content relevance calculator 36 proceeds to step S815.

The content relevance calculator 36 generates a relevant degree list between the content to be processed and the content group to be searched accumulated in the moving picture database 11, using M degrees of relevance calculated hitherto (M is a number of contents matching the condition determined at step S803) with respect to the content to be processed, and rearranges the list in descending order of the degree of relevance (step S815), to finish the process.

According to the above process, content group {C} having high relevance (a high degree of relevance is calculated) with the performer is selected with respect to one content to be processed from the moving picture database 11, and when respective contents included in {C} are intended to be processed, a content group having high relevance with performers appearing in the respective contents is further selected from the moving picture database 11.

Specifically, when it is assumed that there is performer A appearing in content C to be processed, content group {C1$_i$=0, . . . , n} in which performer P1 appears (or having high relevance with performer A) is obtained in the content-relevance calculating process performed by the content relevance calculator 18. In the content-relevance calculating process performed by the content relevance calculator 36, on the other hand, in addition to the above result, when performer P2 appears in content Coo, content group {C2$_i$= 0, . . . , n} in which performer P2 appears can be also obtained from the moving picture database 11.

Further, when performer P3 appears in content C11, content group having a high degree of relevance such as content group $\{C3_i=0, \ldots, n\}$, in which performer P3 appears, can be obtained one after another. That is, if the first embodiment corresponds to primary search of the degree of relevance, it can be assumed that secondary search is performed in a sixth modification of the first embodiment.

Thus, according to the sixth modification of the first embodiment, not only the contents having high relevance with the content to be processed are visualized, but also other contents having relevance with these contents can be visualized. Accordingly, not only the visualized content having more relevance with the content to be processed can be confirmed, but also a content having less relevance, such as a content related indirectly, can be confirmed.

A seventh modification of the first embodiment is explained next. Like reference numerals are designated to like configurations in the image display apparatus 100, and explanations thereof will be omitted.

Figure 25:
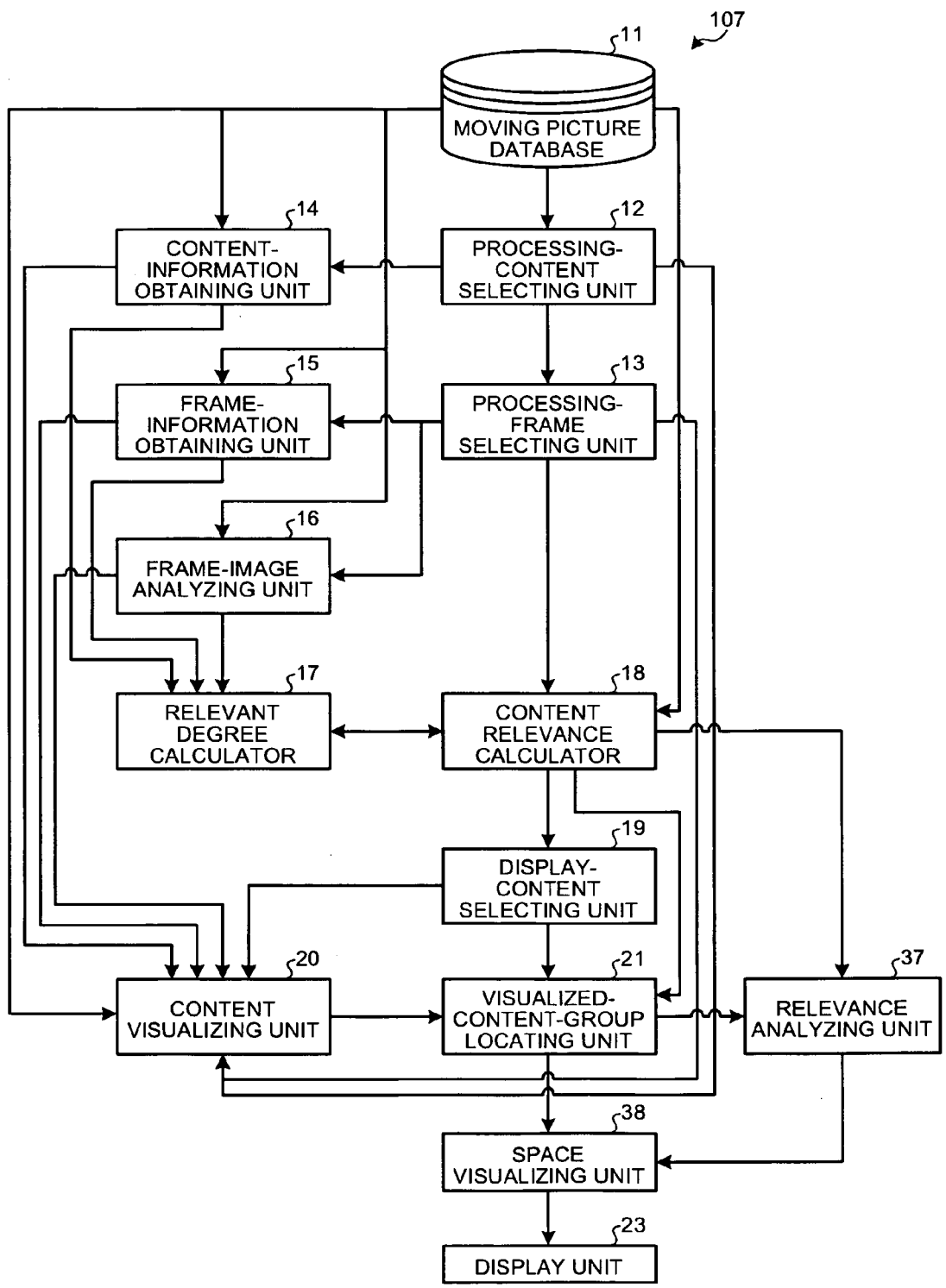
FIG. 25 is a diagram illustrating a configuration of an image display apparatus according to a seventh modification of the first embodiment.

FIG. 25 is a block diagram of a functional configuration of an image display apparatus 107 according to the seventh modification of the first embodiment. As shown in FIG. 25, the image display apparatus 107 includes a relevance analyzing unit 37 and a space visualizing unit 38 in addition to the moving picture database 11, the processing-content selecting unit 12, the processing-frame selecting unit 13, the content-information obtaining unit 14, the frame-information obtaining unit 15, the frame-image analyzing unit 16, the relevant degree calculator 17, the content relevance calculator 18, the display-content selecting unit 19, the content visualizing unit 20, the visualized-content-group locating unit 21, and the display unit 23.

The relevance analyzing unit 37 and the space visualizing unit 38 are functional units realized by executing various programs stored in the storage unit by the controller.

The relevance analyzing unit 37 comprehensively analyzes the degree of relevance calculated by the content relevance calculator 18 and layout status by the visualized-content-group locating unit 21, and feeds back the result to the space visualizing unit 38. Specifically, the relevance analyzing unit 37 analyzes distribution (sparse or dense, for example) of the layout in the virtual space based on the degree of relevance calculated for the respective visualized contents and the layout position of the respective visualized contents, and outputs the analysis result to the space visualizing unit 38.

The space visualizing unit 38 performs the same operation as that of the space visualizing unit 22. The space visualizing unit 38 changes a rendering parameter at the time of visualizing the virtual space or changes a rendering method at the time of visualization, upon reception of the feedback from the relevance analyzing unit 37. Specifically, when having determined that the visualized contents are located in the congested conditions based on the feedback information from the relevance analyzing unit 37, the space visualizing unit 38 changes a coordinate scale of the virtual space by changing a parameter of the truncated cone on which the virtual content is located, and performs rendering so that the visualized contents can be easily seen even in the congested conditions.

When the visualized content group is observed from a viewpoint position in the Z-axis direction of the virtual space, if distribution of the visualized contents in the Z-axis direction is small, the visualized contents can be easily seen by narrowing a space between a near face and a far face of a Z buffer within a range capable of covering the visualized contents, and if the distribution is large, vice versa. Further, when the distribution is large, visibility can be improved by taking a wide angle of visibility at the time of rendering.

Further, the viewpoint at the time of rendering can be determined based on the layout status of the visualized contents. For example, the visibility can be improved by adopting a viewpoint at which superposition of the visualized contents decreases. When the number of visualized contents located is large, a quantity of light of a light source at the time of rendering is increased, thereby emphasizing contrasting of the light for each visualized content.

Clear visualization can be performed by appropriately changing a shading method, a shadow-creating method, or the like according to the analyzed state. Further, after a certain viewpoint condition is determined, a CG model (geometry model) of a polygon can be deformed for each visualized content or the posture of the polygon can be changed.

For example, when an angle formed by a normal direction of the polygon (or a part representing the polygon) constituting a visualized content and a view vector is close to 90 degrees as seen from a certain viewing direction, a polygon face of the visualized content can be hardly seen. In such a case, if the polygon model is rotated toward the viewing direction to decrease the angle, the visualized content can be more visible. A similar effect can be realized by changing the geometry forming the polygon to decrease the angle formed between a part (or all) of the polygon and the viewing direction. General methods in the CG technology can be used to change the posture of the polygon or deform the polygon.

Thus, according to the seventh modification of the first embodiment, at the time of visualizing the virtual space, congestion of the part where there are many visualized contents can be eased, and the visualized contents in that part can be more visible.

An eighth modification of the first embodiment is explained next. Like reference numerals are designated to like configurations in the image display apparatus 100, and explanations thereof will be omitted.

Figure 26:
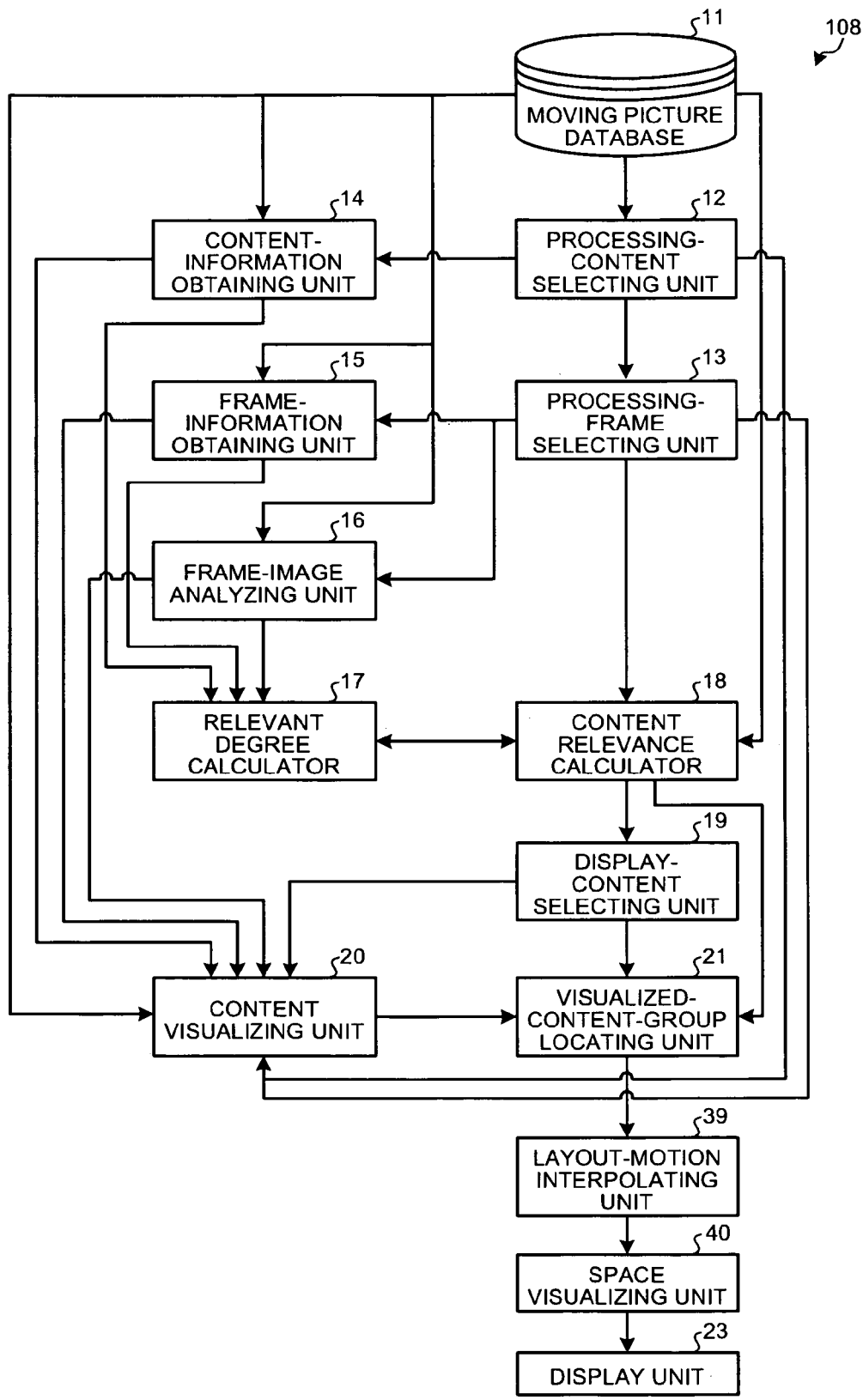
FIG. 26 is a diagram illustrating a configuration of an image display apparatus according to an eighth modification of the first embodiment.

FIG. 26 is a block diagram of a functional configuration of an image display apparatus 108 according to the eighth modification of the first embodiment. As shown in FIG. 26, the image display apparatus 108 includes a layout-motion interpolating unit 39 and a space visualizing unit 40 in addition to the moving picture database 11, the processing-content selecting unit 12, the processing-frame selecting unit 13, the content-information obtaining unit 14, the frame-information obtaining unit 15, the frame-image analyzing unit 16, the relevant degree calculator 17, the content relevance calculator 18, the display-content selecting unit 19, the content visualizing unit 20, the visualized-content-group locating unit 21, and the display unit 23.

The layout-motion interpolating unit 39 and the space visualizing unit 40 are functional units realized by executing various programs stored in the storage unit by the controller.

The layout-motion interpolating unit 39 performs interpolation so that the layout information of the visualized content group calculated by the visualized-content-group locating unit 21 is smoothly animated over a plurality of visualization intervals.

As described above, in the image display apparatus 108, the visualized content group located by the visualized-content-group locating unit 21 is visualized. At this time, in the visualized-content-group locating unit 21, if the layout position of the visualized content calculated at a certain timing and the layout position of the visualized content calculated at the next timing are different largely from each other, the visualized content is displayed as if it is moving discontinuously (unsmoothly).

The above problem occurs when the screen display interval is smaller than a performing interval of the space visualization process. Accordingly, the layout-motion interpolating unit 39 calculates an interpolated position for interpolating the layout position of the respective visualized contents based on the space visualization result (position information of visualized content group) one before, so that the current space visualization result smoothly shifts during the screen display interval (for example, 60 frames/sec). The layout-motion interpolating unit 39 also changes the layout position of the respective visualized contents located in the virtual space based on the calculated interpolated position.

Specifically, if it is assumed that the position of the visualized content calculated last time by the visualized-content-group locating unit 21 is designated as (x0, y0, z0), the position of the same visualized content calculated this time by the visualized-content-group locating unit 21 is designated as (x1, y1, z1), and a frame rate for screen display is 60 frames/sec, the interpolated position of the n-th frame (xn, yn, zn) can be calculated by using the following equation (6), where t=n/60 (n=1, ..., 60).

$$(xn,yn,zn)=(t(x1-x0),t(y1-y0),t(z1-z0)) \quad (6)$$

An example of linear interpolation has been explained in the equation (6), however, interpolation is not limited thereto. Interpolation using a quadric curve or a cubic curve can be used. For example, secondary spline curve interpolation can be performed by using not only the position information one before but also the position information several pieces before.

Position interpolation has been explained above, however, when the information other than the position information is different, the interpolation method thereof is the same. For example, when posture information is different, the posture can be interpolated by the same method (linear interpolation, spline curve interpolation, or the like) so that the normal vectors (and direction vectors) thereof are smoothly changed. The layout-motion interpolating unit 39 outputs the virtual space in which the layout position is changed, designating the interpolated positions calculated for the respective visualized contents located in the virtual space as one set (hereinafter, "virtual space for one set") only for n sets corresponding to the number of interpolations (according to the interpolated frame position described later) to the space visualizing unit 40. The frame located by the visualized-content-group locating unit 21 (corresponding to the 0-th frame) is output as it is to the space visualizing unit 40.

The space visualizing unit 40 performs image processing and CG processing with respect to the respective visualized contents located by the layout-motion interpolating unit 39 to visualize the virtual space based on the predetermined viewing position. The contents of the image processing and the CG processing performed to the visualized contents are the same as those in the space visualizing unit 40.

Figure 27:
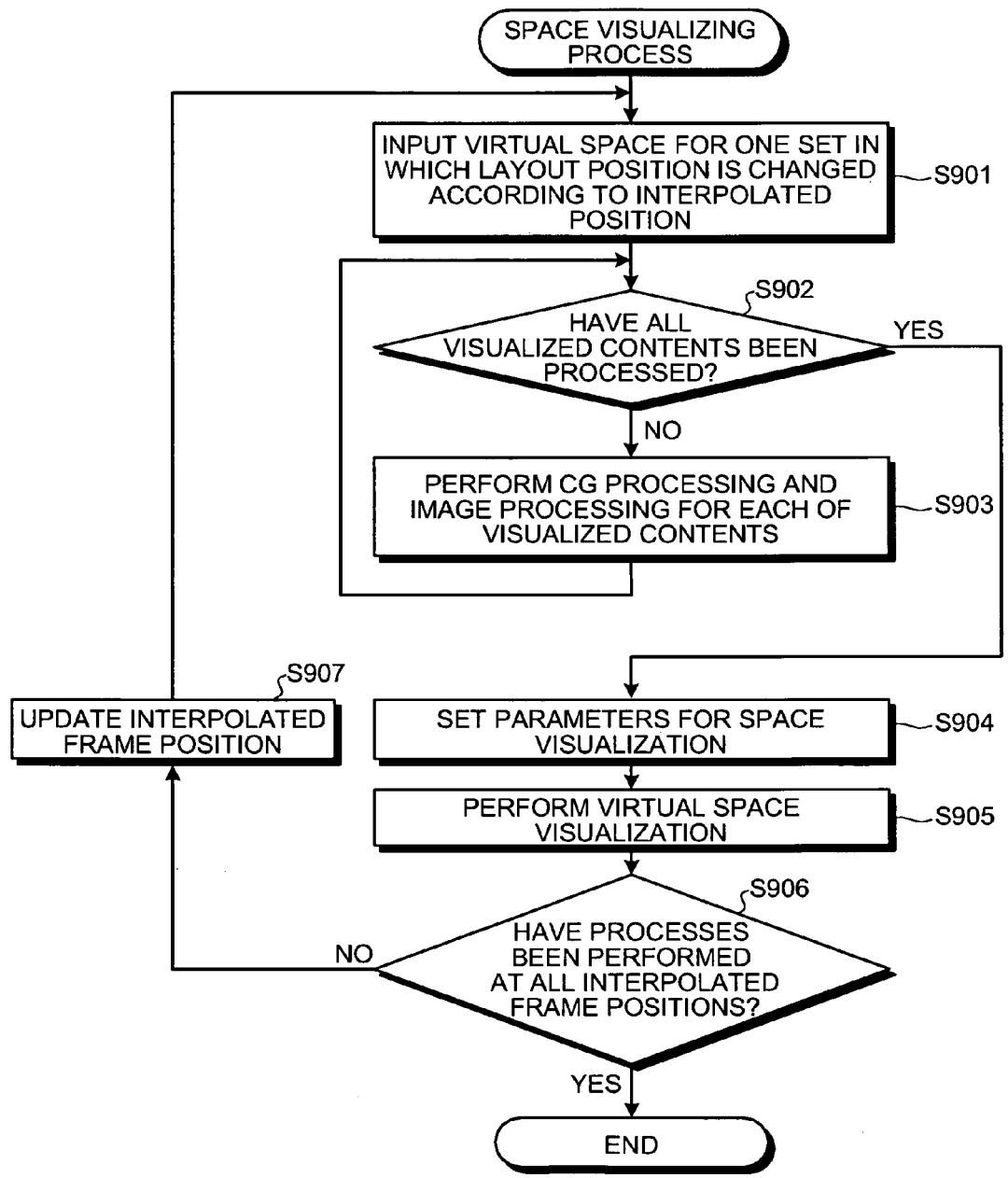
FIG. 27 is a flowchart of a space-visualizing process procedure according to the eighth modification of the first embodiment.

An operation of the space visualizing unit 40 is explained next with reference to FIG. 27. FIG. 27 is a flowchart of the space-visualizing process procedure performed by the space visualizing unit 40.

When the virtual space for one set in which the layout position is changed according to the interpolated position for one set is input from the layout-motion interpolating unit 39 (step S901), the space visualizing unit 40 determines whether the process at step S903 has been performed to all the visualized contents located in the virtual space (step S902). "All the visualized contents" means the visualized content group located in the virtual space by the layout-motion interpolating unit 39 (for the 0-th frame, by the visualized-content-group locating unit 21).

At step S902, when having determined that all the visualized contents have been processed (Yes at step S902), the space visualizing unit 40 proceeds to step S904. At step S902, when having determined that there is an unprocessed visualized content (No at step S902), the space visualizing unit 40 performs the CG processing and image processing to the unprocessed visualized content (step S903), and returns to step S902.

Subsequently, the space visualizing unit 40 sets parameters for space visualization (step S904). Specifically, the space visualizing unit 40 sets from which direction the virtual space is to be visualized, computer graphically, sets the parameters of the camera (viewpoint) position, the direction, and the range for rendering the virtual space. Simultaneously, the space visualizing unit 40 can also set the parameters of the position, the strength, and the range of the light source for rendering the virtual space, as required.

The space visualizing unit 40 performs visualization of the virtual space by rendering the virtual space according to the parameters for space visualization set at step S904 and outputs the result to the display unit 23 (step S905).

The space visualizing unit 40 determines whether processes from S901 to S905 have been performed at all interpolated frame positions (step S906). The "interpolated frame position" means a display screen frame in which the layout-motion interpolating unit 39 performs interpolation, and for example, when the screen display is 60 frames per second and interval of the space visualization is 1 frame/sec, "interpolated frame position" means positions of all the display screen frames of 0, 1/60, 2/60, ..., 1 second (60/60) (for example, the n-th position is a frame after n/60 seconds).

At step S906, when having determined that there is an unprocessed visualized content (No at step S906), the space visualizing unit 40 updates the interpolated frame position (for example, in the case of the n-th position, n=n+1) (step S907), and proceeds to the process at step S901. At step S906, when having determined that the process has been performed at all the interpolated frame positions (Yes at step S906), the space visualizing unit 40 finishes the process. The process is performed every time a series of frames (for example, when frame rate is 60, 60 frames) is input from the layout-motion interpolating unit 39.

According to the configuration of the eighth modification of the first embodiment, an interim visualization result can be expressed by the interpolation even when the screen display interval is smaller than the visualization interval of the virtual space, thereby enabling a smooth display of the visualization result of the respective visualized contents.

A ninth modification of the first embodiment is explained next. Like reference numerals are designated to like configurations in the image display apparatus 100, and explanations thereof will be omitted.

Figure 28:
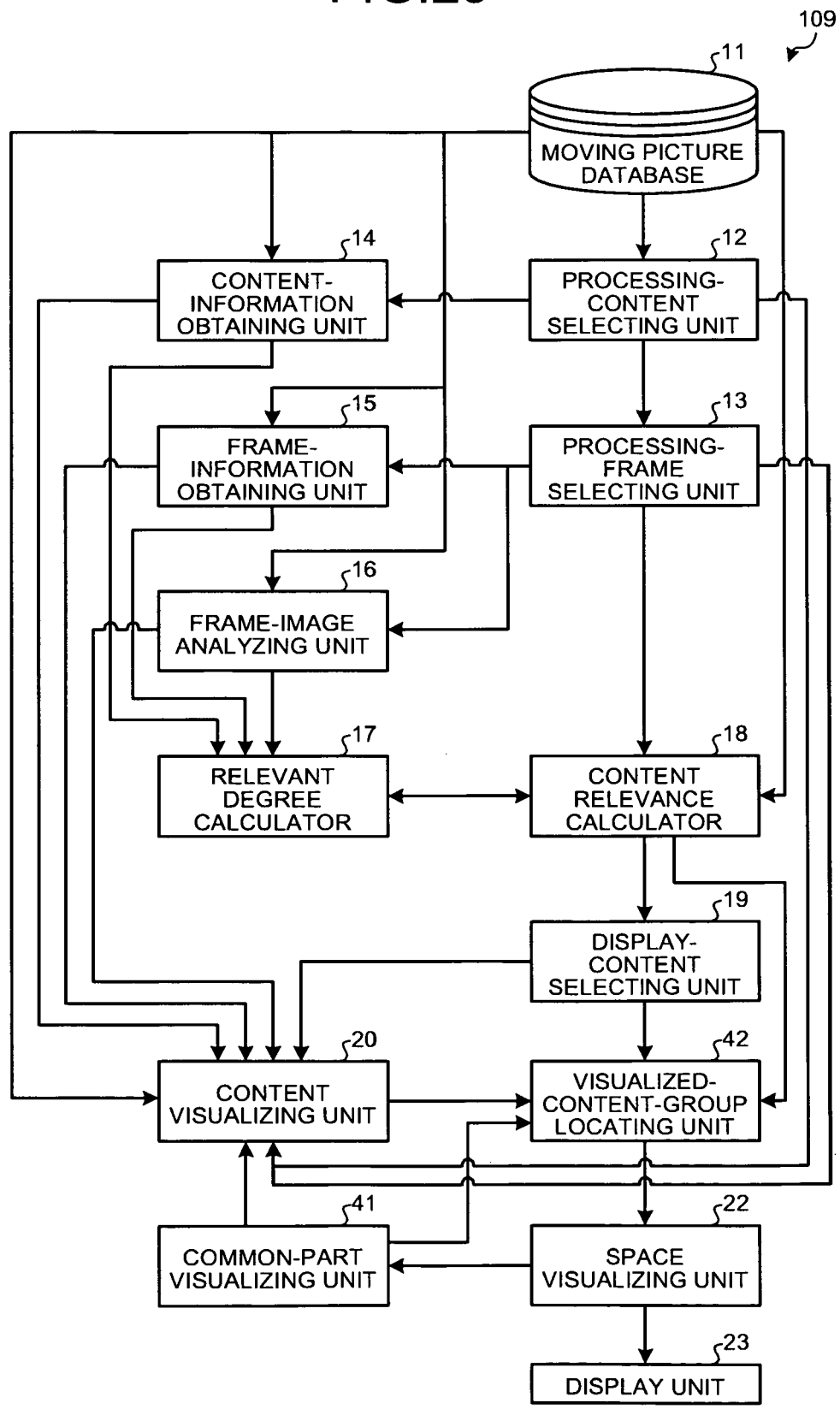
FIG. 28 is a diagram illustrating a configuration of an image display apparatus according to a ninth modification of the first embodiment.

FIG. 28 is a block diagram of a functional configuration of an image display apparatus 109 according to the ninth modification of the first embodiment. As shown in FIG. 28, the image display apparatus 109 includes a common-part visualizing unit 41 and a visualized-content-group locating unit 42 in addition to the moving picture database 11, the processing-content selecting unit 12, the processing-frame selecting unit 13, the content-information obtaining unit 14, the frame-information obtaining unit 15, the frame-image analyzing unit 16, the relevant degree calculator 17, the content relevance calculator 18, the display-content selecting unit 19, the content visualizing unit 20, the space visualizing unit 22, and the display unit 23.

The common-part visualizing unit 41 and the visualized-content-group locating unit 42 are functional units realized by executing various programs stored in the storage unit by the controller.

The common-part visualizing unit 41 extracts common information of two or more visualized contents by using information for visualization by the content visualizing unit 20 and the visualization result by the space visualizing unit 22, generates a new visualized content according to the common information, and adds the new visualized content to the visualized-content-group locating unit 42.

Figure 29:
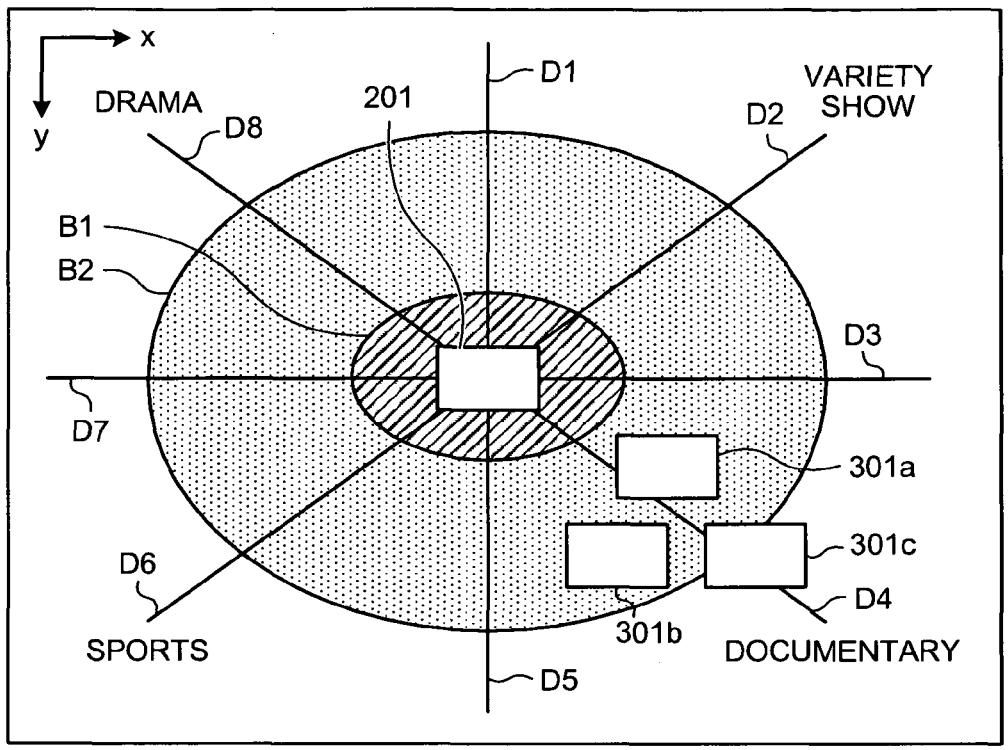
FIG. 29 is a diagram illustrating one example of the visualized content located in the virtual space.
Figure 30:
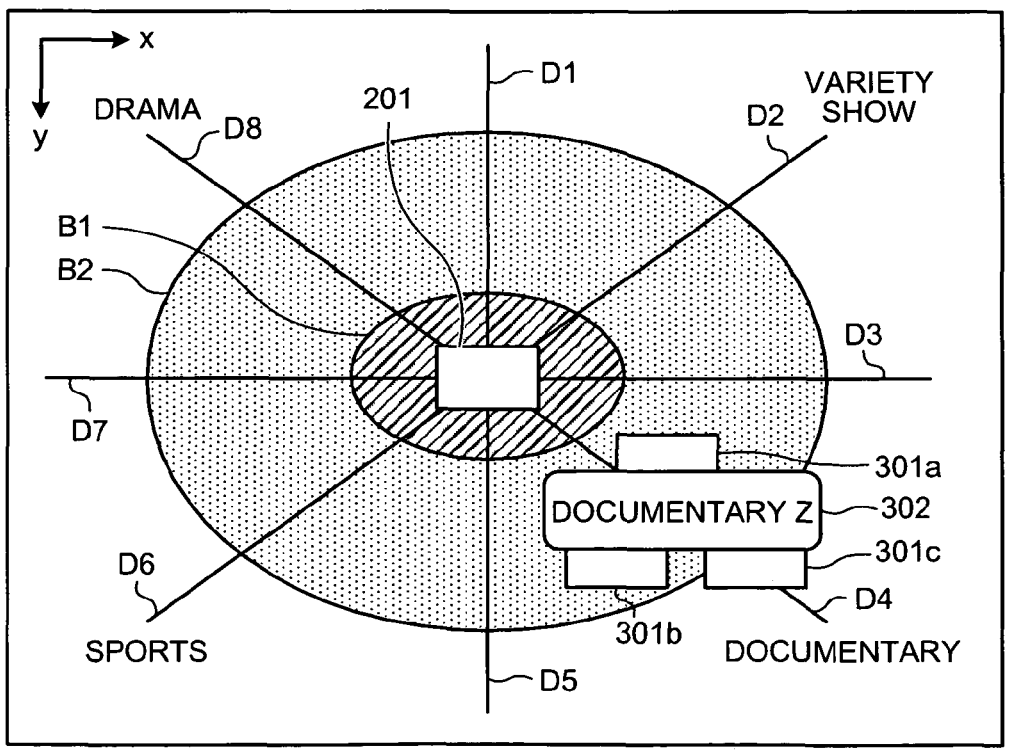
FIG. 30 is a schematic diagram for explaining additional information located in the virtual space shown in FIG. 29.

A specific operation example of the common-part visualizing unit 41 is explained with reference to FIGS. 29 and 30. FIGS. 29 and 30 are examples of the XY plane in the virtual space where the visualized contents are located.

In FIG. 29, when it is assumed that three visualized contents of "documentary Z (episode 1)" (301a in FIG. 29), "documentary Z (episode 2)" (301b in FIG. 29), and "documentary Z (episode 3)" (301c in FIG. 29) are located adjacent to each other, the common-part visualizing unit 41 extracts a common part in these adjacent visualized contents, for example, "documentary Z". The extraction method is the same as that explained for the content visualizing unit 31 according to the fourth modification of the first embodiment.

The common-part visualizing unit 41 generates a new visualized content, using the extracted common parts. The generation method of the visualized content is the same as that of the content visualizing unit 20, however, an element, layout, or the like at the time of visualization can be different. For example, additional information (see 302 in FIG. 30) expressing the common part can be generated as the visualized content.

An example in which title name is extracted as the common part has been used above; however, it is only an example, and one or more common parts can be picked up and used from various pieces of information such as the frame image, recording date and time, and genre.

The visualized-content-group locating unit 42 has the same function as that of the visualized-content-group locating unit 21. When having received a newly generated visualized content (additional information) from the common-part visualizing unit 41, the visualized-content-group locating unit 42 locates the new visualized content near the visualized content group used for extracting the common part between the visualized contents. FIG. 30 is an example in which a new visualized content 302 generated by using the common part between visualized contents 301a, 301b, and 301c is located near the visualized contents 301a, 301b, and 301c (for example, at the median point of these visualized contents).

The layout position of the newly generated visualized content (additional information) is not limited to the example shown in FIG. 30, and the visualized content can be located at an arbitrary position. However, it is desired to locate the visualized content so that it is not blocked by the visualized content group used for extracting the common part.

As described above, according to the configuration of the ninth modification of the first embodiment, the new visualized content expressing the common part between two or more visualized contents can be displayed together. Accordingly, the new visualized content expressing the common part between two or more visualized contents can be used as an index expressing large classification and middle classification of a plurality of visualized contents, and the user can recognize grouping (large classification and middle classification of visualized contents) of the visualized contents visualized in the space.

For example, in the case of FIG. 30, the user can intuitively recognize that it is the visualized content relating to "documentary Z" by observing the visualized content 302, without looking at the respective contents of visualized contents 301a, 301b, and 301c.

In the first embodiment described above, the contents accumulated in the moving picture database 11 can be selected as a processing target. In a second embodiment of the present invention explained below, the image display apparatus capable of obtaining the content from other media is explained. Like reference numerals are designated to like configurations in the image display apparatus 100, and explanations thereof will be omitted.

A hardware configuration of an image display apparatus 110 according to the second embodiment is explained next. The image display apparatus 110 includes a controller formed of a CPU and a GPU, a ROM for storing various data such as various programs and images, a storage unit including a RAM and an HDD, a communication unit that communicates with an external device, a receiver including an antenna and a tuner for receiving broadcasting, a media reader capable of reading information stored on a recording medium such as a compact disk (CD)-ROM, and a bus (not shown) for connecting these units, and a display apparatus and an input unit (not shown) such as a keyboard and a mouse are connected thereto.

Figure 31:
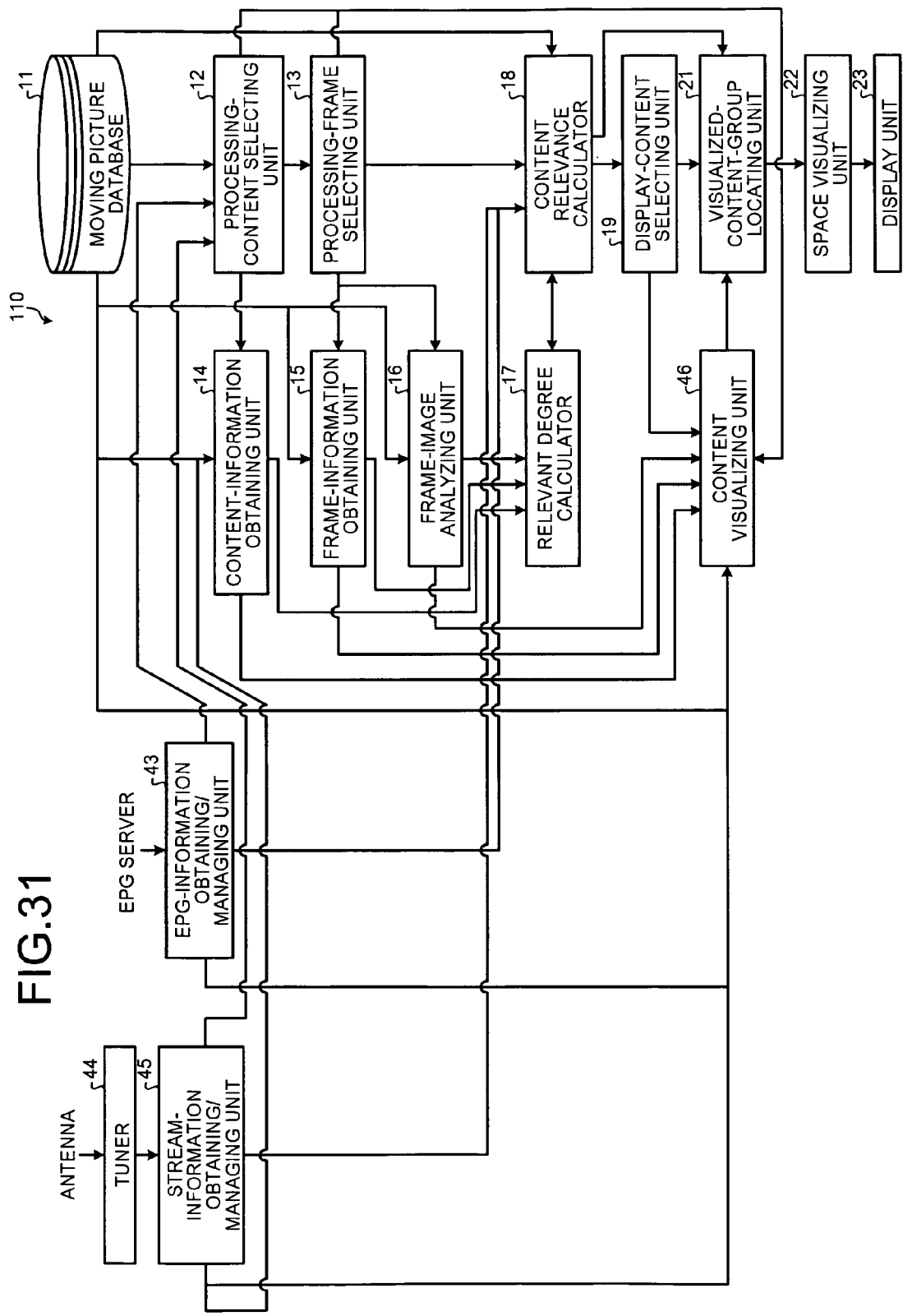
FIG. 31 is a diagram illustrating a configuration of an image display apparatus-according to a second embodiment of the present invention.

The functional configuration of the image display apparatus 110 is explained next. FIG. 31 is a block diagram of the functional configuration of the image display apparatus 110 according to the second embodiment. As shown in FIG. 31, the image display apparatus 110 includes an EPG-information obtaining/managing unit 43, a tuner 44, a stream-information obtaining/managing unit 45, and a content visualizing unit 46 in addition to the moving picture database 11, the processing-content selecting unit 12, the processing-frame selecting unit 13, the content-information obtaining unit 14, the frame-information obtaining unit 15, the frame-image analyzing unit 16, the relevant degree calculator 17, the content relevance calculator 18, the display-content selecting unit 19, the visualized-content-group locating unit 21, the space visualizing unit 22, and the display unit 23.

The EPG-information obtaining/managing unit 43, the stream-information obtaining/managing unit 45, and the content visualizing unit 46 are functional units realized by executing various programs stored in the storage unit by the controller. The tuner 44 is a functional unit realized by the receiver.

The EPG-information obtaining/managing unit 43 obtains EPG information from an external server that manages and distributes an EPG and manages the EPG information. It is assumed that information relating to a program broadcasted during the time from now to a point in time in the future (for example, one week later) is included in the EPG.

Specifically, the EPG-information obtaining/managing unit 43 obtains the EPG of TV, cable TV (CATV), communication satellite (CS) broadcast, and broadcasting satellite (BS) broadcast from a server device of a service provider connected to a network such as the Internet via the communication unit, and accumulates the EPG as content information (air date and time, channel, genre, program title, subtitle, and performers' list) in the storage unit.

The EPG-information obtaining/managing unit 43 searches for information of an image or a moving picture relating to the content information and obtains the related information via the communication unit, to accumulate these pieces of information in the storage unit as a content corresponding to the corresponding content (EPG). The information such as the image of the content can be directly provided from the service provider (or a broadcast station) or the information can be provided as another service from a third party trader. An image obtained by image search, using the content information as a key can be obtained by using an image search website.

The accumulation method of the information by the EPG-information obtaining/managing unit 43 corresponds to the management method by the moving picture database 11. That is, it can be said that the moving picture database 11 manages the existing (past) contents obtained by recording operation, whereas the EPG-information obtaining/managing unit 43 manages the future contents, which have not been obtained yet. The contents and the configuration information obtained by the EPG-information obtaining/managing unit 43 can be accumulated in the moving picture database 11.

The tuner 44 interprets a stream-distributed content. Specifically, the tuner 44 interprets the data of terrestrial television content distributed through an antenna wire of a TV as a content. The tuner 44 interprets (decodes) the data received by using a BS/CS antenna as a BS broadcast content and a CS broadcast content, respectively. For the CATV, the tuner 44 also interprets (decodes) respective distribution data as a content.

The stream-information obtaining/managing unit 45 obtains and manages a stream-distributed content obtained from the tuner 44, together with the information of the content (content information). Specifically, the stream-information obtaining/managing unit 45 obtains the contents of the terrestrial television broadcasting, BS/CS broadcast, and CATV broadcast obtained via the tuner 44, and obtains and manages the information of the content as the content information (air date and time, channel, genre, program title, subtitle, program summary, and performers' list). The content information can be obtained from the EPG obtained by the EPG-information obtaining/managing unit 43.

It can be understood that the stream-information obtaining/managing unit 45 manages a content currently being distributed, whereas the moving picture database 11 manages the existing contents already obtained by the recording operation or the like, and the EPG-information obtaining/managing unit 43 manages the future content not yet obtained. The contents and the content information obtained by the stream-information obtaining/managing unit 45 can be accumulated in the moving picture database 11.

In the second embodiment, the operations of the processing-content selecting unit 12, the content-information obtaining unit 14, and the content relevance calculator 18 are the same as those in the first embodiment. However, the content groups managed in the EPG-information obtaining/managing unit 43 and the stream-information obtaining/managing unit 45 are also intended to be processed, as well as the content groups accumulated in the moving picture database 11.

The content visualizing unit 46 has the same function as that of the content visualizing unit 20, to visualize the display content selected by the display-content selecting unit 19, by using the contents and the content information managed by the EPG-information obtaining/managing unit 43 or the stream-information obtaining/managing unit 45.

The content visualizing unit 46 changes the visualization method, the layout configuration, and the like according to the type of the information source. For example, in the case of the terrestrial television broadcasting from a TV antenna, an "icon indicating TV", which shows the information source, is arranged together, the background is changed to a specific one, or layout elements are changed, to discriminate the information source.

As described above, in the image display apparatus 100 according to the first embodiment, the relevance between the content to be processed and other content groups is visualized in the virtual space, only for the contents accumulated in the moving picture database 11. That is, only the relevance of the contents already recorded can be known.

On the other hand, in the image display apparatus 110 according to the second embodiment, all pieces of information such as the content information obtained by the EPG, the information of the stream-distributed content, and the information of the content obtained from the moving picture database 11 are seamlessly handled, so that the relevance of all the contents can be known. That is, the image display apparatus 110 according to the second embodiment can visualize the relevance of all the past, present, and future contents, whereas the image display apparatus 100 according to the first embodiment visualizes the relevance of the past contents.

According to the image display apparatus 110 in the second embodiment, because the relevance between a certain content (content to be processed) and other past, present, and future content groups can be dynamically visualized, the user can easily recognize the relevance among many contents of different media.

A first modification of the second embodiment is explained next. Like reference numerals are designated to like configurations in the image display apparatus 110, and explanations thereof will be omitted.

Figure 32:
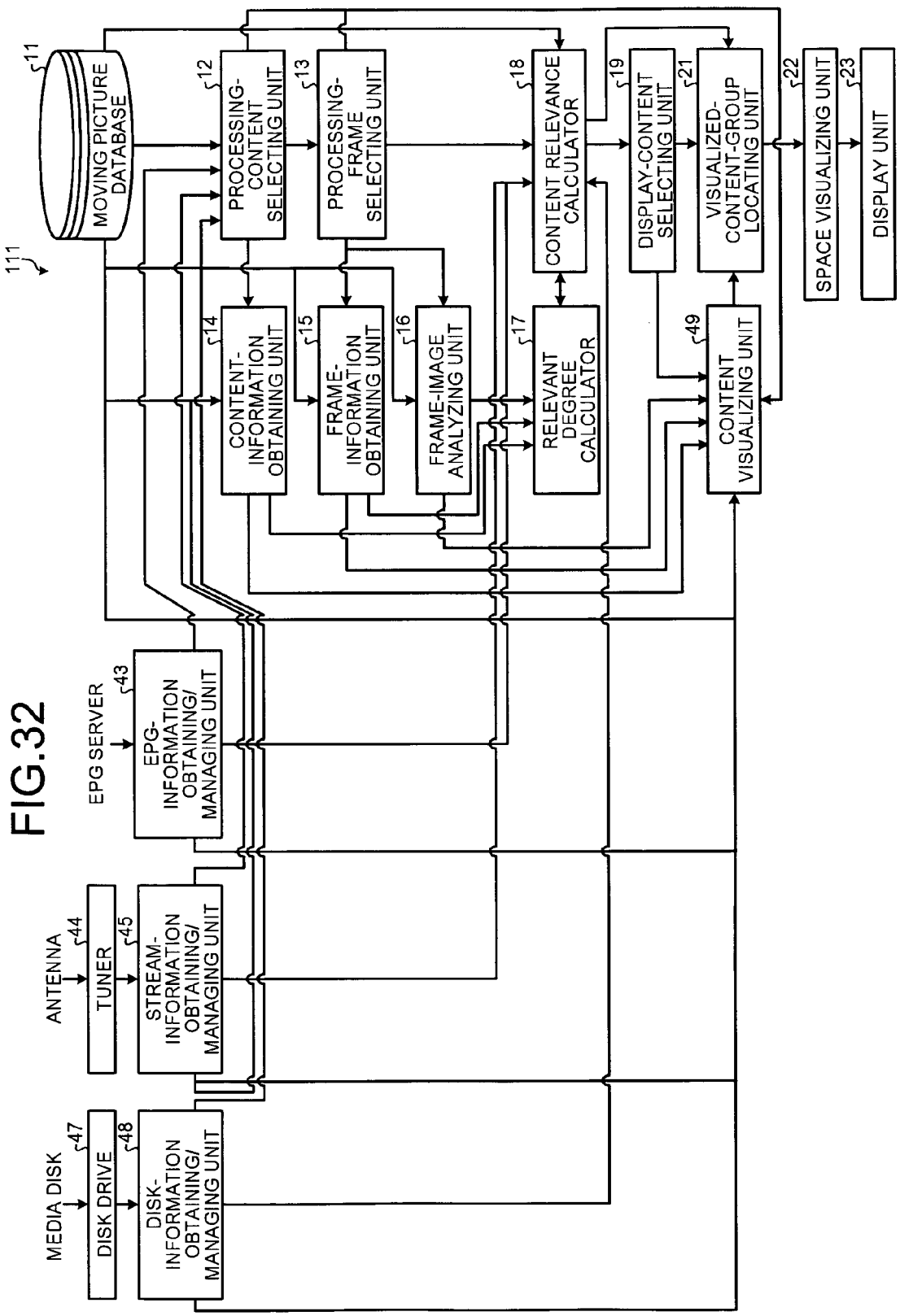
FIG. 32 is a diagram illustrating a configuration of an image display apparatus according to a first modification of the second embodiment.

FIG. 32 is a block diagram of a functional configuration of an image display apparatus 111 according to the first modification of the second embodiment. As shown in FIG. 32, the image display apparatus 111 includes a disk drive 47, a disk-information obtaining/managing unit 48, and a content visualizing unit 49 in addition to the moving picture database 11, the processing-content selecting unit 12, the processing-frame selecting unit 13, the content-information obtaining unit 14, the frame-information obtaining unit 15, the frame-image analyzing unit 16, the relevant degree calculator 17, the content relevance calculator 18, the display-content selecting unit 19, the visualized-content-group locating unit 21, the space visualizing unit 22, the display unit 23, the EPG-information obtaining/managing unit 43, the tuner 44, and the stream-information obtaining/managing unit 45.

The disk drive 47 is a functional unit realized by the media reader. The disk-information obtaining/managing unit 48 and the content visualizing unit 49 are functional units realized by executing various programs stored in the storage unit by the controller.

The disk drive 47 reads a disk medium on which the moving picture data is stored, such as a DVD disk, HD-DVD disk, Blu-ray disc, or Video CD disk.

The disk-information obtaining/managing unit 48 interprets the data obtained from the disk drive 47 as a content, and also obtains and manages the content information. Specifically, for example, the disk-information obtaining/managing unit 48 obtains the moving picture data stored in the DVD disk as a content from the DVD disk read by the disk drive 47, and obtains information of the moving picture data (genre, title, subtitle, program summary, performers' list, chapter information, and the like) as the content information, to manage these pieces of information by relating each other. The content and the content information obtained by the disk-information obtaining/managing unit 4B can be accumulated in the moving picture database 11.

In the first modification of the second embodiment, the operations of the processing-content selecting unit 12, the content-information obtaining unit 14, and the content relevance calculator 18 are the same as those in the first embodiment. However, the content groups managed in the disk-information obtaining/managing unit 48 are also intended to be processed, as well as the content groups accumulated in the moving picture database 11 and the content groups managed by the EPG-information obtaining/managing unit 43 and the stream-information obtaining/managing unit 45.

The content visualizing unit 49 has the same function as that of the content visualizing unit 46, to visualize the display content selected by the display-content selecting unit 19, by using the contents and the content information managed by the disk-information obtaining/managing unit 48.

The content visualizing unit 49 changes the visualization method and the layout configuration according to the type of the information source. For example, in the case of a movie obtained from the DVD, an "icon indicating FVF", which shows the information source, is arranged together, the background is changed to a specific one, or layout elements are changed, to discriminate the information source.

Thus, according to the configuration of the first modification of the second embodiment, because the contents such as a movie stored on the recording medium such as the DVD can be seamlessly handled, in addition to the visualization of the relevance of the past, present, and future contents, the user can easily confirm the relevance among many contents of different media.

A second modification of the second embodiment is explained next. Like reference numerals are designated to like configurations in the image display apparatus 110, and explanations thereof will be omitted.

Figure 33:
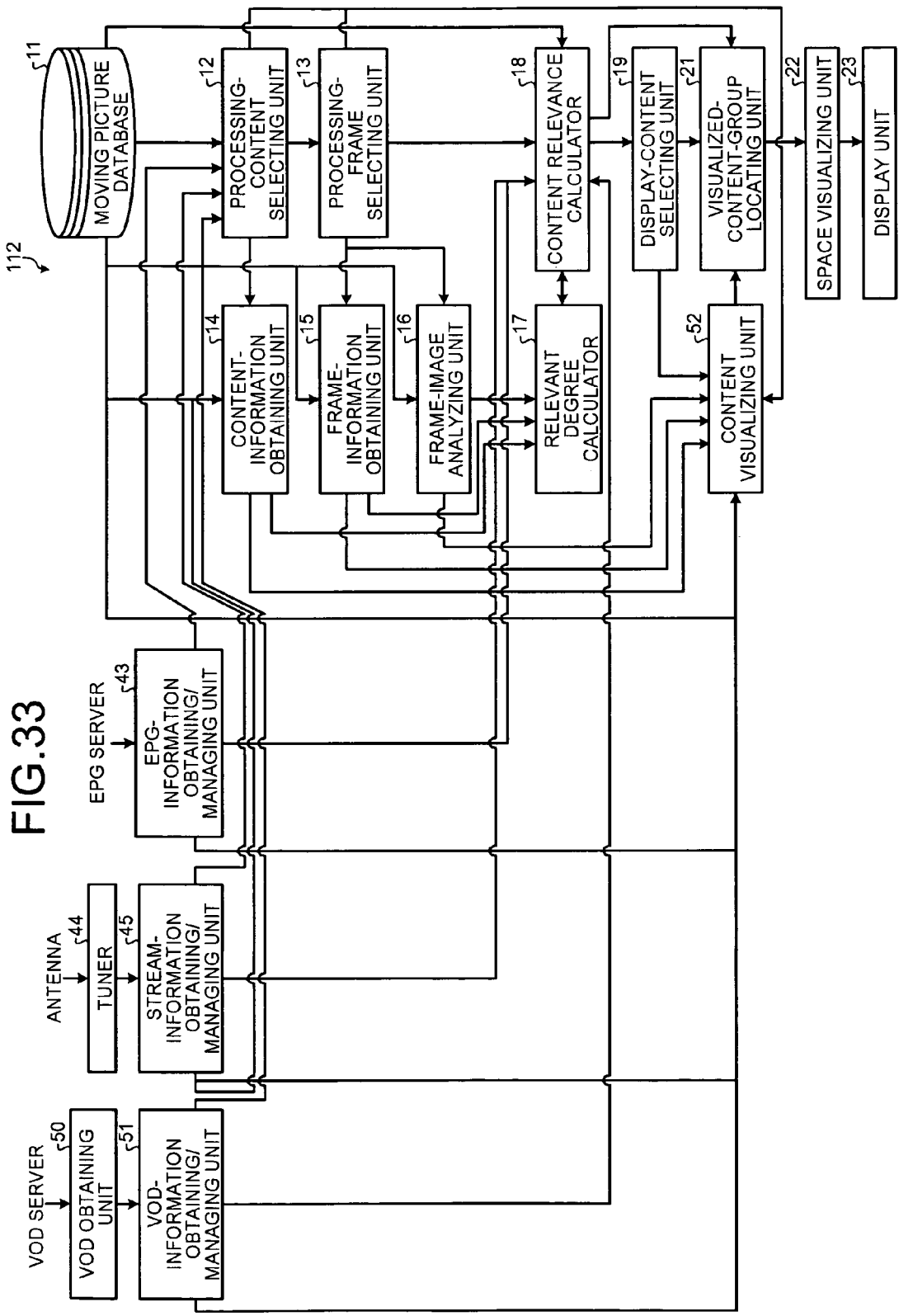
FIG. 33 is a diagram illustrating a configuration of an image display apparatus according to a second modification of the second embodiment.

FIG. 33 is a block diagram of a functional configuration of an image display apparatus 112 according to the second modification of the second embodiment. As shown in FIG. 33, the image display apparatus 112 includes a VOD obtaining unit 50, a VOD-information obtaining/managing unit 51, and a content visualizing unit 52 in addition to the moving picture database 11, the processing-content selecting unit 12, the processing-frame selecting unit 13, the content-information obtaining unit 14, the frame-information obtaining unit 15, the frame-image analyzing unit 16, the relevant degree calculator 17, the content relevance calculator 18, the display-content selecting unit 19, the visualized-content-group locating unit 21, the space visualizing unit 22, the display unit 23, the EPG-information obtaining/managing unit 43, the tuner 44, and the stream-information obtaining/managing unit 45.

The VOD obtaining unit 50 is a functional unit realized by the media reader. The VOD-information obtaining/managing unit 51 and the content visualizing unit 52 are functional units realized by executing various programs stored in the storage unit by the controller.

The VOD obtaining unit 50 obtains the moving picture data from a server that distributes the moving picture data. Specifically, for example, the VOD obtaining unit 50 obtains the moving picture data from a service provider that provides the moving picture data via the Internet by performing a predetermined procedure such as a purchase procedure. When the moving picture data is free, the moving picture data can be directly downloaded without performing the purchase procedure.

The VOD-information obtaining/managing unit 51 interprets the moving picture data obtained from the VOD obtaining unit 50 as the content, and obtains and manages the content information of the content. Specifically, for example, the VOD-information obtaining/managing unit 51 accumulates the contents obtained via the Internet in the storage unit, and also accumulates the information of the content (genre, title, subtitle, program summary, and performers' list) as the content information in relation to each other. The content and the content information obtained by the VOD-information obtaining/managing unit 51 can be accumulated in the moving picture database 11.

In the second modification of the second embodiment, the operations of the processing-content selecting unit 12, the content-information obtaining unit 14, and the content relevance calculator 18 are the same as those in the first embodiment. However, the content group managed by the VOD-information obtaining/managing unit 51 is also intended to be processed, as well as the content groups accumulated in the moving picture database 11 and the content groups managed by the EPG-information obtaining/managing unit 43 and the stream-information obtaining/managing unit 45.

The content visualizing unit 52 has the same function as that of the content visualizing unit 46, to visualize the display content selected by the display-content selecting unit 19, by using the contents and the content information managed by the VOD-information obtaining/managing unit 51.

The content visualizing unit 52 changes the visualization method and the layout configuration according to the type of the information source. For example, in the case of a moving picture data obtained from an external VOD server, an icon that indicates the information source is arranged together, the background is changed to a specific one, or layout elements are changed, to discriminate the information source.

Thus, according to the configuration of the second modification of the second embodiment, because the content obtained from the VOD server can be seamlessly handled, in addition to the visualization of the relevance of the past, present, and future contents, the user can easily confirm the relevance among many contents of different media.

A third modification of the second embodiment is explained next. Like reference numerals are designated to like configurations in the image display apparatus 110, and explanations thereof will be omitted.

Figure 34:
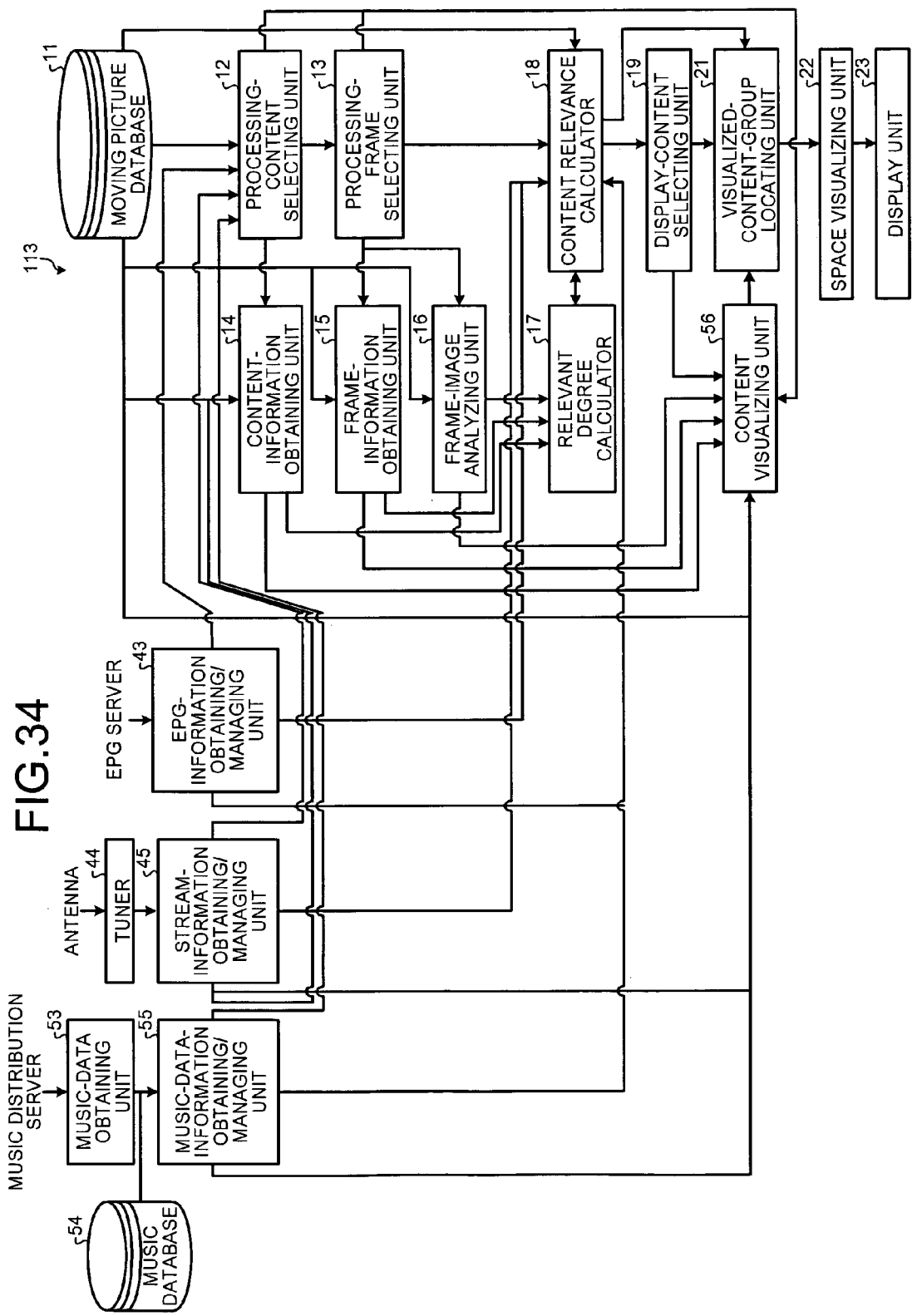
FIG. 34 is a diagram illustrating a configuration of an image display apparatus according to a third modification of the second embodiment.

FIG. 34 is a block diagram of a functional configuration of an image display apparatus 113 according to the third modification of the second embodiment. As shown in FIG. 34, the image display apparatus 113 includes a music-data obtaining unit 53, a music database 54, a music-data-information obtaining/managing unit 55, and a content visualizing unit 56 in addition to the moving picture database 11, the processing-content selecting unit 12, the processing-frame selecting unit 13, the content-information obtaining unit 14, the frame-information obtaining unit 15, the frame-image analyzing unit 16, the relevant degree calculator 17, the content relevance calculator 18, the display-content selecting unit 19, the visualized-content-group locating unit 21, the space visualizing unit 22, the display unit 23, the EPG-information obtaining/managing unit 43, the tuner 44, and the stream-information obtaining/managing unit 45.

The music-data obtaining unit 53 is a functional unit realized by the communication unit. The music database 54 is a functional unit realized by the storage unit. The music-data-information obtaining/managing unit 55 and the content visualizing unit 56 are functional units realized by executing various programs stored in the storage unit by the controller.

The music-data obtaining unit 53 obtains music data from the external server that distributes the music data, and accumulates the music data in the music database 54. Specifically, for example, the music-data obtaining unit 53 obtains the music data from a service provider that provides the music data via the Internet by performing a predetermined procedure such as the purchase procedure. When the music data is free, the music data can be directly downloaded without performing the purchase procedure.

The music database 54 accumulates the music data and has the same function as that of the moving picture database 11. The music data accumulated in the music database 54 is stored in a format of waveform (WAV), MP3, audio interchange file format (AIFF), or the like, and includes text information of the title or the artist name of an album, the title of a song, lyric writer, composer, producer, list of participated artists, and the like. The music database 54 can accumulate the music data corresponding to image data such as a jacket photograph or the artist's photograph relating to the music data, and moving picture data such as a promotional video clip.

The music-data-information obtaining/managing unit 55 obtains the music data obtained from at least one of the music-data obtaining unit 53 and the music database 54 as a content, and also obtains information of the music data (text information or the like) as the content information, to manage the content and the content information in relation to each other.

Specifically, among the pieces of information of the music data, the music-data-information obtaining/managing unit 55 obtains the image data and the moving picture data as a content, and obtains the information of the image data and the moving picture data as frame information. The music-data-information obtaining/managing unit 55 obtains information other than the frame information as content information. The content and the content information obtained by the music-data-information obtaining/managing unit 55 can be accumulated in the moving picture database 11.

In the third modification of the second embodiment, the operations of the processing-content selecting unit 12, the content-information obtaining unit 14, and the content relevance calculator 18 are the same as those in the first embodiment. However, the content group managed by the music-data-information obtaining/managing unit 55 is also intended to be processed, as well as the content groups accumulated in the moving picture database 11 and the content groups managed by the EPG-information obtaining/managing unit 43 and the stream-information obtaining/managing unit 45.

The content visualizing unit 56 has the same function as that of the content visualizing unit 46, to visualize the display content by using the contents and the content information managed by the music-data-information obtaining/managing unit 55.

The content visualizing unit 56 changes the visualization method and the layout configuration according to the type of the information source. For example, an "icon showing CD or musical notes", which indicates that the information is music data, is arranged together, the background is changed to a specific one, or layout elements are changed, to discriminate the information source.

Thus, according to the configuration of the third modification of the second embodiment, because the music data can be seamlessly handled as the content, in addition to the visualization of the relevance of the past, present, and future contents; the relevance of all the contents can be visualized.

While an instance of a non-moving picture content such as "music data" has been explained above, the present invention is not limited thereto, and can seamlessly handle various non-moving picture contents by using the same method.

A fourth modification of the second embodiment is explained next. Like reference numerals are designated to like configurations in the image display apparatus 110, and explanations thereof will be omitted.

Figure 35:
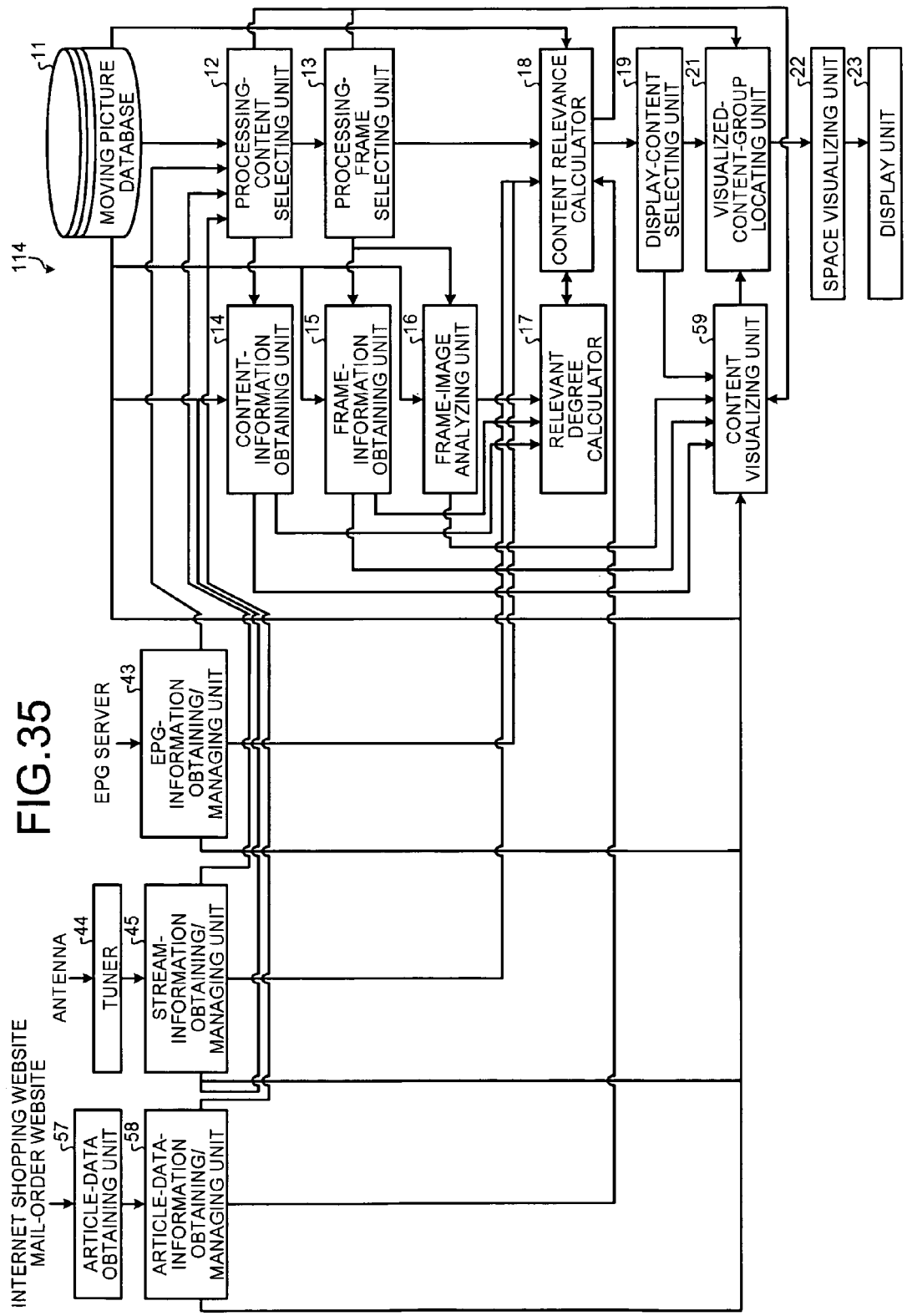
FIG. 35 is a diagram illustrating a configuration of an image display apparatus according to a fourth modification of the second embodiment.

FIG. 35 is a block diagram of a functional configuration of an image display apparatus 114 according to the fourth modification of the second embodiment. As shown in FIG. 35, the image display apparatus 114 includes an article-data obtaining unit 57, an article-data-information obtaining/managing unit 58, and a content visualizing unit 59 in addition to the moving picture database 11, the processing-content selecting unit 12, the processing-frame selecting unit 13, the content-information obtaining unit 14, the frame-information obtaining unit 15, the frame-image analyzing unit 16, the relevant degree calculator 17, the content relevance calculator 18, the display-content selecting unit 19, the visualized-content-group locating unit 21, the space visualizing unit 22, the display unit 23, the EPG-information obtaining/managing unit 43, the tuner 44, and the stream-information obtaining/managing unit 45.

The article-data obtaining unit 57 is a functional unit realized by the communication unit. The article-data-information obtaining/managing unit 58 and the content visualizing unit 59 are functional units realized by executing various programs stored in the storage unit by the controller.

The article-data obtaining unit 57 obtains data of articles from a website (external server) that runs Internet shopping business or mail-order business. Specifically, the article-data obtaining unit 57 obtains article catalog data from, for example, a service provider who sells articles via the Internet. The catalog data can be obtained, for example, in such a manner that the article-data obtaining unit 57 receives the catalog data changed to an easily obtainable format by the article-data by the service provider or the article-data obtaining unit 57 interprets a source (described in a Hypertext Markup Language (HTML) or Extensible Markup Language (XML)) in an article browsing Web page of the service provider to obtain the data.

The article-data-information obtaining/managing unit 58 obtains article data as a content via the article-data obtaining unit 57, and also obtains information of the article data as content information, to manage the content and the content information in relation to each other. The information of the article data means information indicating a characteristic specific to the article data and includes, for example, text information such as the trade name, specification, sales timing, price, seller, product number, and article summary; image data such as a photograph of the article; and moving picture data such as a promotional video clip.

More specifically, among the pieces of information of the article data, image data and moving picture data are obtained as the content, and information of the images (or frame images) constituting these data is handled as the frame information. Information other than the frame information is obtained as the content information. The contents and the content information obtained by the article-data-information obtaining/managing unit 58 can be accumulated in the moving picture database 11.

In the fourth modification of the second embodiment, the operations of the processing-content selecting unit 12, the content-information obtaining unit 14, and the content relevance calculator 18 are the same as those in the first embodiment. However, the content group managed by the article-data-information obtaining/managing unit 58 is also intended to be processed, in addition to the content groups accumulated in the moving picture database 11 and the content groups managed by the EPG-information obtaining/managing unit 43 and the stream-information obtaining/managing unit 45.

The content visualizing unit 59 has the same function as that of the content visualizing unit 46, to visualize the display content by using the contents and the content information managed by the article-data-information obtaining/managing unit 58.

The content visualizing unit 59 changes the visualization method and the layout configuration according to the type of the information source. For example, an "icon indicating Internet shopping website", which indicates that the information is article data, is arranged together, the background is changed to a specific one, layout elements are changed to discriminate the information source, or rendering result of the Web page is turned into a thumbnail image.

Thus, according to the configuration of the fourth modification of the second embodiment, "articles in Internet shopping website or mail-order website", which is a quite different object, can be seamlessly handled as the content, in addition to the visualization of the relevance of the past, present, and future contents, thereby enabling visualization of all image media and article data related therewith, together with the relevance thereof.

While an instance of article data in the Internet shopping website has been explained above, the present invention is not limited thereto, and can handle arbitrary physical objects in the same manner.

An image display apparatus according to a third embodiment of the present invention is explained. Like reference numerals are designated to like configurations in the image display apparatus 100, and explanations thereof will be omitted.

A hardware configuration of an image display apparatus 115 according to the third embodiment is explained first. The image display apparatus 115 includes a controller formed of a CPU and a GPU, a ROM for storing various data such as various programs and images, a storage unit including a RAM and an HDD, a communication unit that communicates with an external device, a receiver including an antenna and a tuner for receiving broadcasting, and a bus (not shown) for connecting these units, and a display apparatus and an input unit such as a keyboard and a mouse (not shown) are connected thereto.

Figure 36:
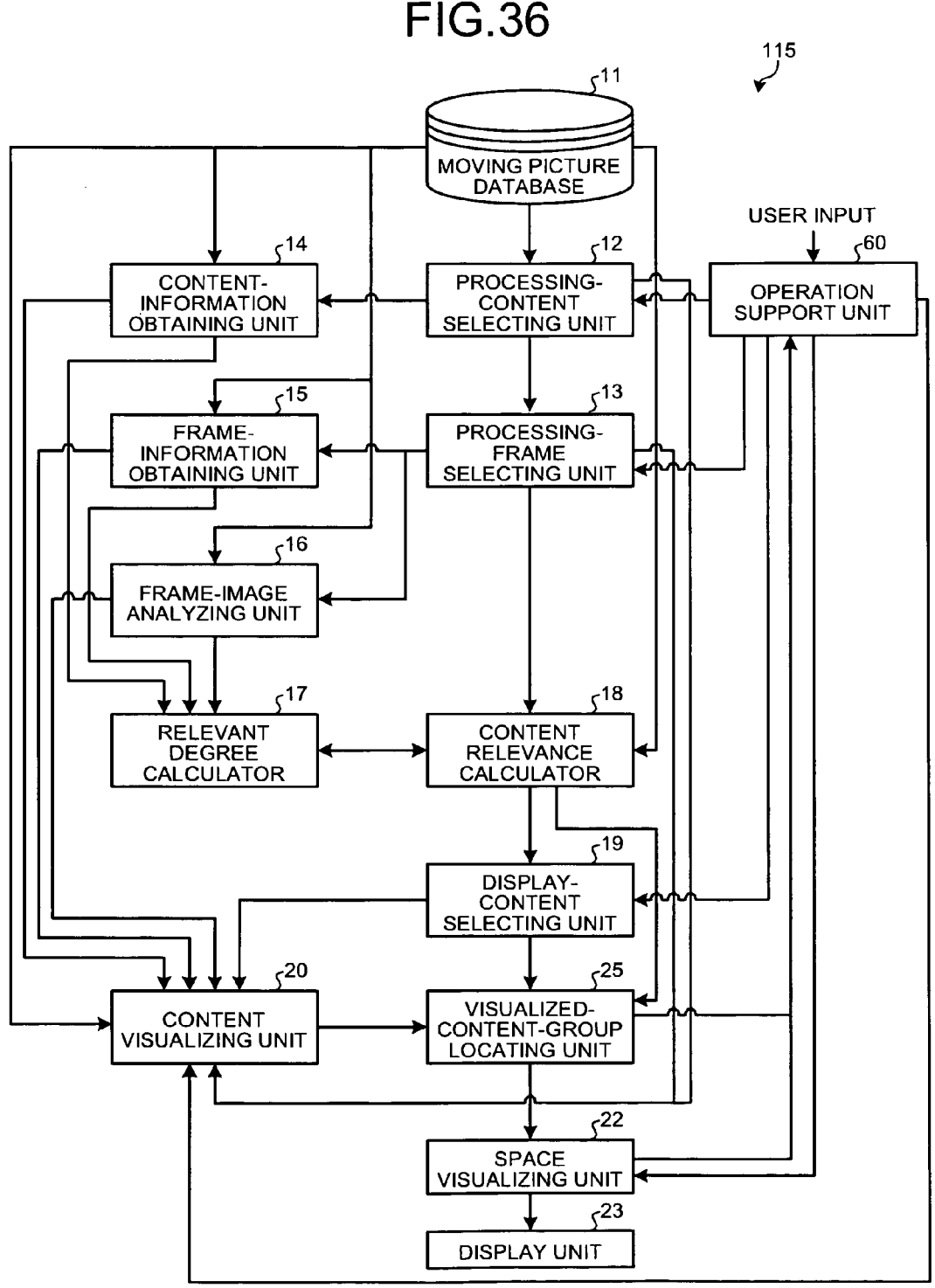
FIG. 36 is a diagram illustrating a configuration of an image display apparatus according to a third embodiment of the present invention.

A functional configuration of the image display apparatus 115 is explained next. FIG. 36 is a block diagram of the functional configuration of the image display apparatus 115 according to the third embodiment. As shown in FIG. 36, the image display apparatus 115 includes an operation support unit 60 in addition to the moving picture database 11, the processing-content selecting unit 12, the processing-frame selecting unit 13, the content-information obtaining unit 14, the frame-information obtaining unit 15, the frame-image analyzing unit 16, the relevant degree calculator 17, the content relevance calculator 18, the display-content selecting unit 19, the content visualizing unit 20, the space visualizing unit 22, and the display unit 23.

The operation support unit 60 is a functional unit realized by executing various programs stored in the storage unit by the controller in the image display apparatus 115.

The operation support unit 60 operates the image display apparatus 115 according to an input from the user. Specifically, when there is an operation input from the user by using the manual operating device such as a mouse or a remote control (not shown), the information is input to the operation support unit 60. An example using the mouse as the manual operating device is explained below when the user operates the mouse relying on a mouse cursor position appeared on a screen of the display unit 23, position information of the mouse is input to the operation support unit 60. The operation support unit 60 transmits the position information of the mouse to the space visualizing unit 22 to report that the mouse cursor is displayed at a corresponding position in the space visualizing unit 22.

The operation support unit 60 specifies the visualized content present under the current mouse position (mouse cursor position) by using the layout information of the visualized content group obtained from the visualized-content-group locating unit 21 and viewpoint information for rendering obtained from the space visualizing unit 22. Specifically, the operation support unit 60 emits rays (light) from the mouse cursor position (mouse coordinate position in a screen space) in viewpoint vector directions in the virtual space by using a ray tracing method, and specifies a visualized content, which is on the hithermost side as seen from the viewpoint, among the visualized contents intersecting with the rays. The visualized content can be specified by obtaining a three-dimensional intersection coordinate between a straight line starting from the viewpoint position and the visualized content observable from the viewpoint position.

The operation support unit 60 notifies the space visualizing unit 22 of instruction information corresponding to the operation content from the user. Specifically, when the user performs a determination operation, for example, by pressing a left click button, the operation support unit 60 sends a notification for selecting the visualized content present under the mouse cursor position as a new content to be processed to the processing-content selecting unit 12. When the new content to be processed is selected, the respective functional units perform the image display process based on the newly selected content to be processed. That is, the relevance between the newly selected content to be processed and other contents is visualized.

Upon reception of selection of a specific frame image from the frame images displayed for the content to be processed, the operation support unit 60 notifies the processing-frame selecting unit 13 of an instruction for designating the frame image as a new frame to be processed. The respective functional units perform the image display process based on the newly selected frame to be processed. That is, the relevance between the newly selected frame to be processed and other frames is visualized.

Upon reception of a change of the selection condition of the content to be displayed, the operation support unit 60 notifies the display-content selecting unit 19 of the received instruction content. The display-content selecting unit 19 selects the display content according to the instruction content notified from the operation support unit 60.

For example, when there are many display contents as a result of space visualization by the space visualizing unit 22, a visualized content having a low degree of relevance is blocked by a visualized content having a high degree of relevance and cannot be clearly seen, depending on the layout by the visualized-content-group locating unit 21.

Specifically, when the virtual space is seen from above as shown in FIG. 8A, if there is the visualized content 202d under the visualized content 202a and the visualized content 202a blocks the most part of the visualized content 202d, the content of the visualized content 202d is hardly seen.

Change of the selection condition of the display contents is useful in the above cases, and for example, not only several visualized contents having higher degree of relevance can be selected, such that the content having the degree of relevance lower or higher than a predetermined value is selected, but also a specific effective range can be selected. Further, this selection is not always uniform in the virtual space. Therefore, when the user selects a specific area, the selection method is changed with respect to only the display contents in this area. Alternatively, the selection method can be instructed with a unit of visualized content.

According to the image display apparatus 115 in the third embodiment, because the visualization condition of the space visualizing unit 22 can be changed according to the operation content of the user, the user can dynamically operate the display content of the image display apparatus. That is, according to the image display apparatus 115 in the third embodiment, the user can interactively enjoy viewing of the content and the visualization result of the relevance with the content, while freely selecting the content.

While an example using the mouse is shown in the third embodiment, the present invention is not limited thereto, and, for example, remote control or a keyboard can be also used.

The third embodiment can be combined with the first and the second embodiments. For example, the following manner is effective in the case of combining the third embodiment with the eighth modification of the first embodiment.

As explained in the third embodiment, the user uses the mouse or the like to shift from normal image viewing to a screen on which the relevance is visualized. Further, by selecting an arbitrary content by the mouse operation from the screen on which the relevance of content groups is visualized, the selected content can be designated as a center of visualization (that is, a new content to be processed).

Further, in the case of combination with the eighth modification of the first embodiment, a state where the content selected by the user operation is shifted to the center of visualization can be displayed in smooth animation. In this case, it is desired to contrive a calculation method of an interpolated value of the layout position by the layout-motion interpolating unit 39 for interpolating the animation according to the relationship between the eighth modification of the first embodiment and the third embodiment. Specifically, at the time of calculating the interpolated value, the interpolated position is preferably at a visualization position where the selected content is seen on a side nearer than any other visualized content groups, that is, it is not blocked by any other visualized content groups.

For example, when the viewpoint is upward on the Z axis, it can be realized by setting the Z value for the layout on nearer side than the visualized content located on the hithermost side. The same thing applies when the viewpoint is located at another position. When a method referred to as ray tracing is used to emit rays from the viewpoint to the visualized content, for which the interpolated position is to be calculated, and there are other visualized contents intersecting with the rays, the interpolated position can be selected at a position, which is on nearer side than the visualized content on the hithermost side as seen from the viewpoint, among other visualized contents intersecting with the rays.

A first modification of the third embodiment is explained next. Like reference numerals are designated to like configurations of the image display apparatuses 114 and 115, and therefore explanations thereof will be omitted.

Figure 37:
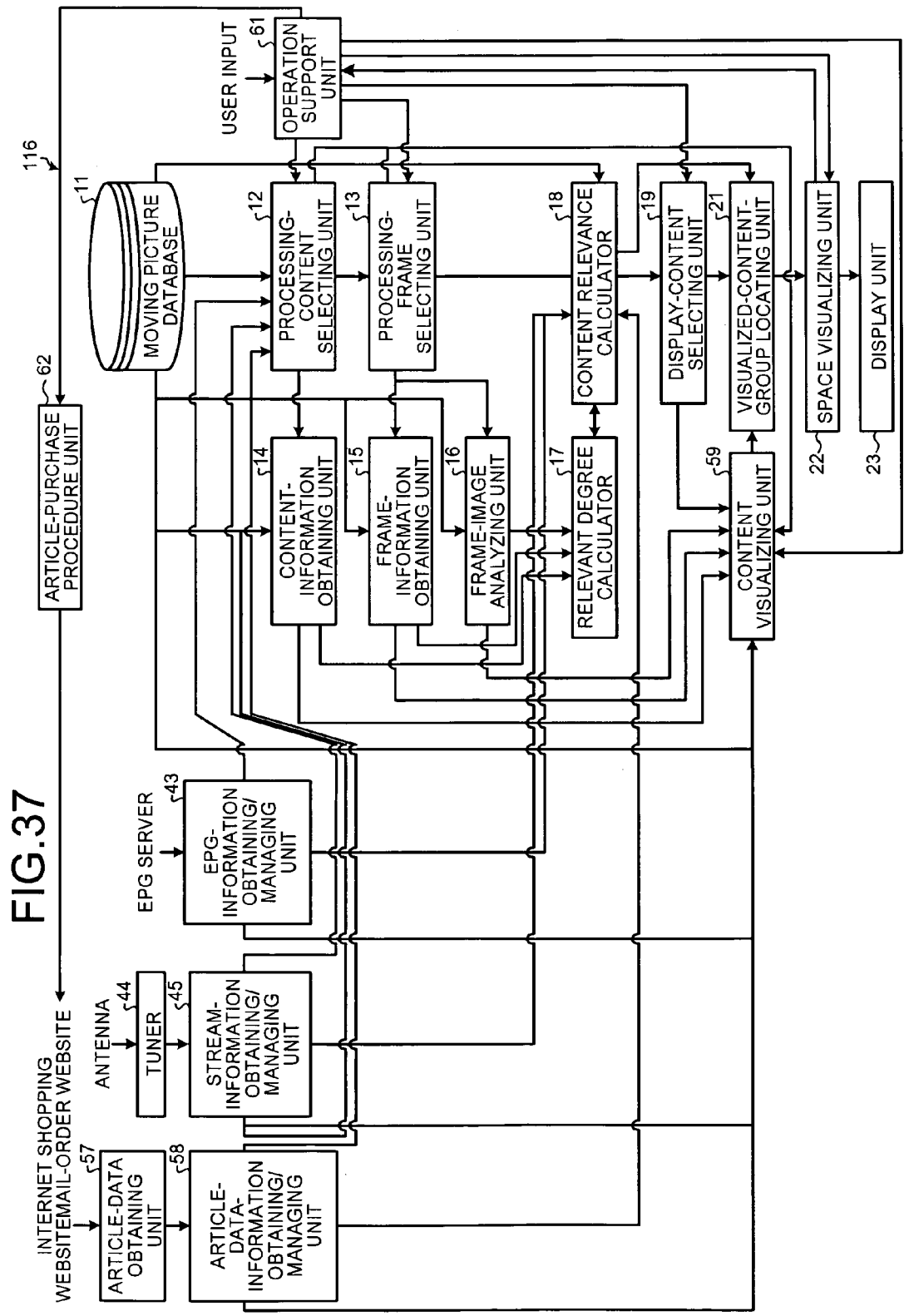
FIG. 37 is a diagram illustrating a configuration of an image display apparatus according to a first modification of the third embodiment.

FIG. 37 is a block diagram of a functional configuration of an image display apparatus 116 according to the first modification of the third embodiment. As shown in FIG. 37, the image display apparatus 116 includes an operation support unit 61 and an article-purchase procedure unit 62 in addition to the moving picture database 11, the processing-content selecting unit 12, the processing-frame selecting unit 13, the content-information obtaining unit 14, the frame-information obtaining unit 15, the frame-image analyzing unit 16, the relevant degree calculator 17, the content relevance calculator 18, the display-content selecting unit 19, the visualized-content-group locating unit 21, the space visualizing unit 22, the display unit 23, the EPG-information obtaining/managing unit 43, the tuner 44, the stream-information obtaining/managing unit 45, the article-data obtaining unit 57, the article-data-information obtaining/managing unit 58, and the content visualizing unit 59.

The operation support unit 61 and the article-purchase procedure unit 62 are functional units realized by executing various programs stored in the storage unit by the controller.

When the user receives an instruction for selecting any one data managed by the article-data-information obtaining/managing unit 58 as visualized context data, the operation support unit 61 displays a screen urging the user to purchase the article indicated by the data, in addition to the function explained in the third embodiment. For example, this is realized by displaying a GUI screen expressing a message whether to purchase the article, and selecting a button "Yes" or "No" arranged thereon by a mouse.

Further, upon reception of selection whether to purchase the article from the user, the operation support unit 61 outputs the selection result to the article-purchase procedure unit 62.

The article-purchase procedure unit 62 performs a procedure for purchasing an article in the Internet shopping or mail-order website, from which the article data is obtained by the article-data obtaining unit 57, according to the user input received by the operation support unit 61. Specifically, upon reception of a notification from the operation support unit 60 indicating that the user has selected to purchase the article, on behalf of the user, the article-purchase procedure unit 62 performs the purchase procedure of the article in the Internet shopping or mail-order website, from which the article data is obtained by the article-data obtaining unit 57.

Thus, according to the first modification of the third embodiment, by selecting a content relating to the Internet shopping website or mail-order website from the visualized contents, the user can casually purchase an article indicated by the content. At the time of viewing certain moving picture data, articles appearing in the moving picture data are located around the content to be processed as contents relating to the Internet shopping website or mail-order website, which has high relevance. Therefore, articles appearing in the image currently viewed can be purchased without positively performing article search.

The article-purchase procedure unit 62 is provided in the first modification of the third embodiment. However, instead of the article-purchase procedure unit 62, an article-site guiding unit (not shown) for guiding the user to an Internet shopping website or a mail-order website, from which the article data is obtained by the article-data obtaining unit 57, can be provided.

The article-site guiding unit is a functional unit that provides a hyperlink for the user to access the shopping website. Specifically, the article-site guiding unit activates a Web viewer, where a top page, an article purchase page, or the like of an Internet shopping website or mail-order website, from which the article data is obtained by the article-data obtaining unit 57, is displayed. Accordingly, the user can easily access the Internet shopping website or mail-order website.

A second modification of the third embodiment is explained next. Like reference numerals are designated to like configurations of the image display apparatuses 114 and 115, and therefore explanations thereof will be omitted.

FIG. 38 is a block diagram of a functional configuration of an image display apparatus 117 according to the second modification of the third embodiment. As shown in FIG. 37, the image display apparatus 117 includes an accounting unit 63 in addition to the moving picture database 11, the processing-content selecting unit 12, the processing-frame selecting unit 13, the content-information obtaining unit 14, the frame-information obtaining unit 15, the frame-image analyzing unit 16, the relevant degree calculator 17, the content relevance calculator 18, the display-content selecting unit 19, the visualized-content-group locating unit 21, the space visualizing unit 22, the display unit 23, the EPG-information obtaining/managing unit 43, the tuner 44, the stream-information obtaining/managing unit 45, the article-data obtaining unit 57, the article-data-information obtaining/managing unit 58, the content visualizing unit 59, the operation support unit 61, and the article-purchase procedure unit 62.

The accounting unit 63 is a functional unit realized by executing various programs stored in the storage unit by the controller.

The accounting unit 63 is a functional unit that pays a fee for article purchase guidance to a service provider of the image display apparatus 117, when the user purchases an article by using the article-purchase procedure unit 62. It is assumed that the service provider of the image display apparatus 117 has an agreement for article sales with an operator of the Internet shopping website or mail-order website, from which the article data is obtained by the article-data obtaining unit 57. The content of the agreement is, for example, an agreement for the fee such that when an article is purchased by using the article-purchase procedure unit 62 in the image display apparatus 117, a margin is to be paid as the fee for the article purchase guidance with respect to the service provider of the image display apparatus 117.

Thus, according to the configuration of the second modification of the third embodiment, such a service can be realized that when the user has purchased an article from the Internet shopping website or mail-order website through the image display apparatus 117, the service provider of the image display apparatus 117 can receive the margin. Further, by combining the second modification of the third embodiment with a unit (not shown) that guides to a website of a certain article, such a service can be provided that the service provider of the image display apparatus 117 can receive the margin as the fee for guiding to a website of the article, only by guiding the user to the webpage of the Internet shopping website or mail-order website, from which the article data is obtained by the article-data obtaining unit 57.

While the first to third embodiments of the present invention have been explained above, the present invention is not limited thereto, and various modifications, substitutions, and additions can be made without departing from the scope of the present invention.

For example, the processes in the above embodiments can be realized by a computer executable program, and the program can be realized as a computer readable storage medium. The storage medium in the present invention includes a magnetic disk, an optical disk, a magneto-optical disk, and a semiconductor that can store programs and can be read by a computer or an incorporated computer system, and a memory format thereof can be of any format.

Further, a part of the processes for realizing the embodiments can be performed by an office system (OS) or middleware such as database management software and a network operating on the computer based on an instruction of the program installed by the storage medium to the computer or the incorporated computer system. The "storage medium" is not limited to a medium independent of the computer or incorporated computer system, and includes a storage medium on which a program transmitted through a local area network (LAN) or the Internet is downloaded and stored. Further, the number of the storage medium for storing the program is not limited to one, and programs involved with the processes in the above embodiments respectively stored on a plurality of storage media can be of read and performed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image display apparatus comprising:
a storage unit that stores moving picture contents in which frame information indicating a characteristic of each frame is added to any one or all of a series of frames constituting a moving picture, and content information indicating a characteristic of each of the moving picture contents;
a content selecting unit that selects a moving picture content to be processed from the moving picture contents stored in the storage unit;
a first relevant degree calculator that calculates a degree of relevance between the moving picture content to be processed and respective other moving picture contents, based on a similarity between content information related to the moving picture content to be processed and content information related to the moving picture contents other than the moving picture content to be processed stored in the storage unit;
a frame selecting unit that selects at least one frame contained in the moving picture content from the moving picture content to be processed, as a frame to be processed;
a second relevant degree calculator that calculates a degree of relevance between the moving picture content to be processed and respective other moving picture contents, based on a similarity between frame information added to the frame to be processed and frame information added to the frames in other moving picture contents;
an image analyzing unit that analyzes an image characteristic of an image contained in the frame to be processed and each frame constituting other moving picture contents;
a third relevant degree calculator that calculates a degree of relevance between the moving picture content to be processed and respective other moving picture contents, based on a similarity between an image analysis result of the frame to be processed and an image analysis result of frames in the other moving picture contents;
a content relevance calculator that calculates a comprehensive degree of relevance of each of the other moving picture contents with respect to the moving picture content to be processed, using the degree of relevance calculated by at least one of the first relevant degree calculator, the second relevant degree calculator, and the third relevant degree calculator;
a display-content selecting unit that selects a moving picture content to be displayed from the other moving picture contents, based on the comprehensive degree of relevance calculated by the content relevance calculator;
a content visualizing unit that generates a visualized content obtained by symbolizing the moving picture content to be processed and the moving picture content to be displayed, respectively;
a locating unit that locates a visualized content corresponding to the moving picture content to be processed in a virtual space, and respectively locates a visualized content corresponding to each moving picture content to be displayed at a position away from a layout position thereof according to the comprehensive degree of relevance of each moving picture content to be displayed;
a space visualizing unit that visualizes the virtual space, in which the visualized content is located, in a displayable state; and
a display unit that displays the visualized virtual space.

2. The apparatus according to claim 1, wherein the virtual space is a three-dimensional space, and
the locating unit respectively locates the visualized content corresponding to each moving picture content to be displayed, at a position away from the layout position of the visualized content corresponding to the moving picture content to be processed according to the degree of relevance of the moving picture content to be displayed, based on one coordinate system constituting the three-dimensional space, and respectively locates the visualized content corresponding to each moving picture content to be displayed in a predetermined region in a plane formed by the other two coordinates of the three-dimensional space categorized for each characteristic of the moving picture content, based on the content information of each moving picture content to be displayed.

3. The apparatus according to claim 2, wherein the locating unit allocates each characteristic of the moving picture content to each orientation direction in the plane based on the layout position of the visualized content corresponding to the moving picture content to be processed.

4. The apparatus according to claim 1, further comprising:
a receiving unit that receives a selection of a specific visualized content from the visualized contents present in the virtual space displayed by the display unit, wherein
the content selecting unit selects a moving picture content corresponding to the selected specific visualized content as the moving picture content to be processed.

5. The apparatus according to claim 1, further comprising:
a layout-history managing unit that correspondingly stores the layout position in the virtual space of the visualized content located in the virtual space by the locating unit, the characteristic of the moving picture content corresponding to the visualized content, and the degree of relevance, wherein
the locating unit locates the visualized contents of the moving picture content having the same characteristic and substantially the same degree of relevance in the layout position stored corresponding to the characteristic and the degree of relevance, based on the layout-history managing unit.

6. The apparatus according to claim 1, further comprising:
an analyzing unit that analyzes a biased state of the visualized content located in the virtual space, wherein
the locating unit biases a coordinate system constituting the virtual space according to an analysis result by the analyzing unit.

7. The apparatus according to claim 1, further comprising:
an analyzing unit that analyzes a biased state of the visualized content located in the virtual space, wherein
the display-content selecting unit restricts the number of moving picture contents to be displayed, which are selected from the other moving picture contents, according to the analysis result by the analyzing unit.

8. The apparatus according to claim 1, further comprising:
an analyzing unit that analyzes a biased state of the visualized content located in the virtual space, wherein
the content visualizing unit combines a plurality of visualized contents in the biased state, according to the analysis result by the analyzing unit, thereby generating a new visualized content.

9. The apparatus according to claim 1, further comprising:
an analyzing unit that analyzes a biased state of the visualized content located in the virtual space; and
a content fabricating unit that combines the contents to be displayed according to the analysis result by the analyzing unit, to generate a new content to be displayed.

10. The apparatus according to claim 1, further comprising:
a relevance analyzing unit that analyzes a biased state of the visualized content located in the virtual space based on the degree of relevance calculated by the content relevance calculator and a layout status of the visualized content by the locating unit, wherein
the space visualizing unit changes a condition involved in visualization of the virtual space according to the analysis result by the relevance analyzing unit.

11. The apparatus according to claim 1, further comprising:
a layout-motion interpolating unit that interpolates the layout position of each visualized content located in the virtual space for every screen display interval of the display unit, wherein
the space visualizing unit updates the display of the virtual space for every screen display interval.

12. The apparatus according to claim 1, further comprising:
an electronic-program-guide managing unit that obtains electronic program guides from a server that distributes the electronic program guides, manages the electronic program guides as the content information, and manages moving picture data relating to the electronic program guides as the moving picture content;
a receiving unit that obtains stream-distributed data; and
a stream managing unit that manages the data obtained by the receiving unit as the moving picture content, and manages information of the data as the content information.

13. An image display apparatus comprising:
a storage unit that stores a plurality of moving picture contents;
a content selecting unit that selects a moving picture content to be processed from the moving picture contents stored in the storage unit;
a content relevance calculator that calculates a degree of relevance of each of moving picture contents other than the moving picture content to be processed with respect to the moving picture content to be processed, based on a degree of similarity between a characteristic of the moving picture content to be processed and a characteristic of the other moving picture contents stored in the storage unit;
a content visualizing unit that generates visualized contents obtained by symbolizing the moving picture content to be processed and the other moving picture contents, respectively;
a locating unit that locates a visualized content corresponding to the moving picture content to be processed in a virtual space, and respectively locates a visualized content corresponding to each of the other moving picture contents at a position away from the located position of the moving picture content to be processed to the extent according to the degree of relevance of each of the other moving picture contents;
a space visualizing unit that visualizes the virtual space, in which the visualized contents are located, in a displayable state; and
a display unit that displays the visualized virtual space.

14. The apparatus according to claim 13, further comprising:
a display-content selecting unit that selects a moving picture content to be displayed from the other moving picture contents, based on the degree of relevance calculated by the content relevance calculator; wherein the content visualizing unit further generates visualized contents obtained by symbolizing the moving picture content to be displayed; and the locating unit locates the respective visualized contents corresponding to the moving picture content to be displayed at a position away from the located position of the visualized contents corresponding to the moving picture content to be processed to the extent according to the degree of relevance of each of the moving picture contents to be displayed.

15. A non-transitory computer readable medium having stored programmed instructions for displaying images, wherein the instructions, when executed by a computer, cause the computer to perform:

selecting a moving picture content to be processed from the moving picture contents stored in a storage unit that stores moving picture contents in which frame information indicating a characteristic of each frame is added to any one or all of a series of frames constituting a moving picture, and content information indicating a characteristic of each of the moving picture contents, each of the moving picture contents and the content information being related to each other;

first calculating a degree of relevance between the moving picture content to be processed and respective other moving picture contents, based on a similarity between content information related to the moving picture content to be processed and content information related to the moving picture contents other than the moving picture content to be processed stored in the storage unit;

selecting at least one frame contained in the moving picture content from the moving picture content to be processed, as a frame to be processed;

second calculating a degree of relevance between the moving picture content to be processed and respective other moving picture contents, based on a similarity between frame information added to the frame to be processed and frame information added to the frames in other moving picture contents;

analyzing an image characteristic of an image contained in the frame to be processed and each frame constituting other moving picture contents;

third calculating a degree of relevance between the moving picture content to be processed and respective other moving picture contents, based on a similarity between an image analysis result of the frame to be processed and an image analysis result of frames in the other moving picture contents;

calculating a comprehensive degree of relevance of each of the other moving picture contents with respect to the moving picture content to be processed, using the degree of relevance calculated by at least one of the first relevant degree calculator, the second relevant degree calculator, and the third relevant degree calculator;

selecting a moving picture content to be displayed from the other moving picture contents, based on the comprehensive degree of relevance calculated by the content relevance calculator;

generating a visualized content obtained by symbolizing the moving picture content to be processed and the moving picture content to be displayed, respectively;

locating a visualized content corresponding to the moving picture content to be processed in a virtual space, and respectively locating a visualized content corresponding to each moving picture content to be displayed at a position away from a layout position thereof according to the comprehensive degree of relevance of each moving picture content to be displayed;

visualizing the virtual space, in which the visualized content is located, in a displayable state; and displaying the visualized virtual space.

* * * * *